United States Patent [19]

Converse, III et al.

[11] Patent Number: 4,502,318

[45] Date of Patent: Mar. 5, 1985

[54] METHOD AND APPARATUS FOR CALIBRATING FLOW METERS

[75] Inventors: Vernon G. Converse, III, Franklin; James M. Bordato, Grosse Pointe Wds.; Theodore R. Bott, Berkley; Charles E. Foerster, Jr., Northville; Robert E. Miller, Ann Arbor; Ronald K. Mudge, Brighton, all of Mich.; Aldren M. Pace, Reseda, Calif.; Kent Van Allen, New Baltimore, Mich.

[73] Assignee: Scans Associates, Inc., Livonia, Mich.

[21] Appl. No.: 353,206

[22] Filed: Mar. 1, 1982

[51] Int. Cl.³ .............................................. G01F 25/00
[52] U.S. Cl. ..................................................... 73/3
[58] Field of Search ............................................. 73/3

[56] References Cited

U.S. PATENT DOCUMENTS 2,987,911  6/1961  McDonnell .
3,026,706  3/1962  Halsell et al. ............................. 73/3

OTHER PUBLICATIONS

Precision Flowmeter Calibrators, Bulletin 1386C, Cox Instrument Division/Lynch Corp., Detroit, Mich.
Alasia et al., Alta Frequenza vol. 44 No. 10 p. 553-557 Oct. 1975.

Primary Examiner—S. Clement Swisher
Attorney, Agent, or Firm—Dolgorukov & Dolgorukov

[57] ABSTRACT

The specification discloses a method and apparatus for calibrating liquid flow meters of all types. The system includes a scale for dynamically determining the weight of a liquid flowing through a flow meter, together with means for measuring the flow through the flow meter being tested. In the case of a glass tube flow meter, a float detection system is used, whereby the operator will set the flow through the flow meter to a desired point, use the float detection system to make certain the float stays in a fixed position during the test, as well as to locate the float from a reference point, and use the system to measure the flow through the flow meter during a fixed period of time, thereby obtaining a reading, in engineering units, for each predetermined position of the float.

49 Claims, 73 Drawing Figures

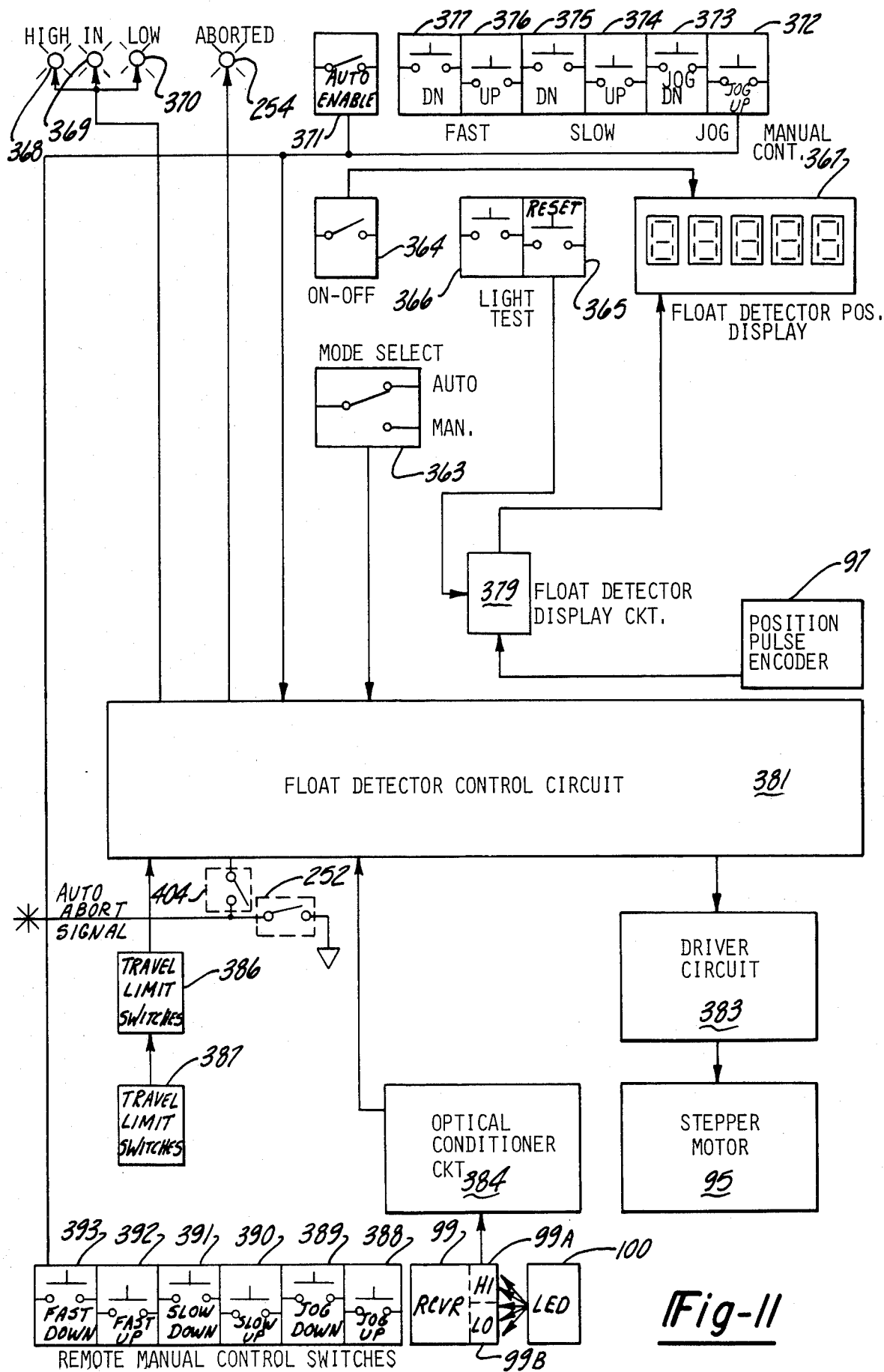

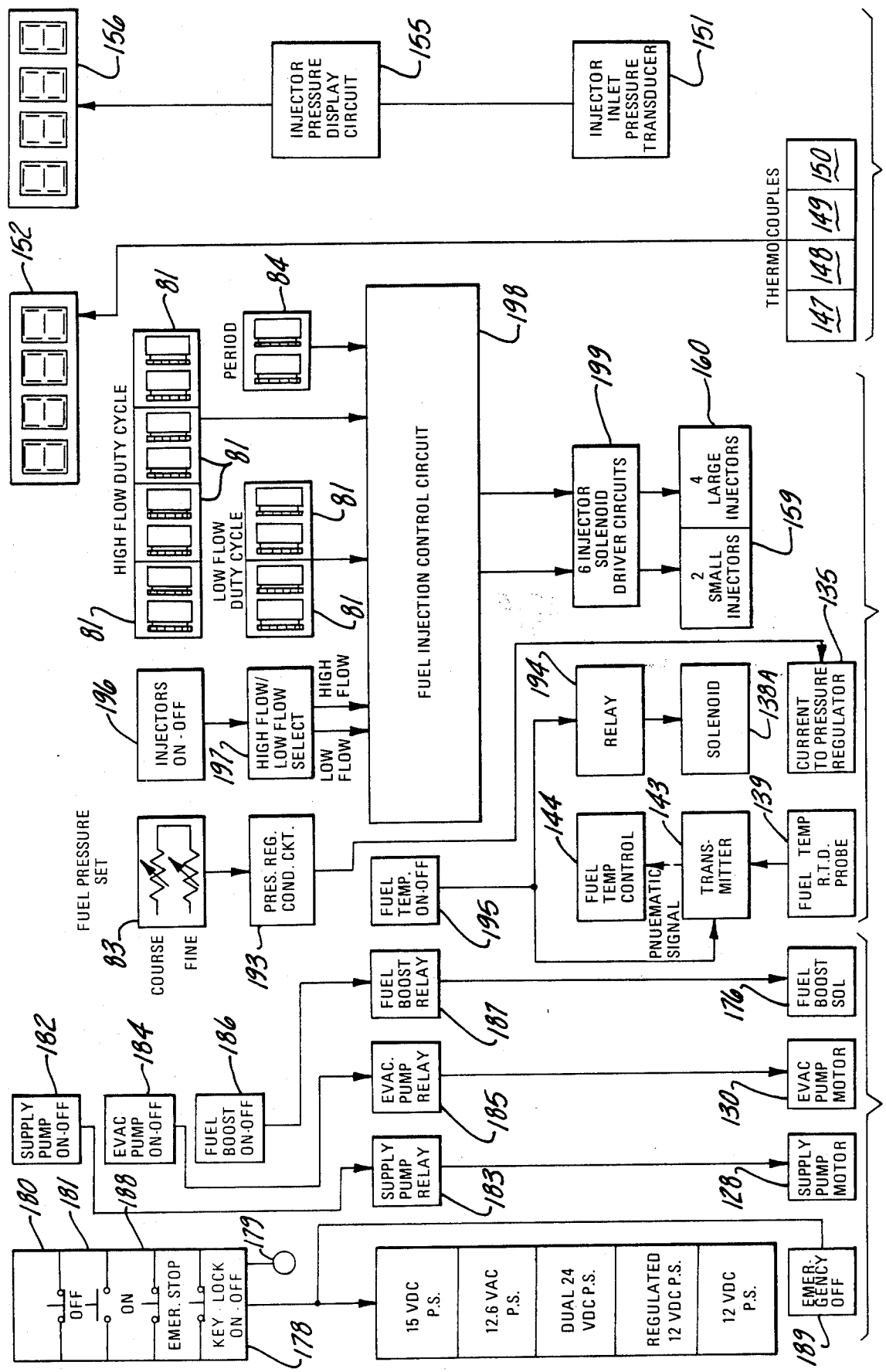

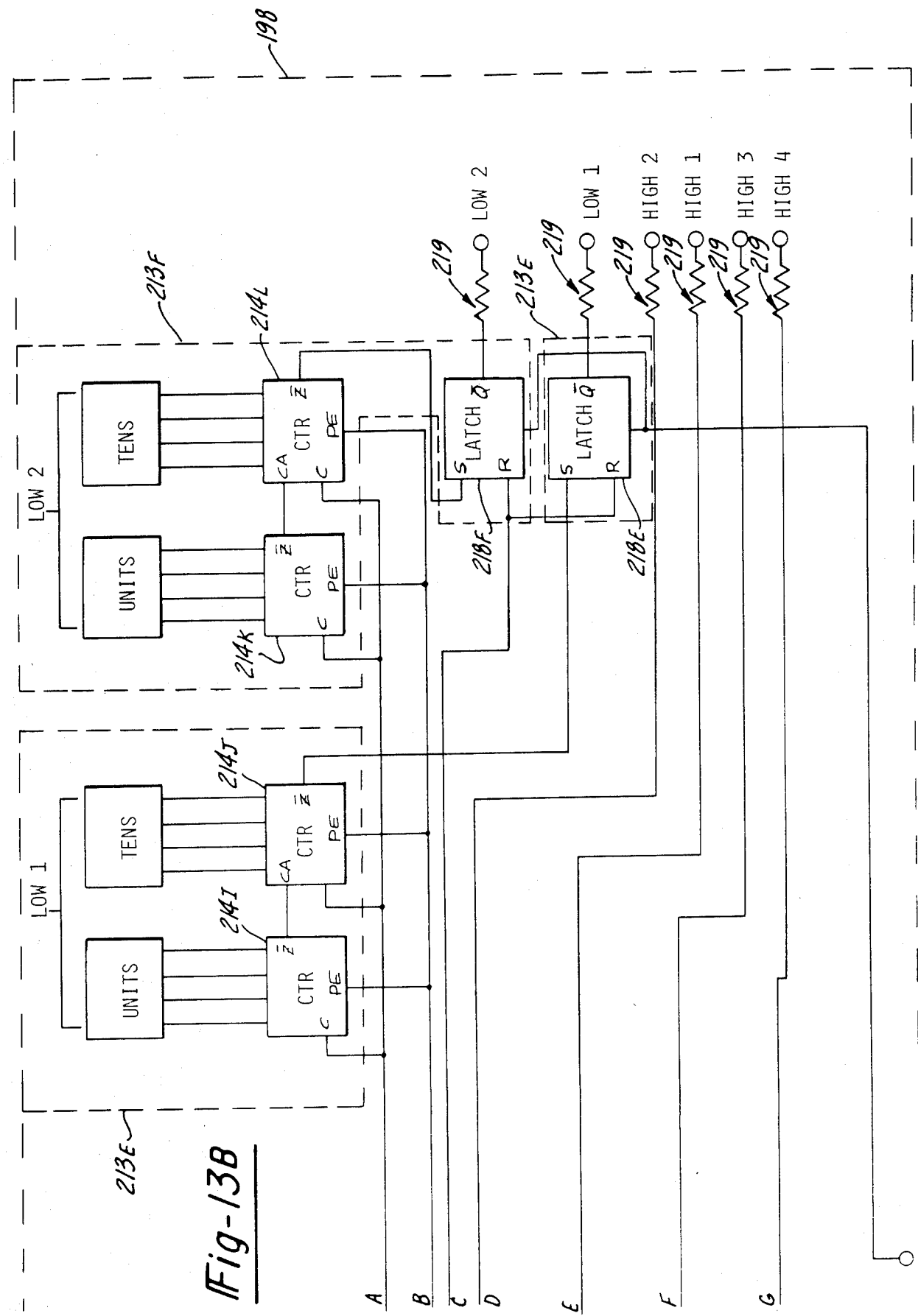

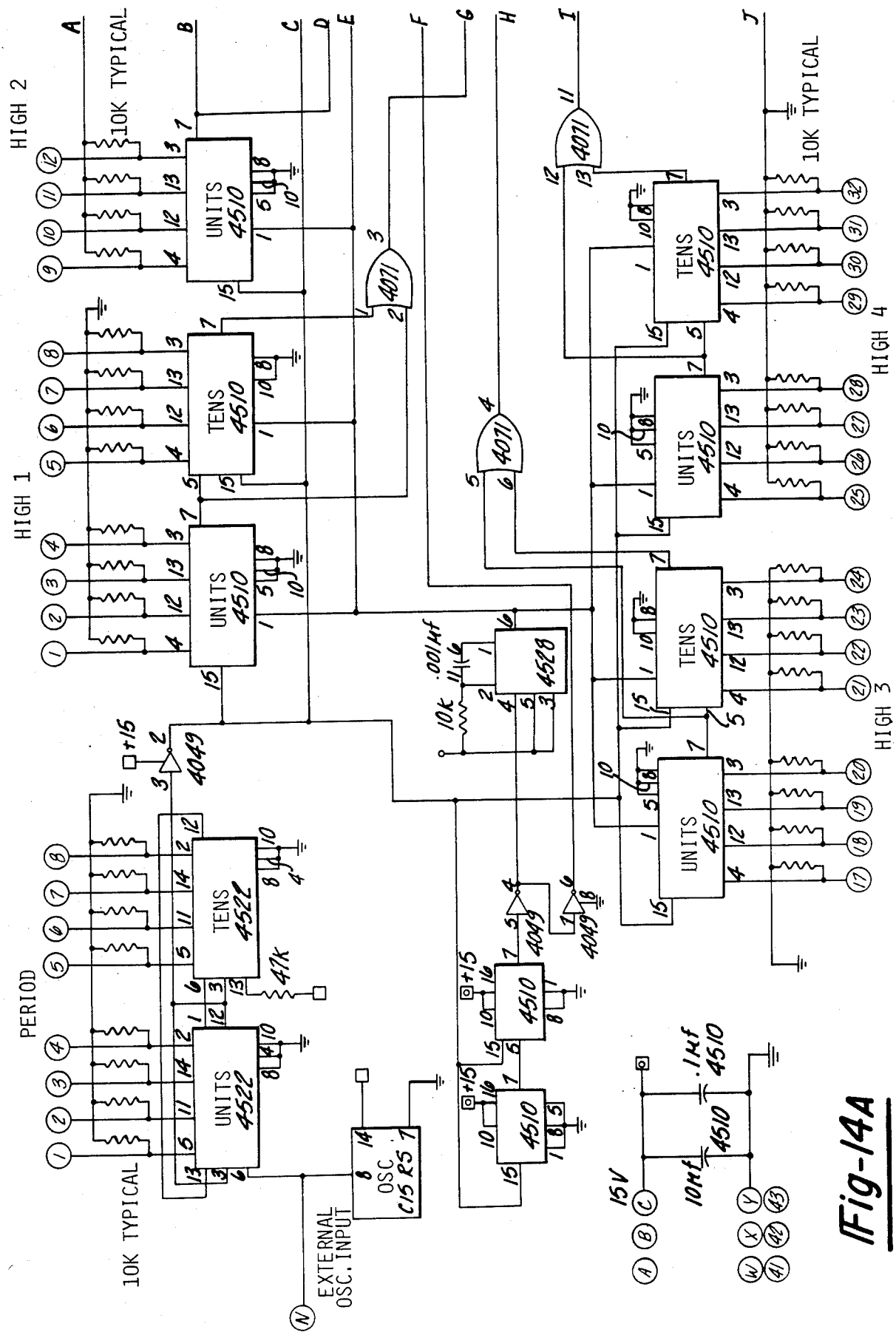

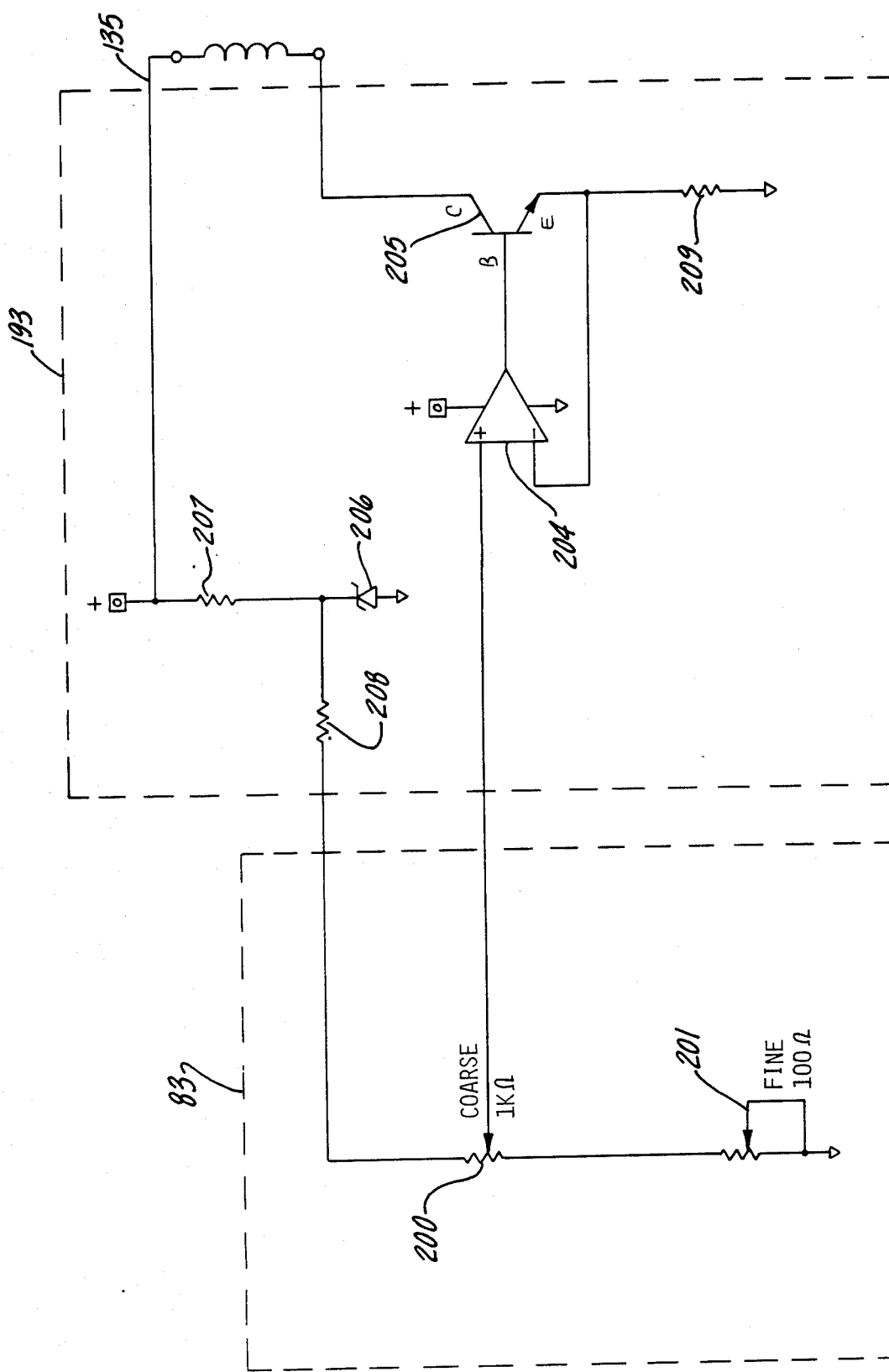

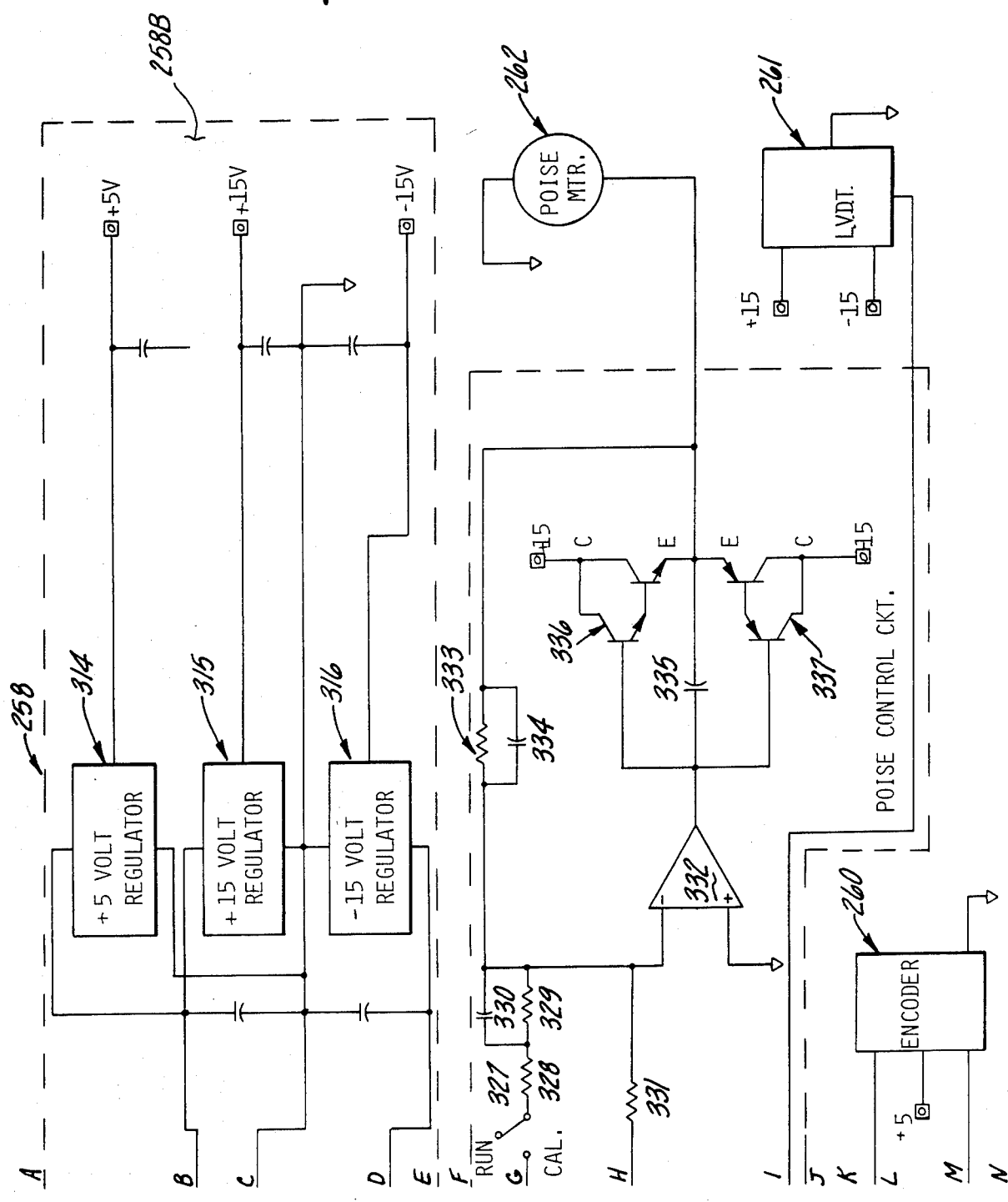

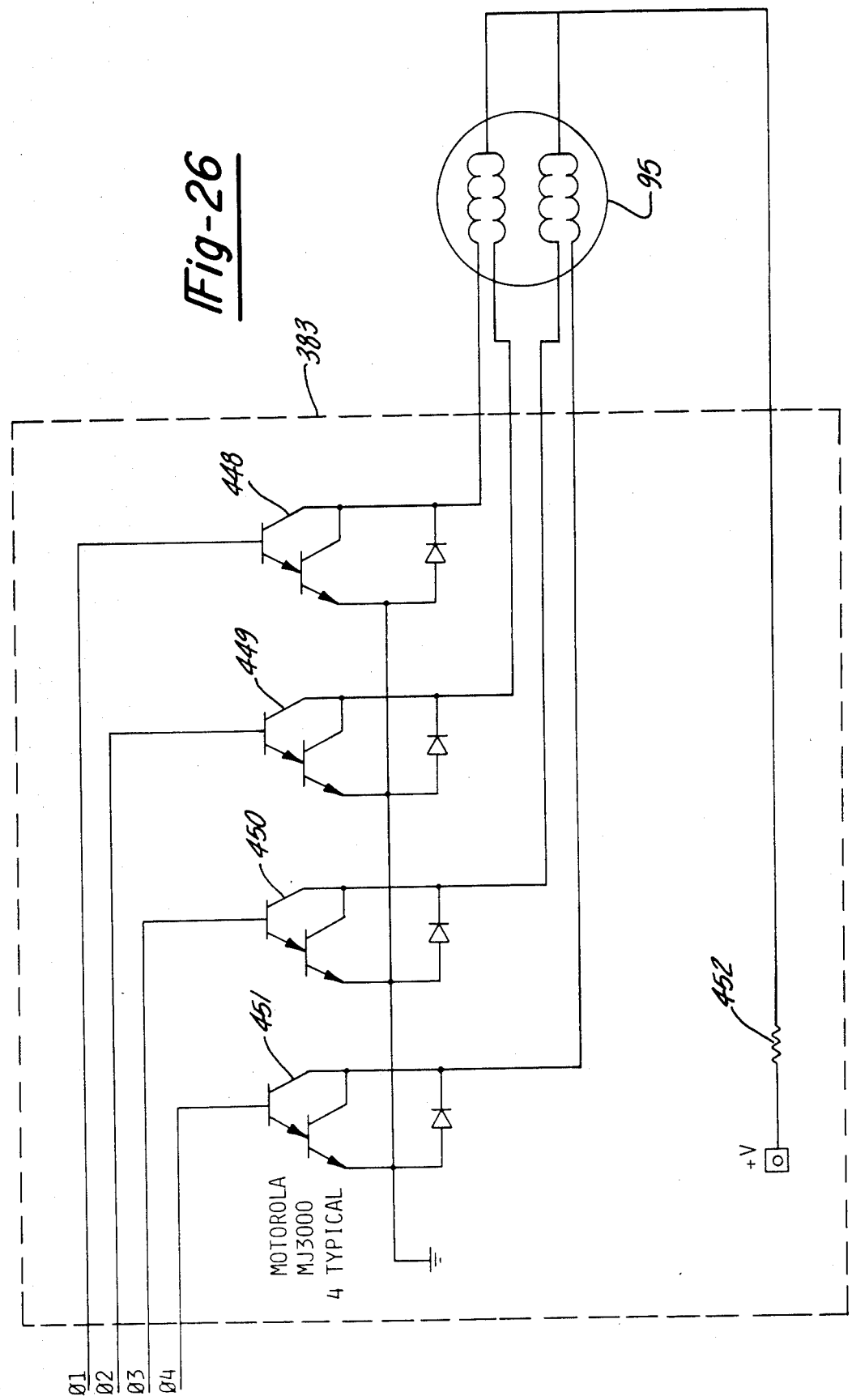

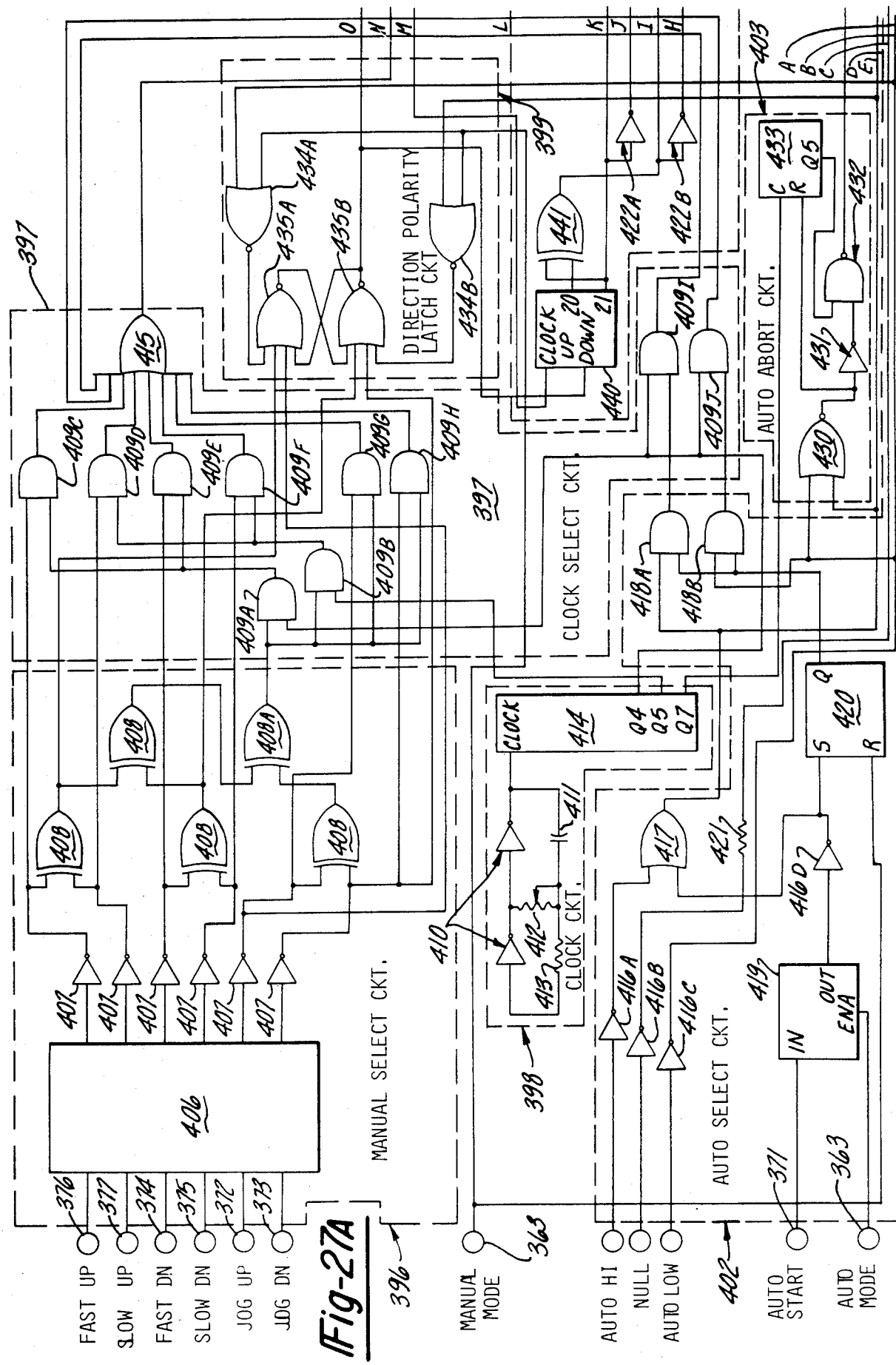

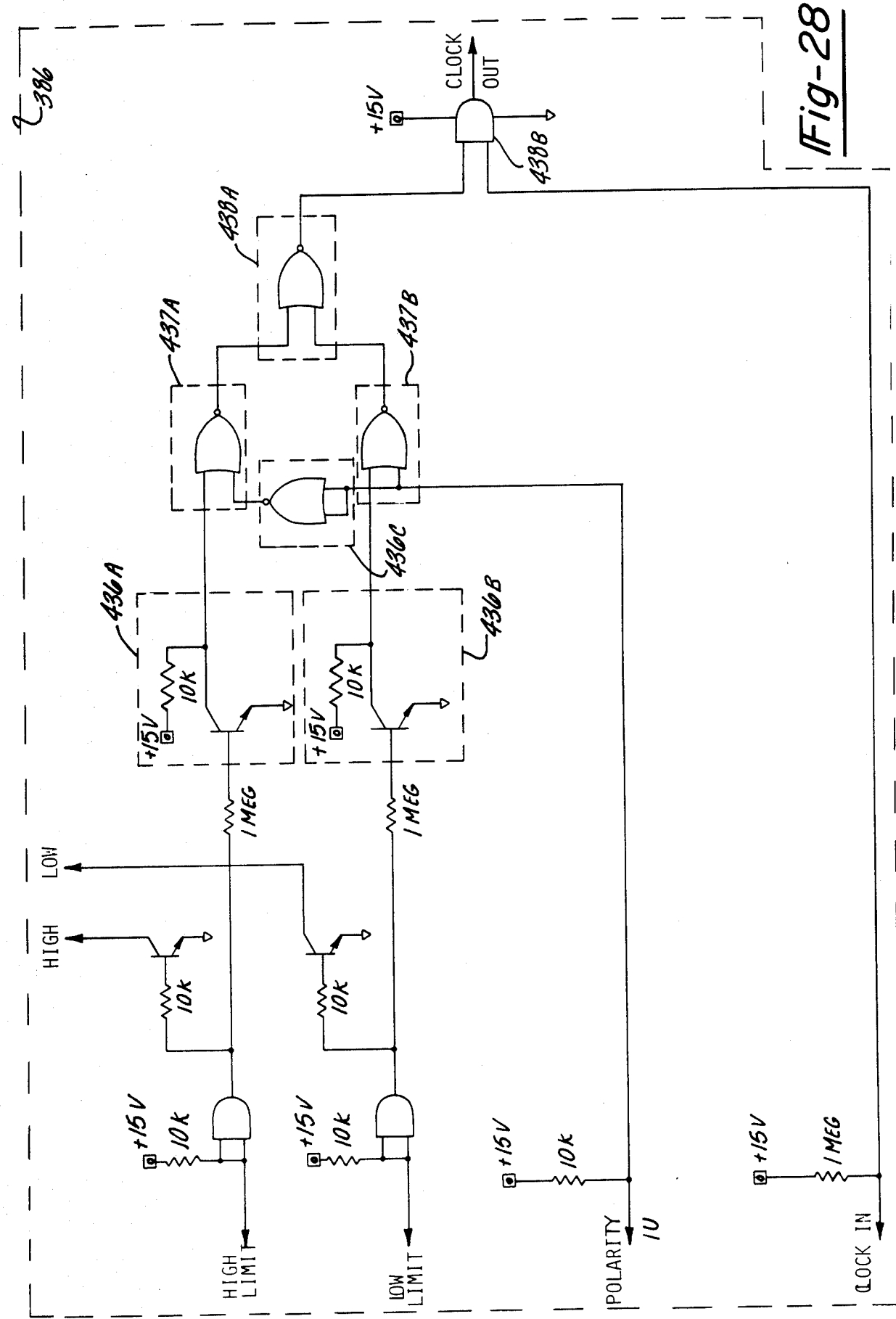

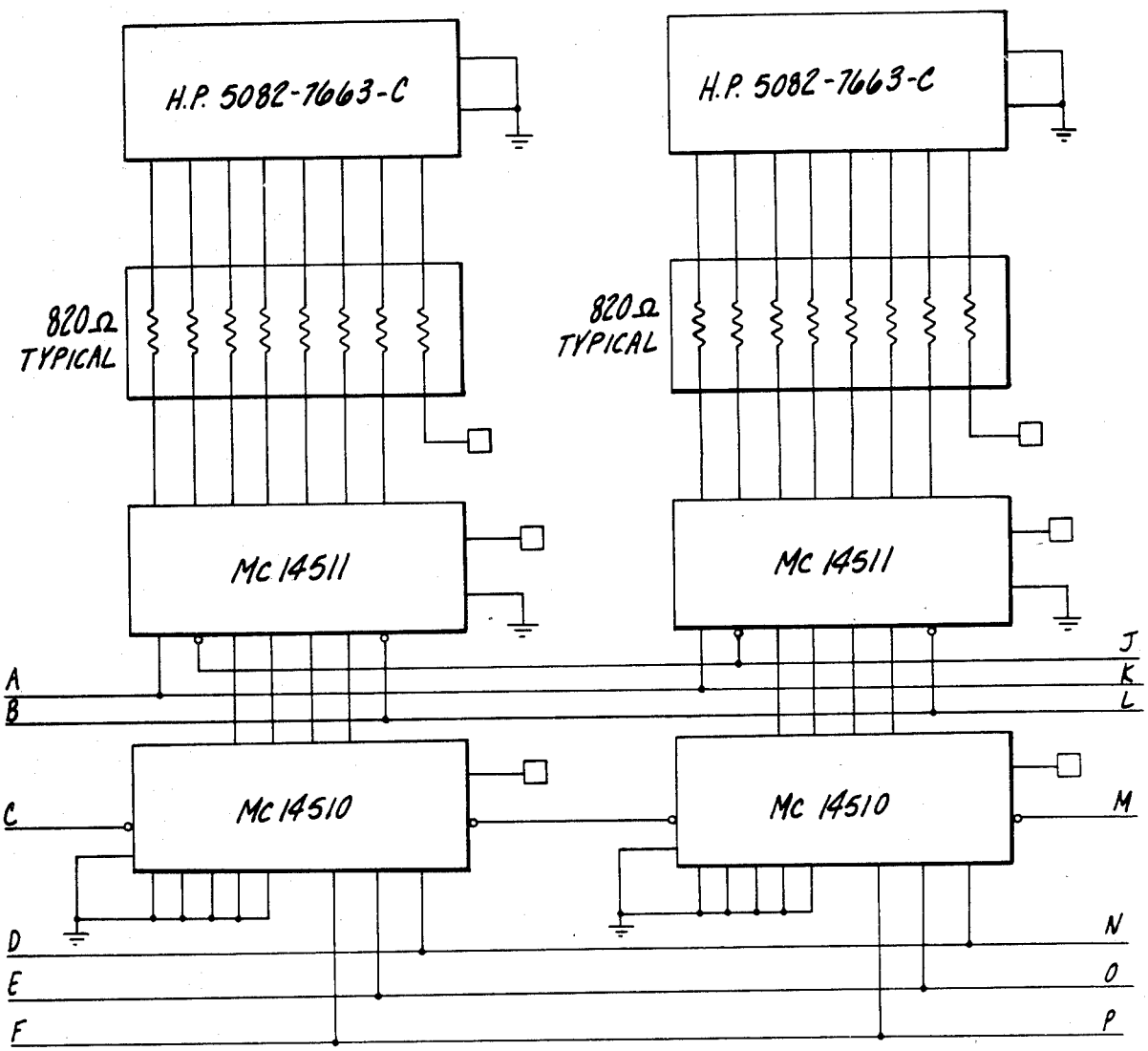
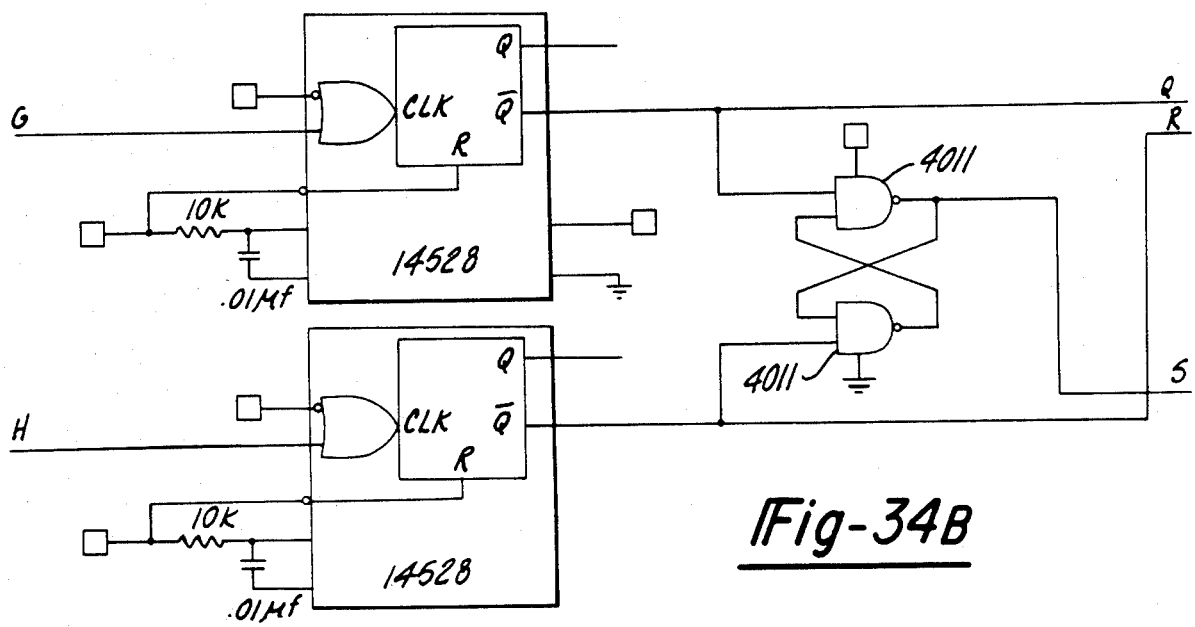
Fig-34B

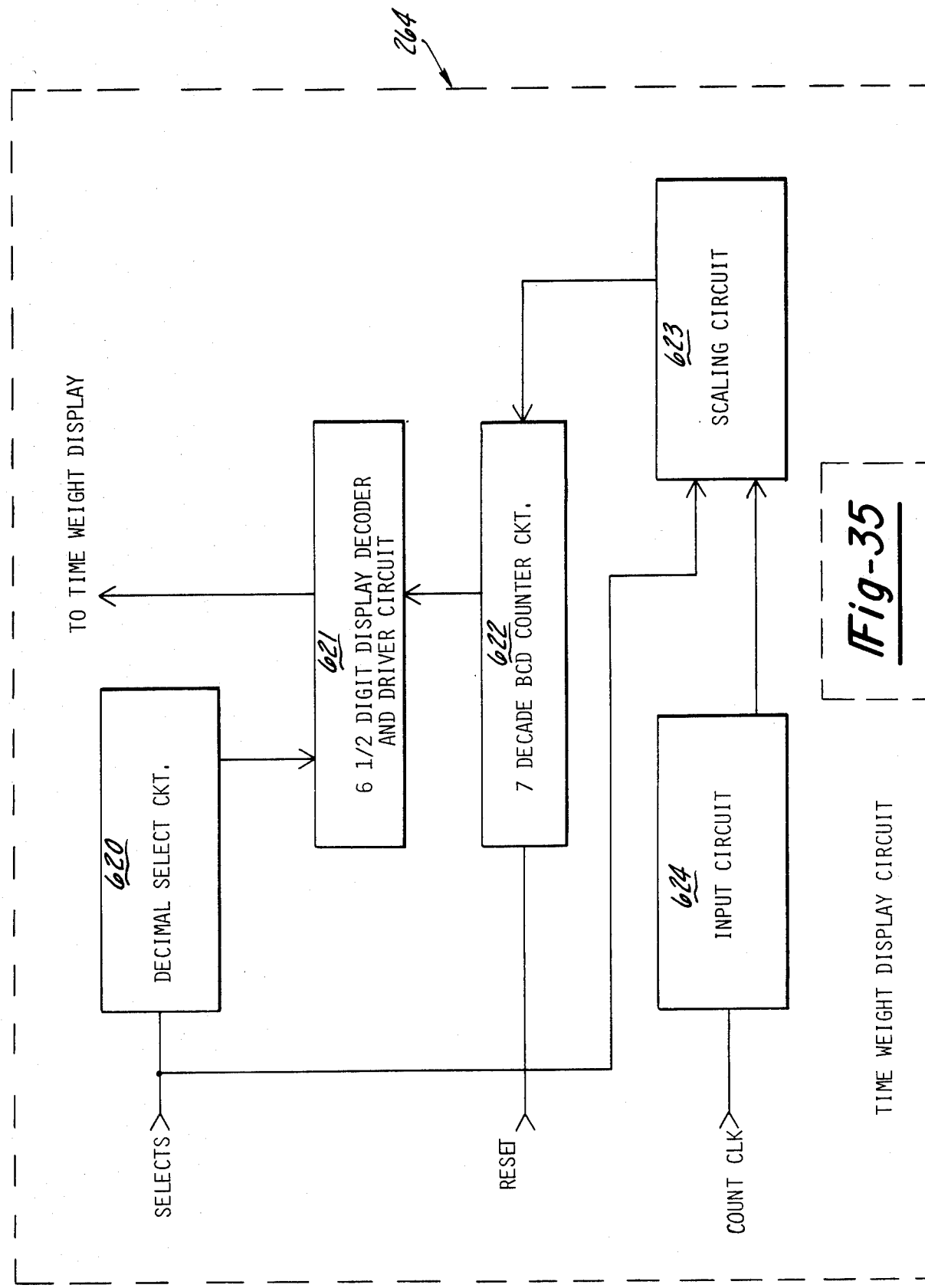

Fig-37B
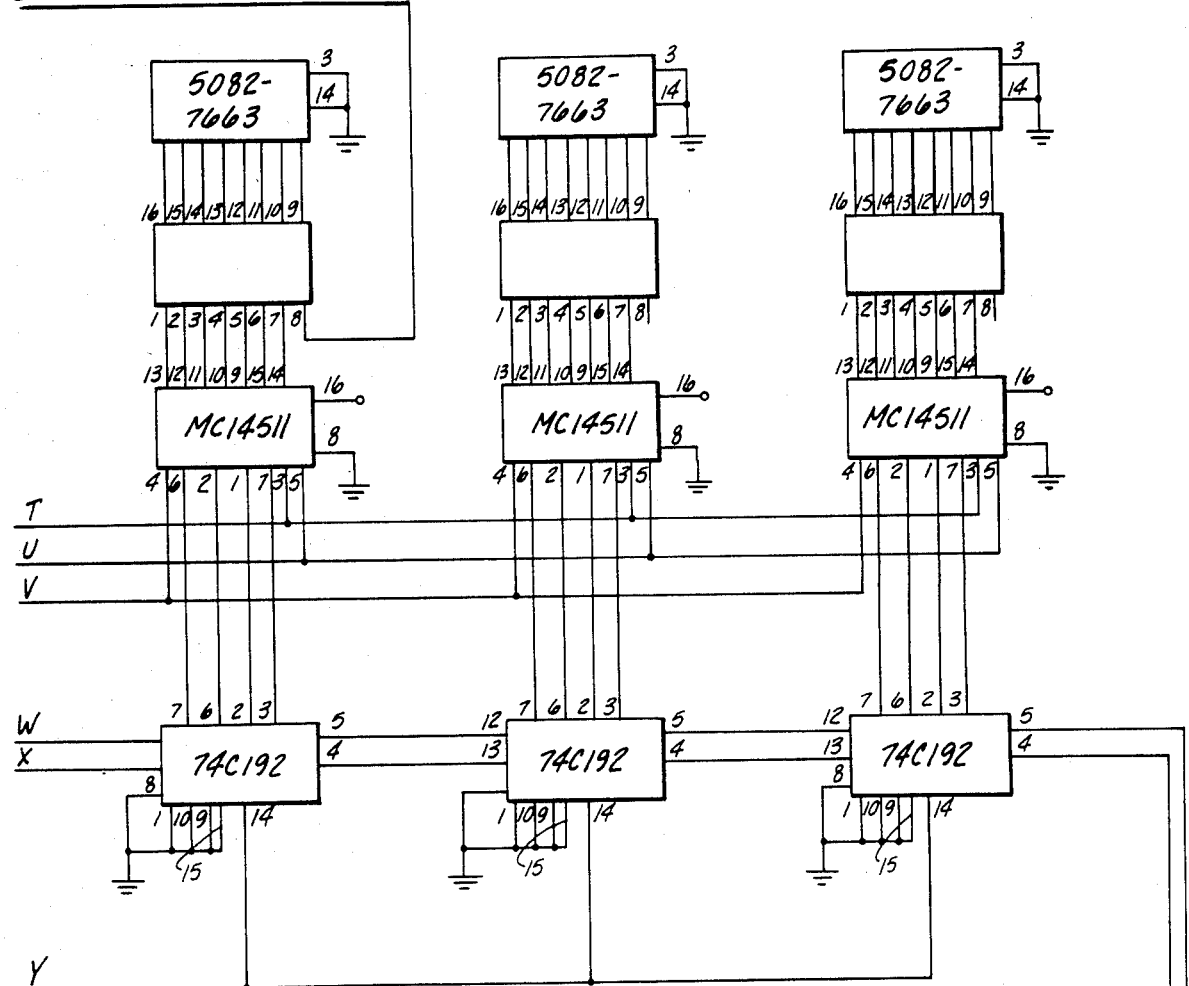
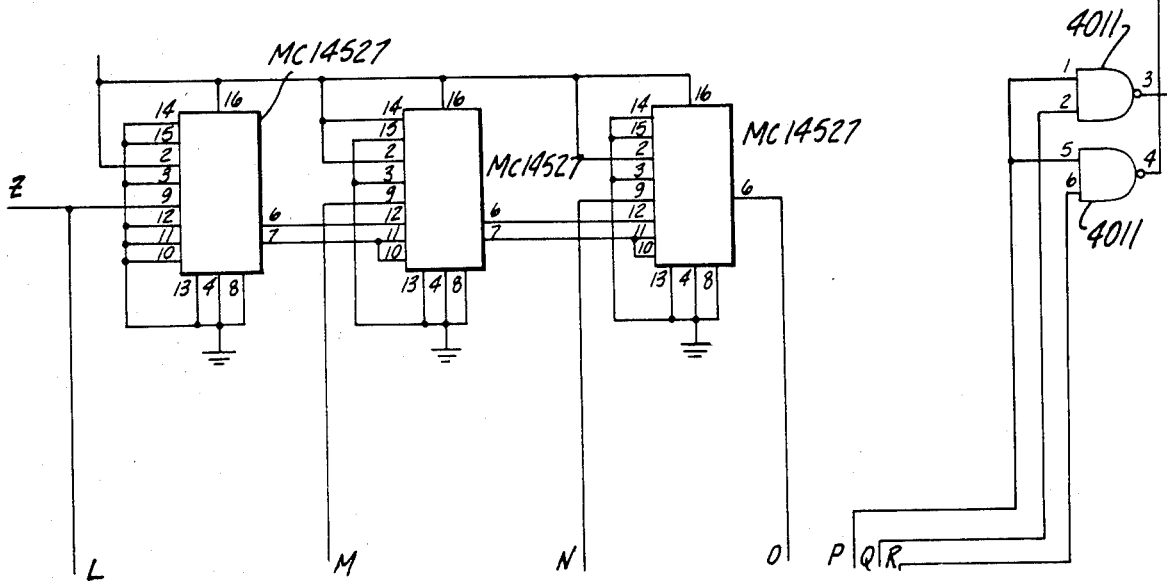

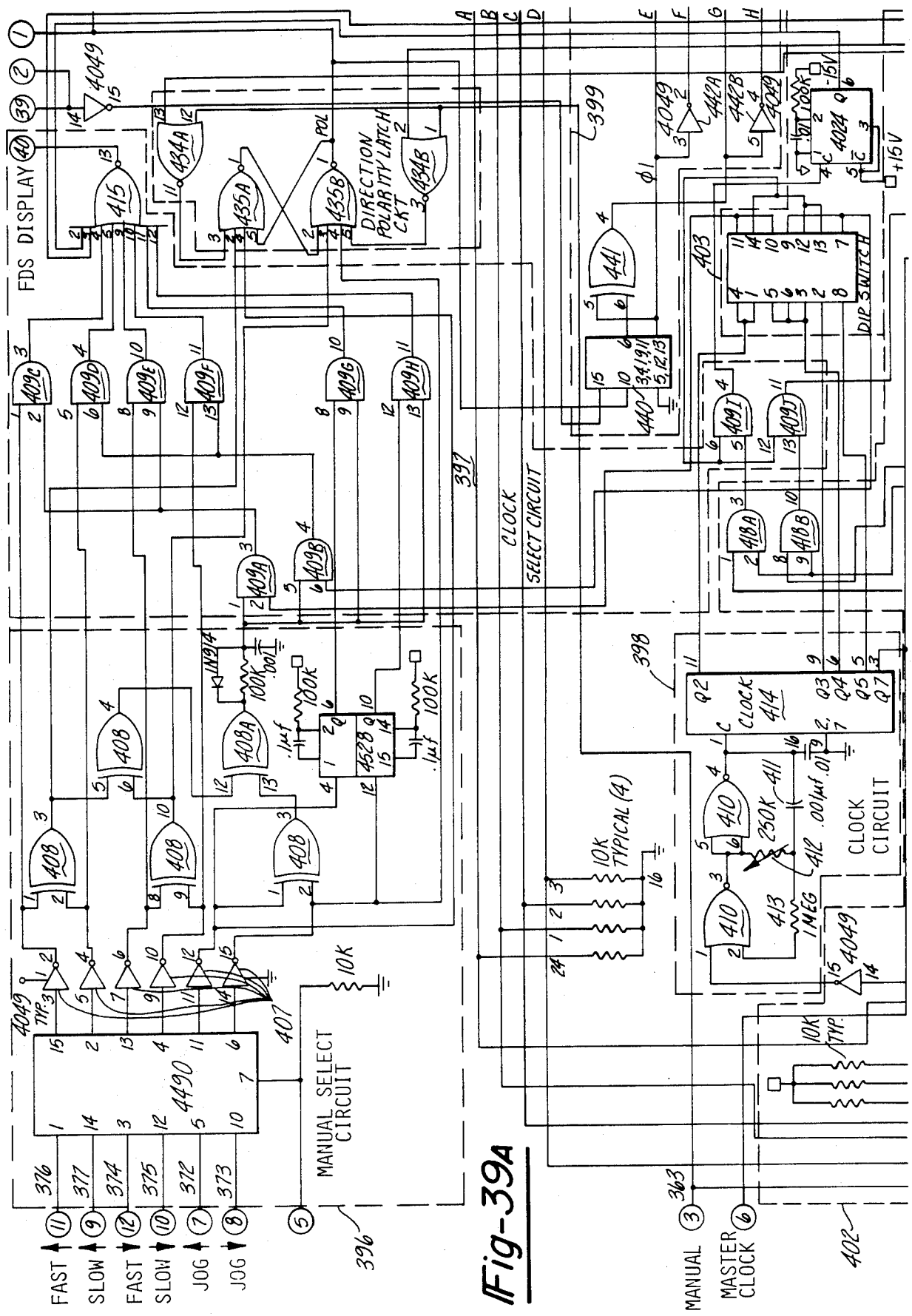

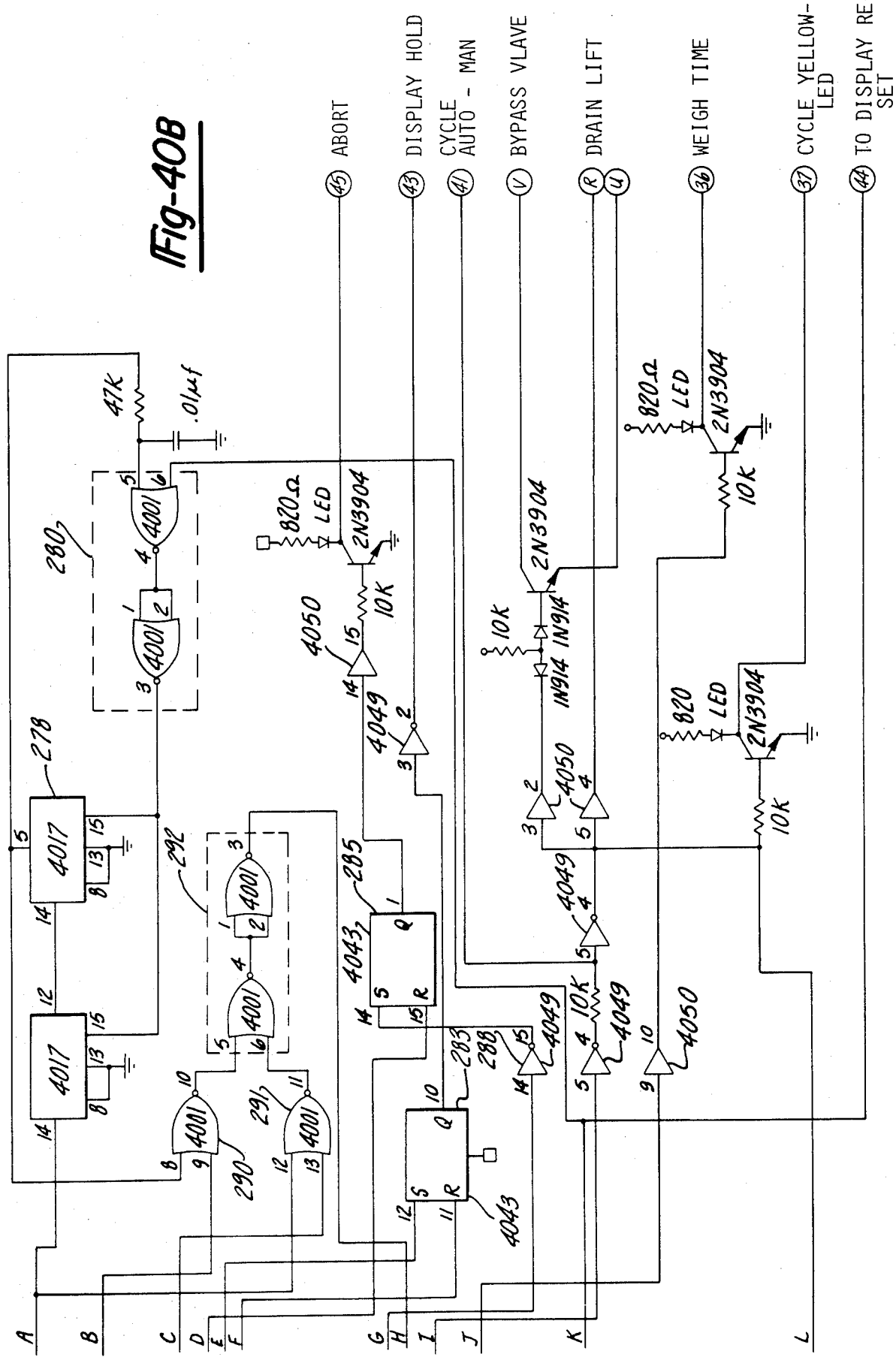

METHOD AND APPARATUS FOR CALIBRATING FLOW METERS

The present invention relates to a method and apparatus for calibrating flow meters and, more particularly, to a method and apparatus for calibrating such flow meters based on a variable weight-fixed time principle, rather than on a fixed weight-variable time system, which was previously used in the art.

Present day flow meter calibration systems work on the principle of measuring the time it takes a fixed weight of fluid that has passed through a flow meter to collect in a weigh tank which is suspended on a scale beam, which in most cases is a compound beam arrangement because large flows are involved.

The compound beam arrangement has a small beam and a large beam, sometimes referred to as a "tare" and a "weigh beam", respectively. Usually on the top of the tare beam is an adjustable weight to set the zero point of the scale, and on the end of the tare beam is a pan in which precision weights are placed by the operator. To provide the most accuracy possible, the beam is usually of a type known as a knife-edge beam.

Used in conjunction with the scale is an electronic timer indicating directly in units and tied to its own crystal frequency standard, for example, a crystal oscillator.

In operation, the present state of the art systems, based on fixed weight-variable time, would be started up before an actual test and you would have a reservoir being supplied through a pump, a filter, a heat exchanger, and a float control valve. The fluid flowing through the flow meter being tested would flow through the above devices, and the circuit would be completed by a back pressure control and a conduit leading to the pan on a weigh scale, with the weigh scale being able to dump directly into the reservoir.

In these systems, because the flow of the fluid is temperature sensitive, heat exchanger equipment would typically control the temperature of the fluid to plus or minus 1° F., after which it would pass through the control valve, the meter under test, the back pressure valve, the weigh tank and then back into the reservoir. This type of action would take place for a predetermined amount of time until the system is temperature stabilized.

A preliminary fill of the system would then take place after the operator has adjusted the flow control valve to bring the float in the flow meter to the point at which it is desired to test such flow meter. After this flow has been established, a small weight is placed on the pan of the weigh scale, the electronic timer is set to zero, and the dump valve would be closed, starting the filling of the weigh tank. Since the placing of the weight put the scale off balance, this preliminary fill time would end when an actuator was tripped, indicating the scale was again in balance.

By using the preliminary fill it should be understood that the scale is then placed in a dynamic condition overcoming initial friction and so forth. When the scale is back in balance and a weight of fluid is in the weigh tank equal to the small weight which has previously been placed on the weigh scale, the actual weight desired to be measured is placed on the weight pan, again deflecting the beam. Since the timer had also been reset when this scale reached its balanced condition, it can be seen that the timer is now actually counting the amount of time necessary for the scale to again reach its balance condition, or, in other words, the amount of time for a predetermined amount of weight to be flowed into the weigh tank. The timer will lock when the scale is again in balance, after which time the dump valve on the weigh tank will open, allowing the fluid to pass through to the reservoir and complete the cycle previously described. Such variable time-fixed weight systems have had useable accuracy at high flows over many years of service. While such accuracies were satisfactory for applications existing up to the present day, increased technology, and the move to economical operation of such things as gasoline engines, and their being of ever smaller sizes, has brought to the forefront the need to measure ever smaller flow rates at ever greater accuracy.

Applicants' assignee has been a manufacturer of carburetor testing equipment who has been directly involved in the testing of automotive carburetors for many years, and has seen the flow rate for automotive carburetors decrease from several pounds per hour to as low as one-half pound per hour and, in order to test carburetors at such low flows, it is necessary to have more accurate flow meters than were heretofore available. Applicants, therefore, several years prior to the present application, have had to recalibrate flow meters calibrated by the old fixed weight-variable time system, since such system simply was not accurate enough to calibrate flow meters to the accuracy necessary for the present day requirements, such as carburetors of smaller and smaller engines.

Applicants' assignee attributed the failures of the fixed weight-variable time system to several reasons. First of all, a serious problem was inherent in the system. When one wished to calibrate a flow meter at a certain spot, the operator of the calibration system, by means of a hand valve, brought the float to a certain level and had to manually keep it there throughout the test. When large flow was involved, things which were found to affect the movement of the float at low flows, such as pulsation inherent in the previously mentioned pump, were not present, and the operator could fairly accurately "eyeball" the float level. However, it was found that when low flows were attempted with the same setup, say flows below five pounds per hour, the pulsations present in the flow because of the type of pump made the float move so much that the operator simply could not eyeball it to the proper level with any degree of accuracy and the system provided no repeatability whatsoever.

Thus, the eyeballing problem and the repeatability problem were two of the problems which led Applicants' assignee to abandon the fixed weight-variable time system. Other problems that were found to exist were frictional problems inherent in the weight scale used in such system. Since such prior art systems were mainly used for large flows, which necessarily resulted in a large weight being accumulated in the weigh pan in a short period of time, the frictional effects on the accuracy of the measurements were negligible. However, again, when flowing below five pounds per hour, it was found that the frictional effects of the scale had a significant effect on the measurements.

Another problem which was found was related to the previous eyeballing problem, in that the physical limitations of the operator in eyeballing the float to the proper position meant that rather large separations between graduations on the flow meter were a necessity. Again, when large flows were involved this was no problem, but when low flows (below five pounds per hour) were used, these large distances between graduations represented large differences in flow, and the improved readability needed at low flow simply was not achievable.

Applicants, despite many attempts, found that attempting to overcome the failings of the fixed weight-variable time flow meter calibration systems were futile because of their inherent nature and thus, Applicants had to abandon the fixed weight-variable time system and attempt to solve the problems of flow meter calibration, based on the only other physically possible type of system, that being one based on a measuring a known weight for a fixed period of time, as a variable flow-fixed time system.

Thus, one of the objects of the present invention is to provide a flow meter calibration system operating on the variable weight-fixed time theory of operation.

Another object of the present invention is to provide a flow meter calibration system capable of calibrating all types of flow meters used in the art today, such as rotary flow meters, turbine flows meters and glass tube flow meters.

Another object of the present invention is to provide a flow meter calibration system useable for calibrating flow meters having very low flow rates.

Another object of the present invention is to provide a flow meter calibration system of the foregoing nature which can calculate flow meters to one quarter percent accuracy or better.

Another object of the present invention is to provide a flow meter calibration system capable of calibrating flow tubes, or other flow meters, and providing such calibration with a high degree of readability.

A further object of the present invention is to provide a flow meter calibration system for a glass tube flow meter which removes the operator from the position of having to maintain the flow meter float at an accurate position in the flow meter.

A further object of the present invention is to provide a flow meter calibration system which eliminates the effects of scale friction from the results of the calibration.

A further object of the present invention is to provide a flow meter calibration system which eliminates the effects of pulsating flow from the calibration measurements.

A still further object of the present invention is to provide a system in which the float in a glass tube flow meter is followed by an automatic tracking device.

A still further object of the present invention is to provide a calibration system having a digital readout of float position versus a reference line on the flow meter tube, so that the float position may be marked on a scale at a later time with great accuracy.

A further object of the present invention is to provide a flow meter calibration system capable of calibrating flow meters adapted to measure minute flows.

A further object of the present invention is to provide a flow meter calibration system of the foregoing nature which is dependable and repeatable in operation.

Further objects and advantages of this invention will be apparent from the following description and appended claims, reference being had to the accompanying drawings forming a part of this specification, wherein like reference characters designate corresponding parts in the several views.

FIG. 5 is a view illustrating the proper arrangement of FIGS. 5A, 5B and 5C to show the overall diagrammatic arrangement of our improved flow meter calibration system.

FIG. 6 is a drawing showing the arrangement of FIGS. 7 and 8 to show the relationship between FIG. 7, showing the float detection subsystem of our present invention, and FIG. 8, showing the weigh scale subsystem of the present invention.

FIG. 9 is a drawing showing the arrangement of FIGS. 10 and 11 to show the relationship between FIG. 10, which is a diagrammatic view of the weigh scale subsystem of the present invention, and FIG. 11, which is a diagrammatic view of the float detection subsystem of the present invention.

FIG. 12 is a block diagram of the electrical controls necessary to control the flow of air, water and fuel through the control subsystems shown in FIG. 5A and a portion of FIG. 5C.

FIG. 13B represents the remaining portion of the fuel injector circuit of FIG. 12.

FIGS. 14A and 14B are drawings of the circuit corresponding to FIGS. 13A and 13B as actually built.

FIG. 15 is a block diagram of the electrical circuitry necessary to operate the supply subsystem shown in FIG. 5C.

FIG. 16 is a block diagram of the monitoring system disclosed in a portion of FIG. 5B.

FIG. 17 is a schematic diagram of the fuel pressure set circuit shown in FIG. 12.

FIG. 18 is a schematic diagram of the pressure regulator control circuit shown in FIG. 12.

FIG. 22B is an electrical diagram showing a portion of the power supply circuit, a portion of the poise control circuit and the encoder, as shown in FIG. 10.

FIG. 26 is a schematic view of the stepper motor driver circuit shown in FIG. 7.

FIG. 27A is an electrical diagram showing the manual select circuit the clock circuit, the clock select circuit, the auto abort circuit, the direction polarity latch circuit and a portion of the auto select circuit and stepper motor translator circuit of FIG. 7.

FIG. 28 is a schematic view of the travel limit circuit shown in FIG. 27B.

Figure 31:
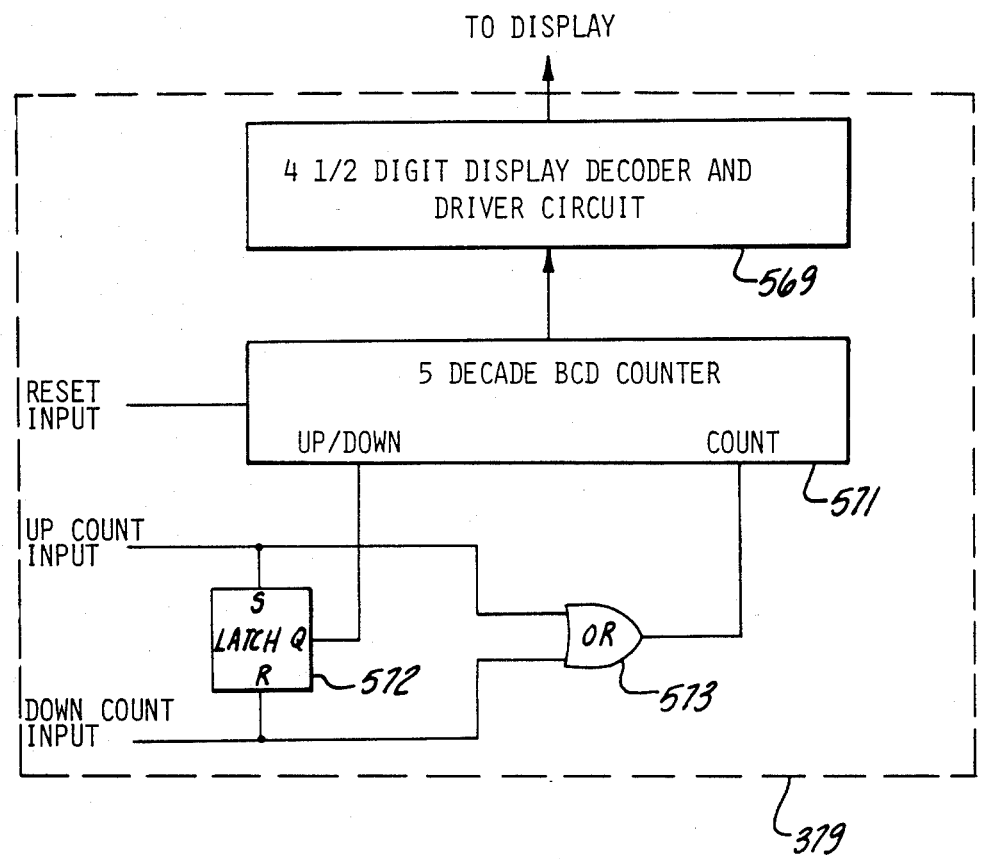
FIG. 31 is a block diagram of the float detector display circuit shown in FIG. 7.
Figure 34A:
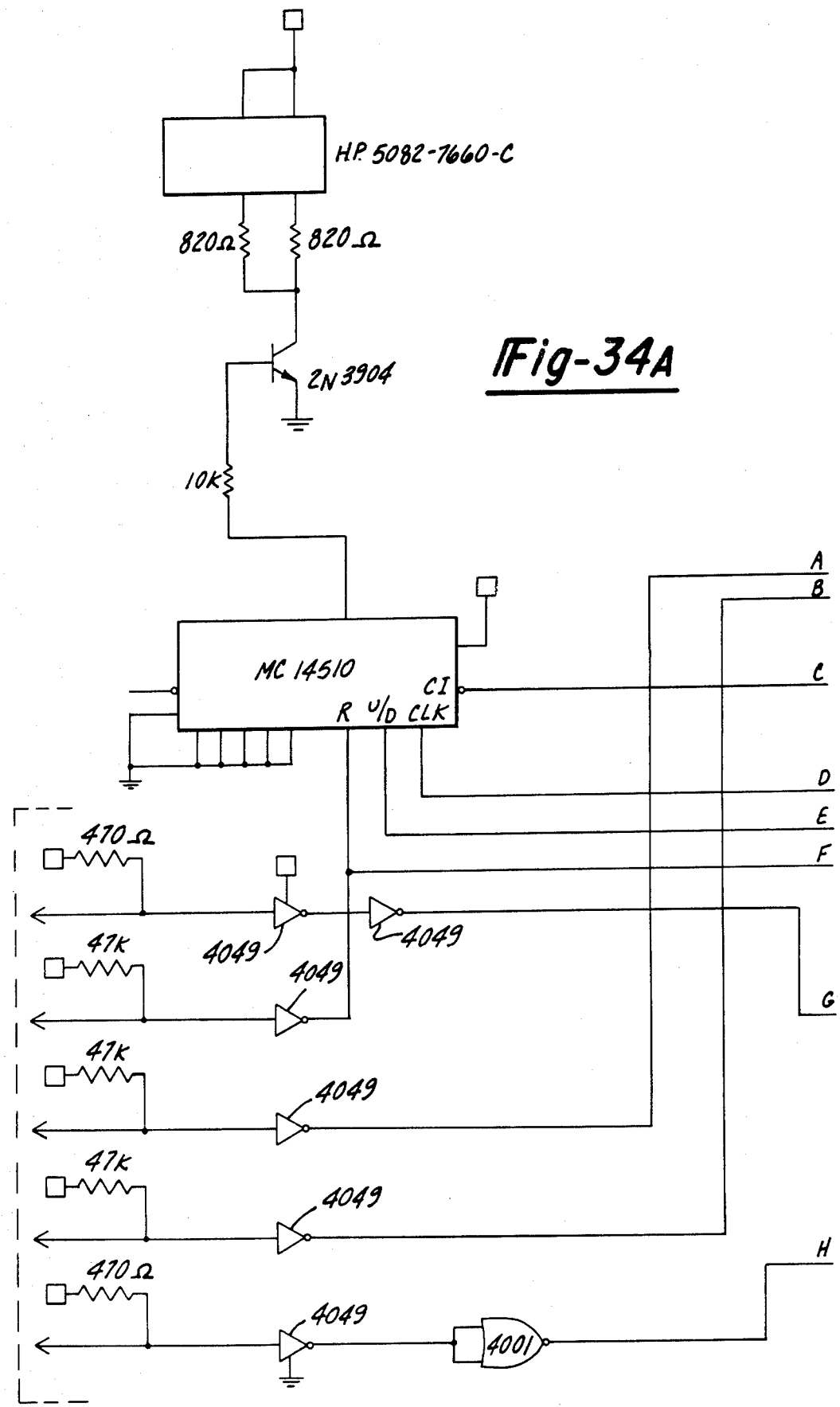
Figure 34C:
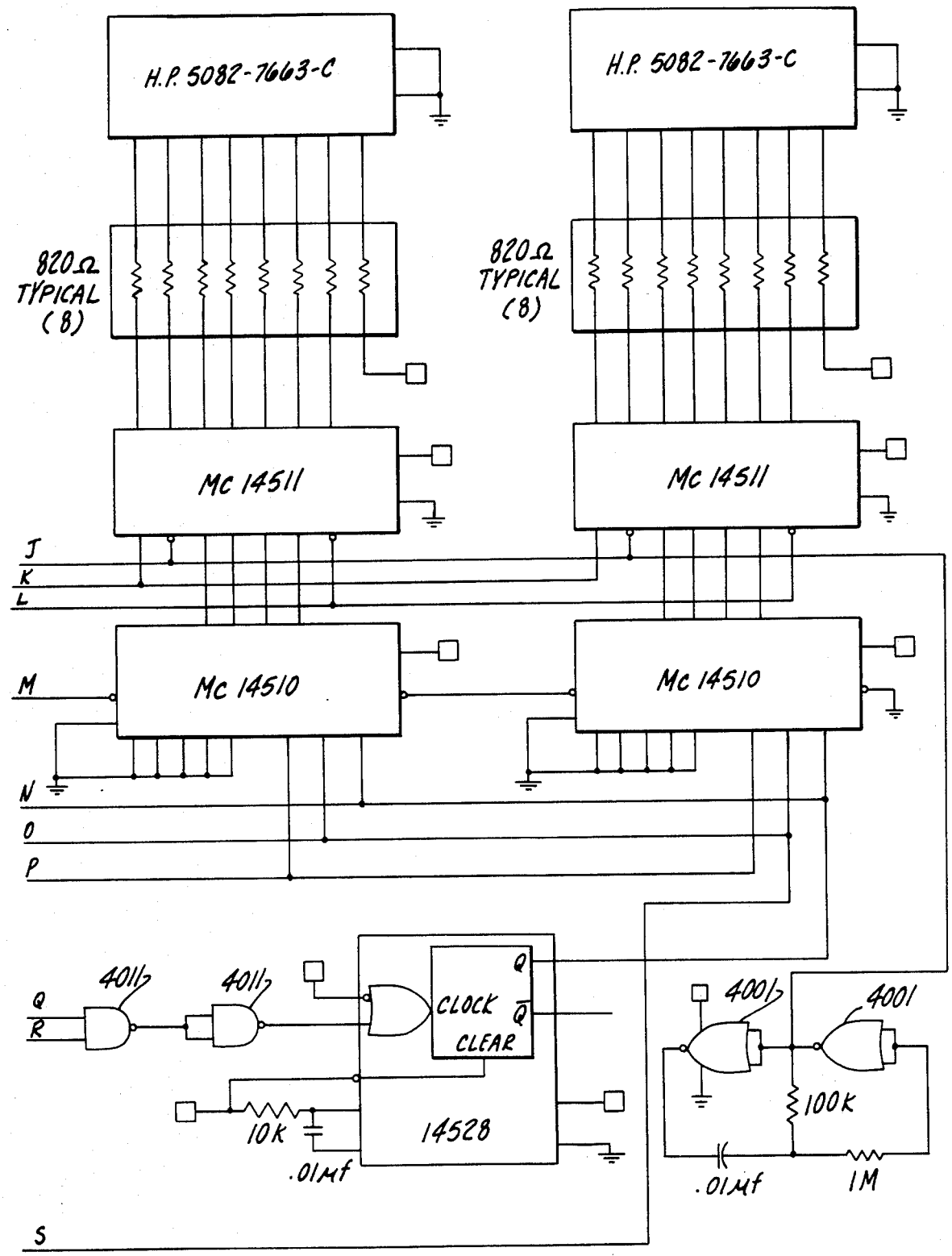

FIGS. 34A, 34B and 34C form a schematic diagram of the display circuit shown in FIG. 31 as actually built.

Figure 10:
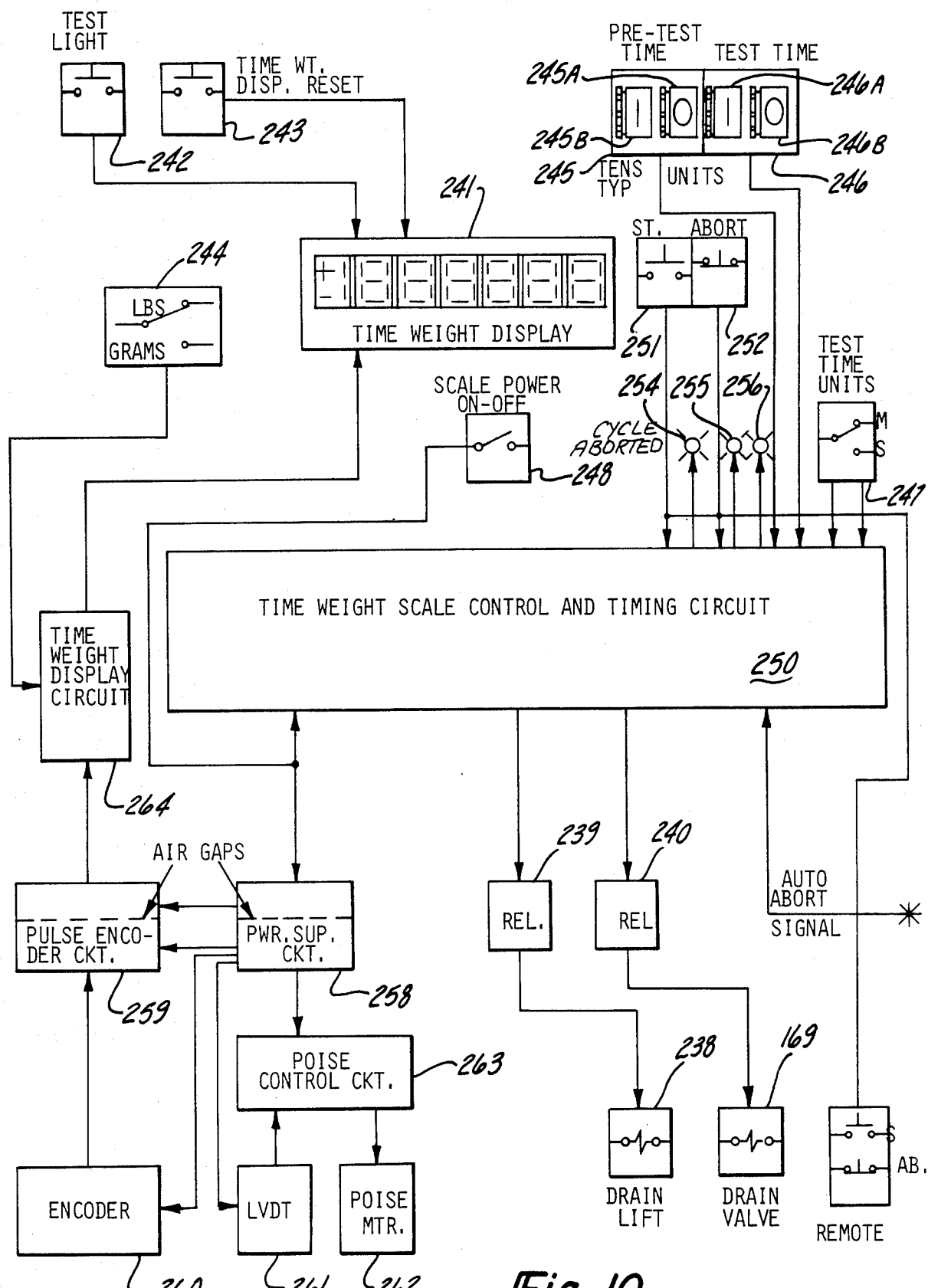

FIG. 35 is a block diagram of the time weight display circuit shown in FIG. 10.

Figure 36A:
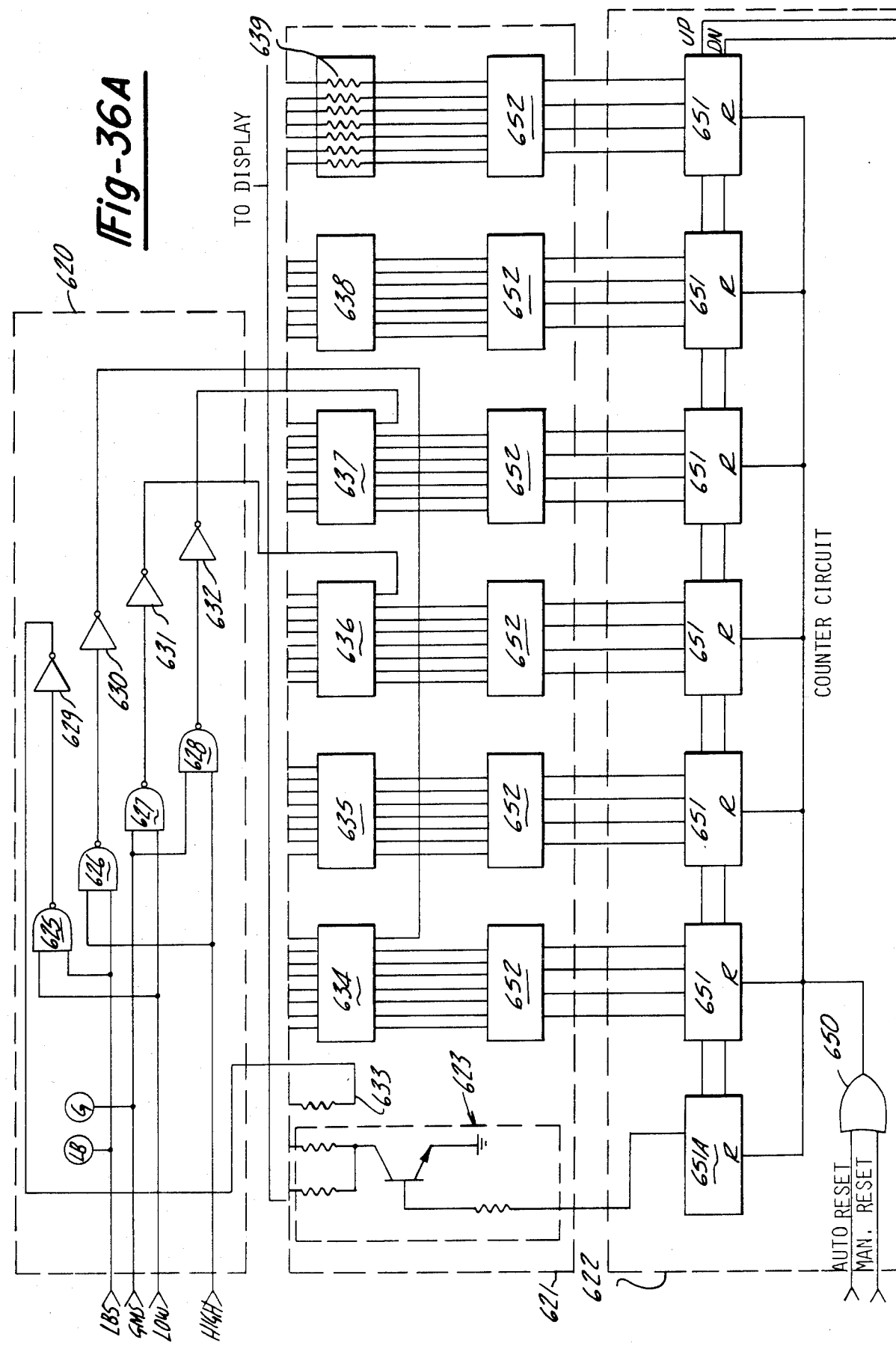
Figure 36B:
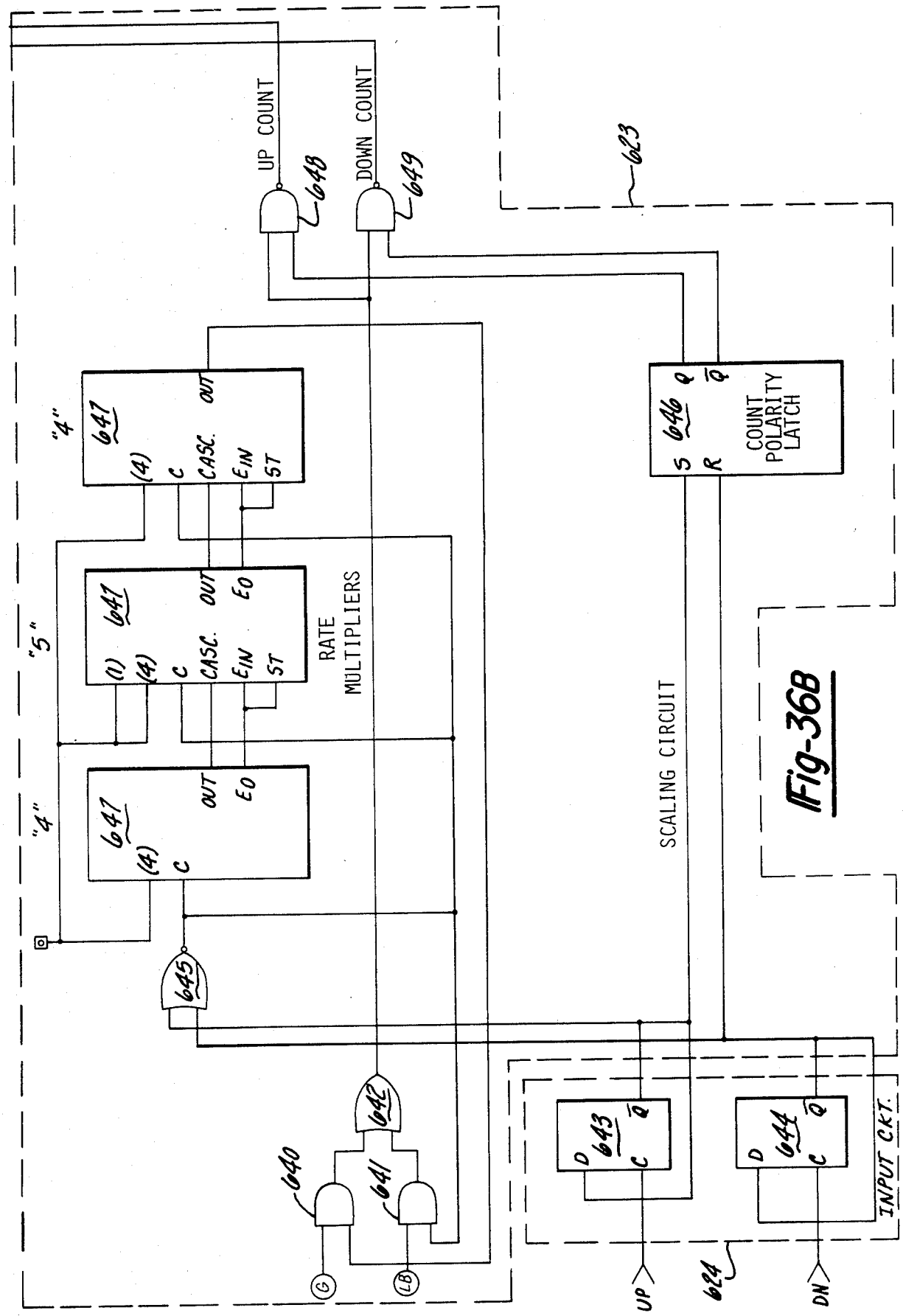

FIGS. 36A and 36B are circuit diagrams corresponding to the block diagram of FIG. 35.

Figure 37A:
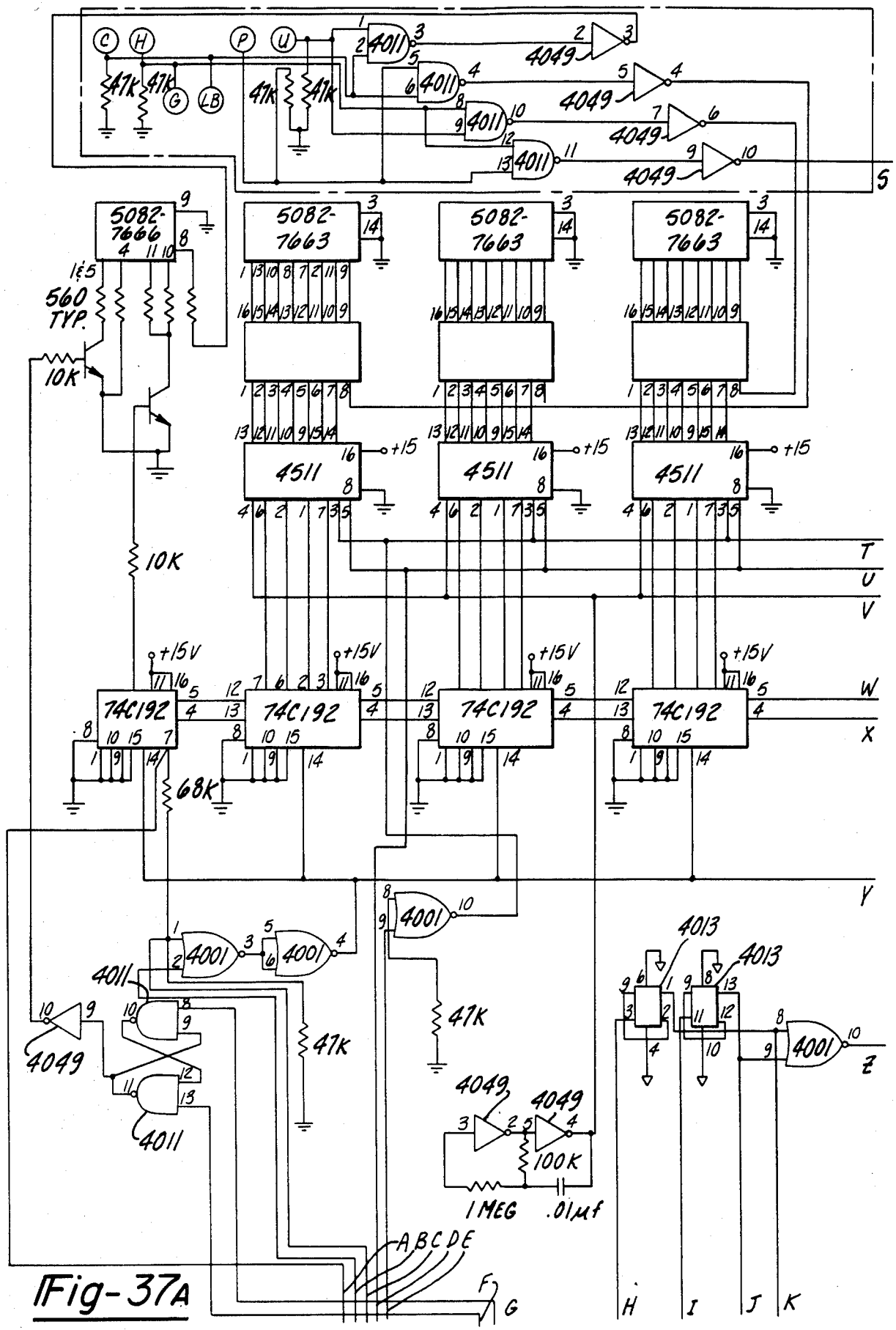
Figure 37C:
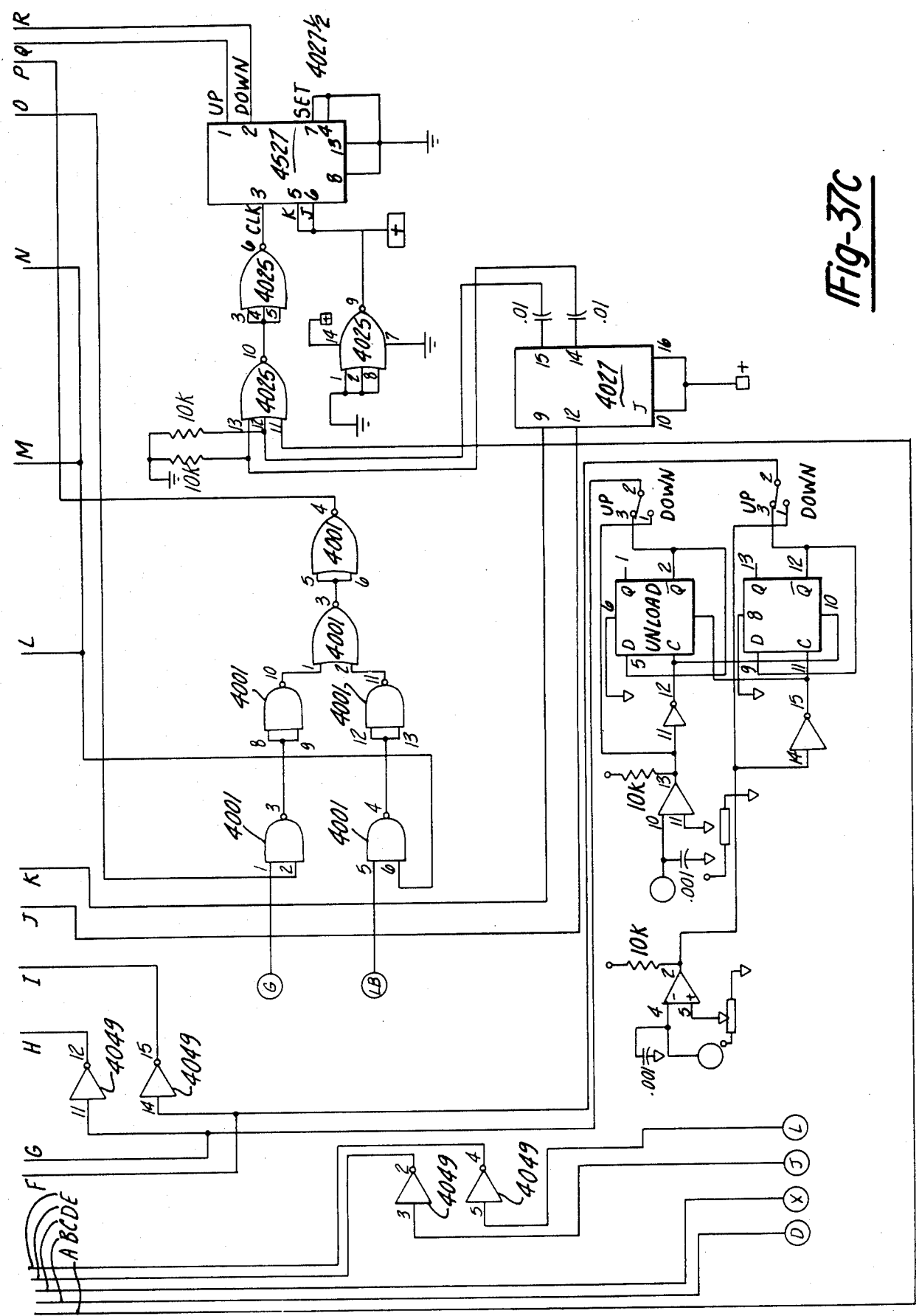
Figure 38A:
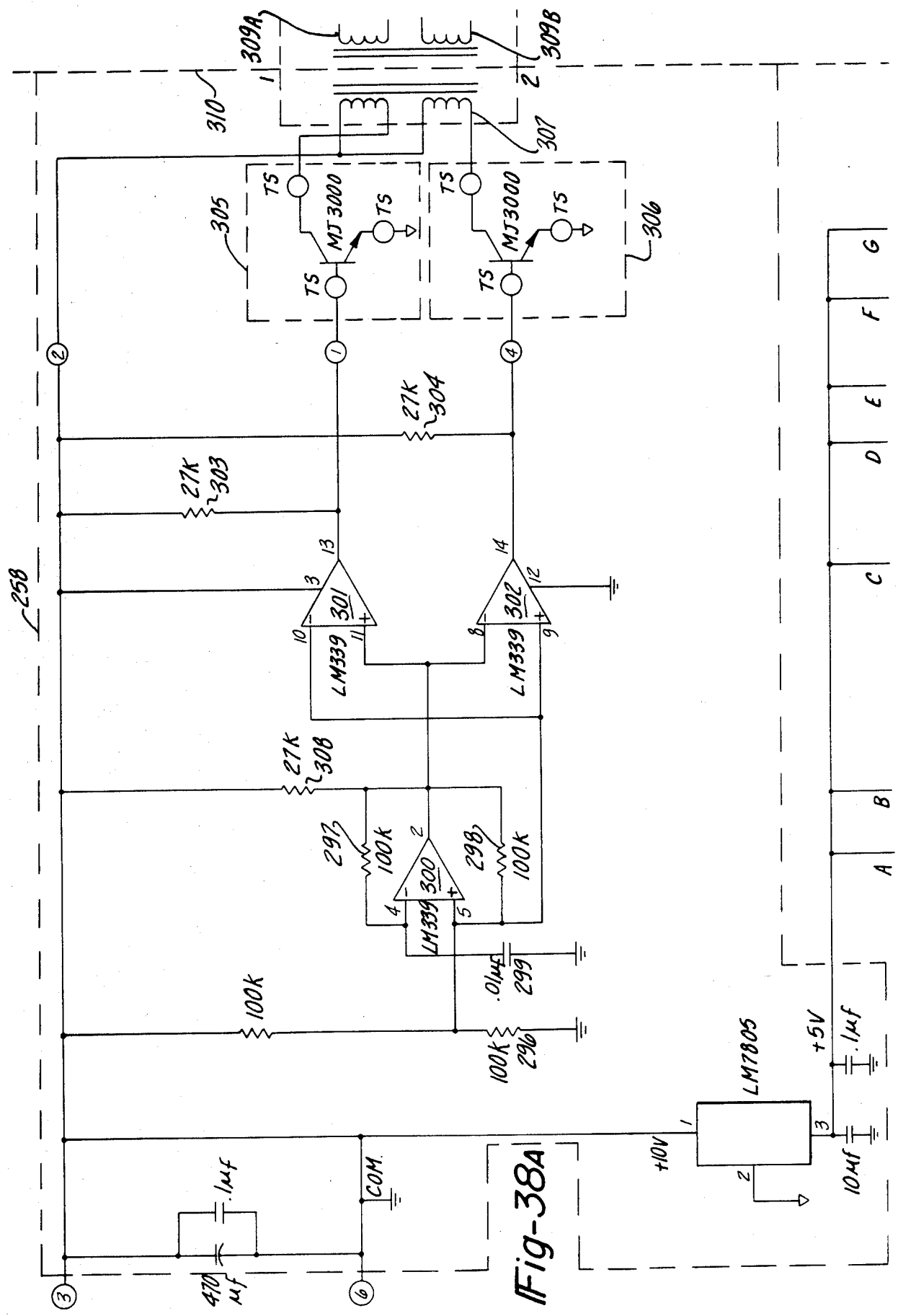
Figure 38B:
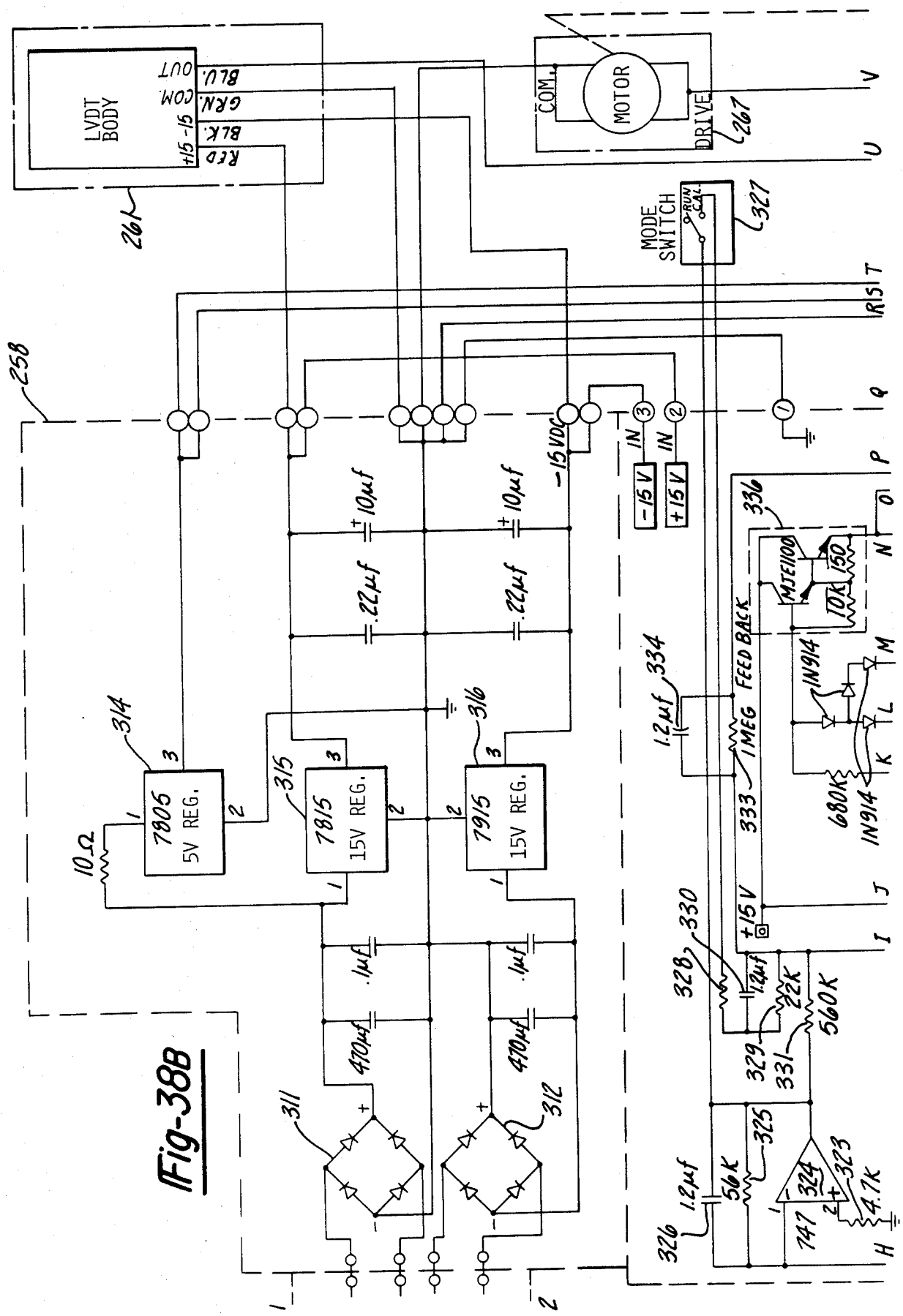
Figure 38C:
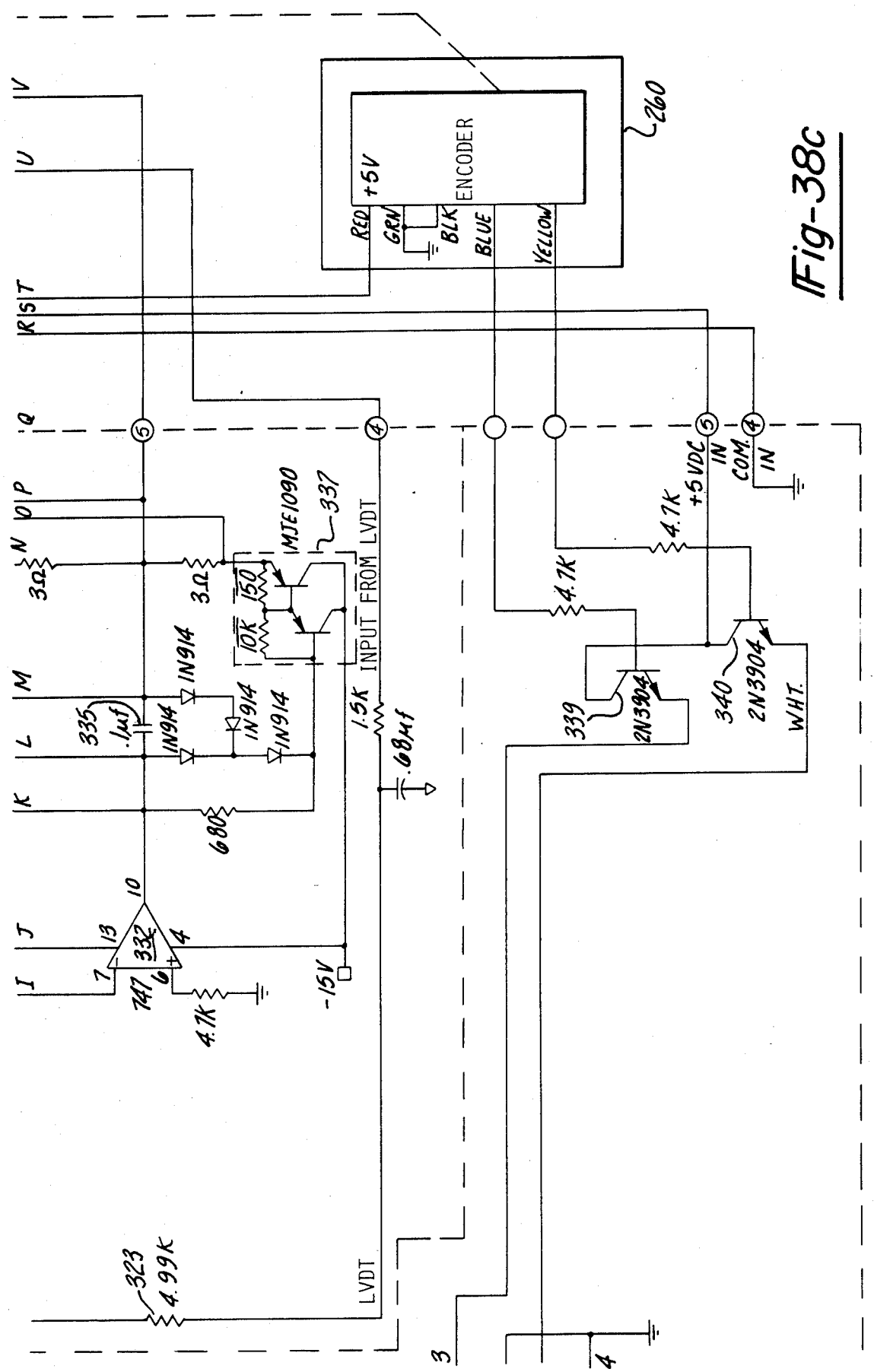
Figure 38D:
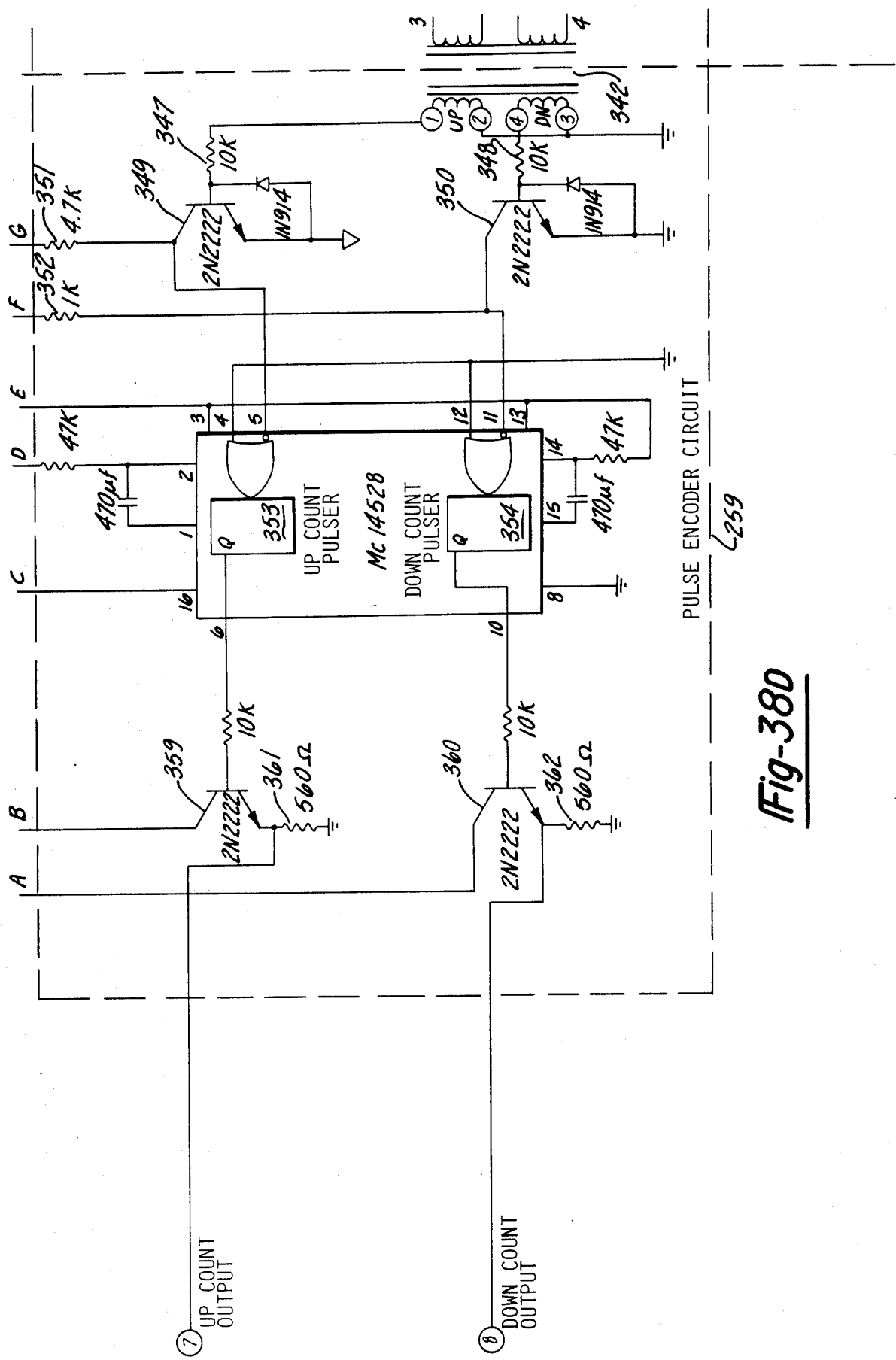
Figure 39B:
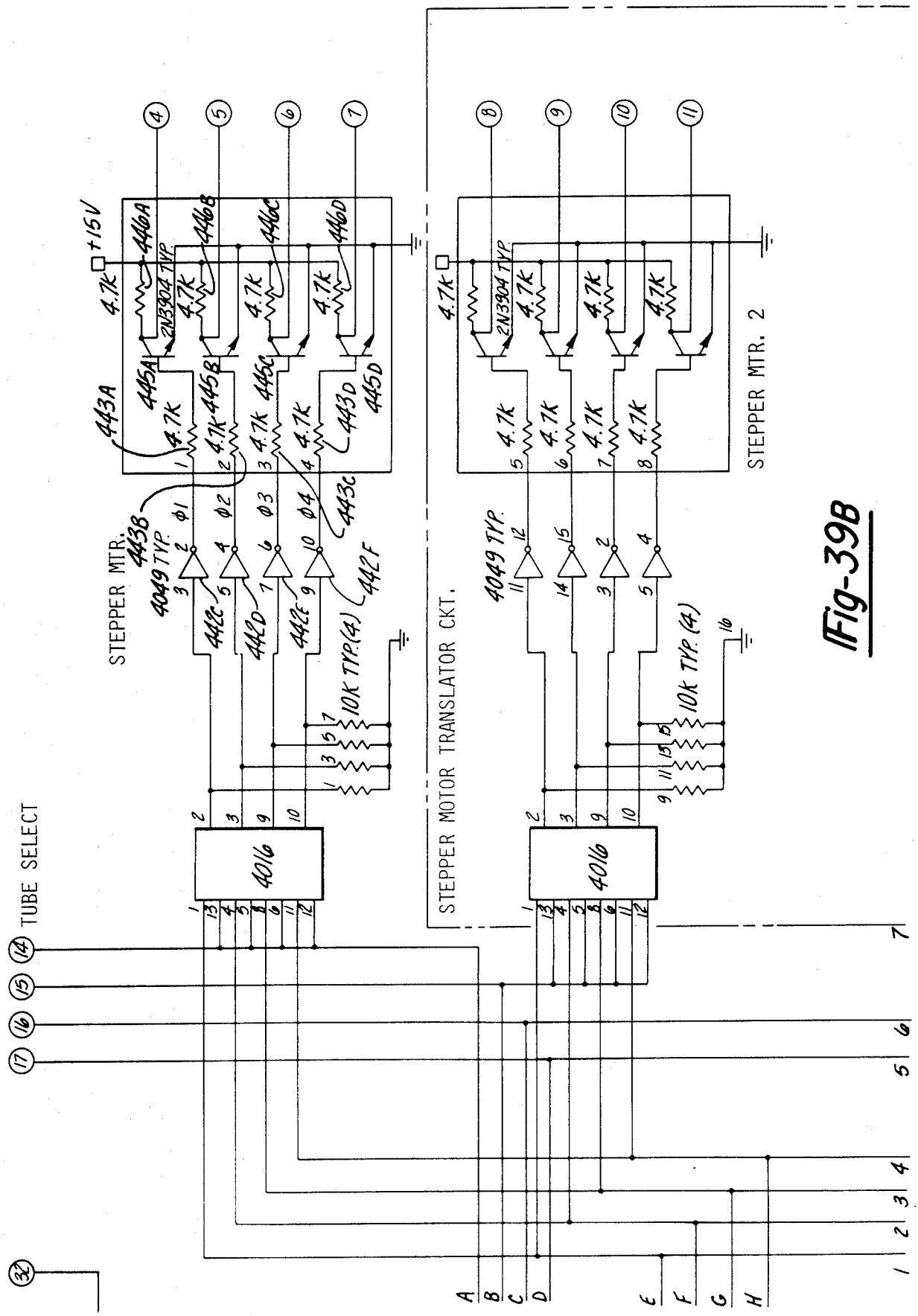
Figure 39C:
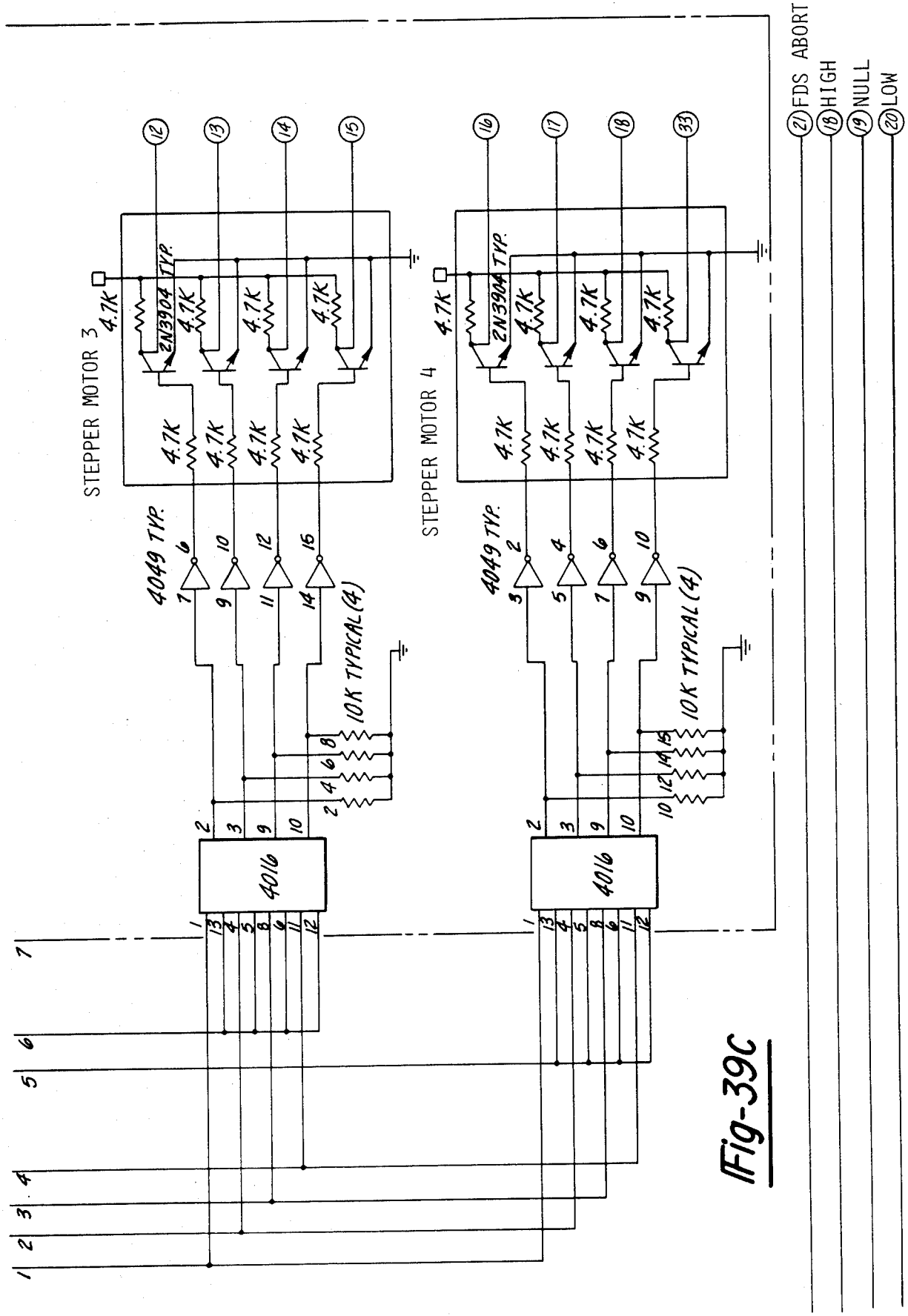
Figure 39D:
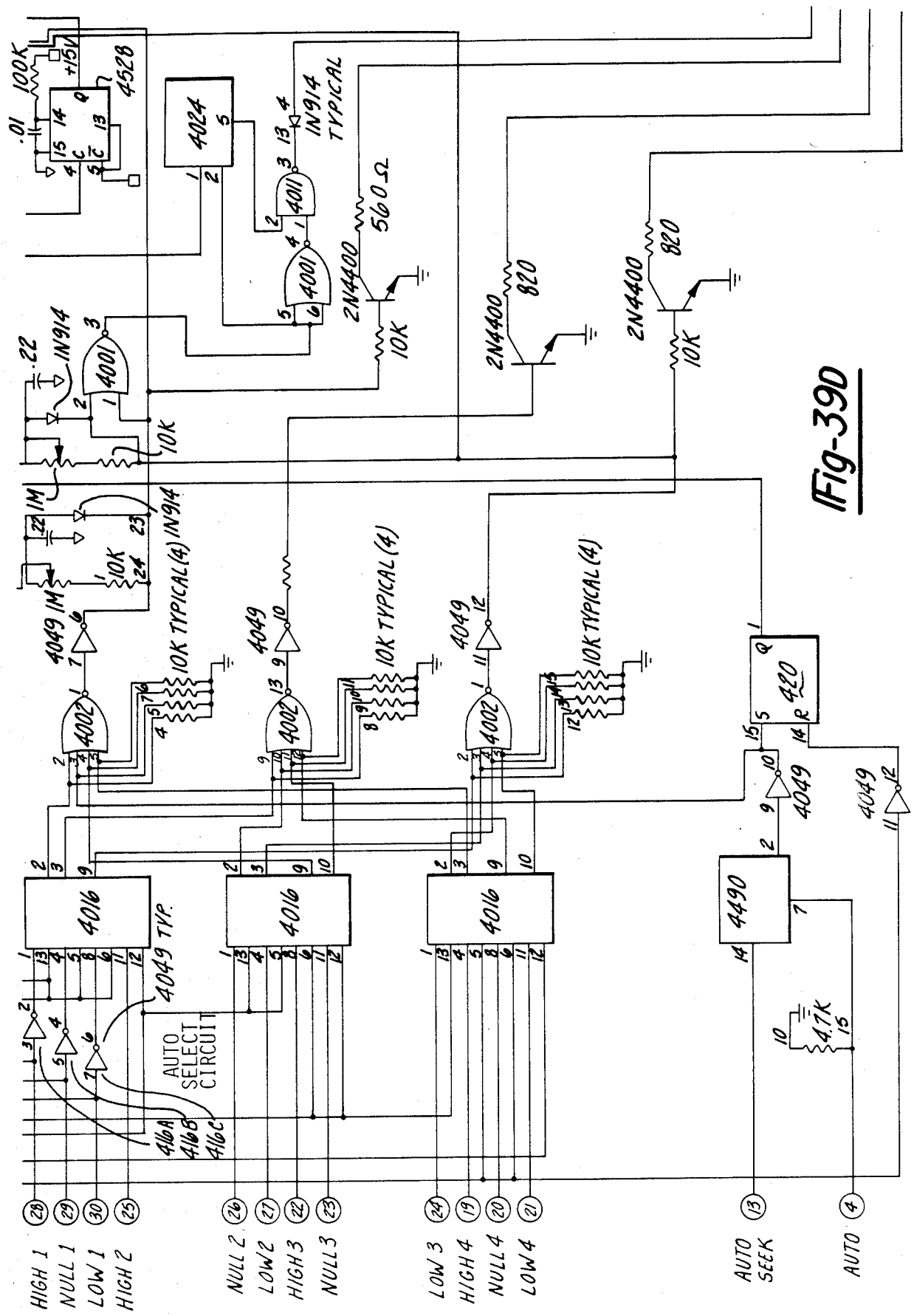

FIGS. 37A–37C are schematic diagrams of the circuits shown in FIGS. 36A and 36B as actually built.

Figure 22A:
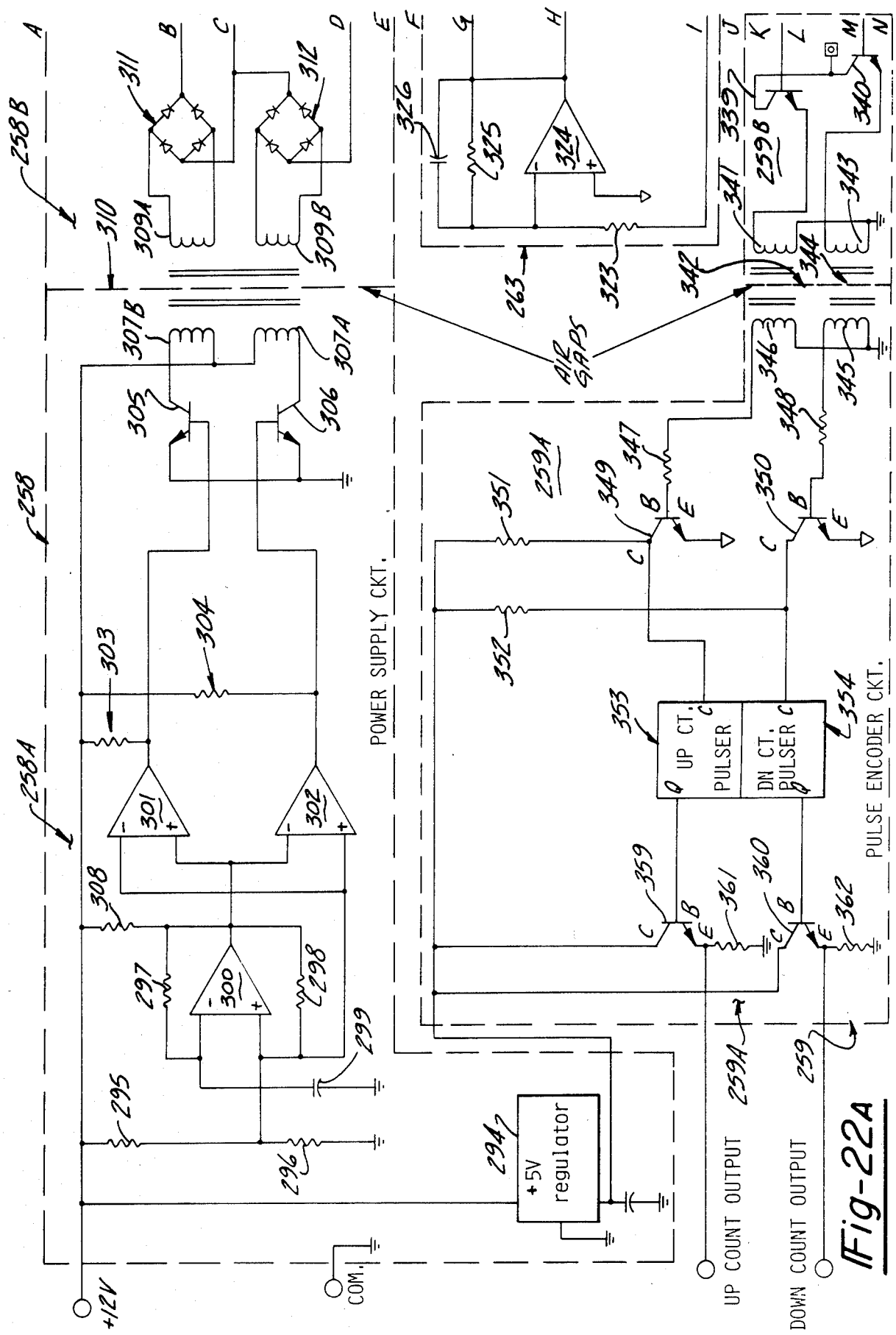
FIG. 22A is an electrical diagram of a portion of the power supply circuit, the pulse encoder circuit and a portion of the poise control circuit shown in FIG. 10.

FIGS. 38A–38D are schematic diagrams of the circuits of FIGS. 22A and 22B as actually built.

Figure 27B:
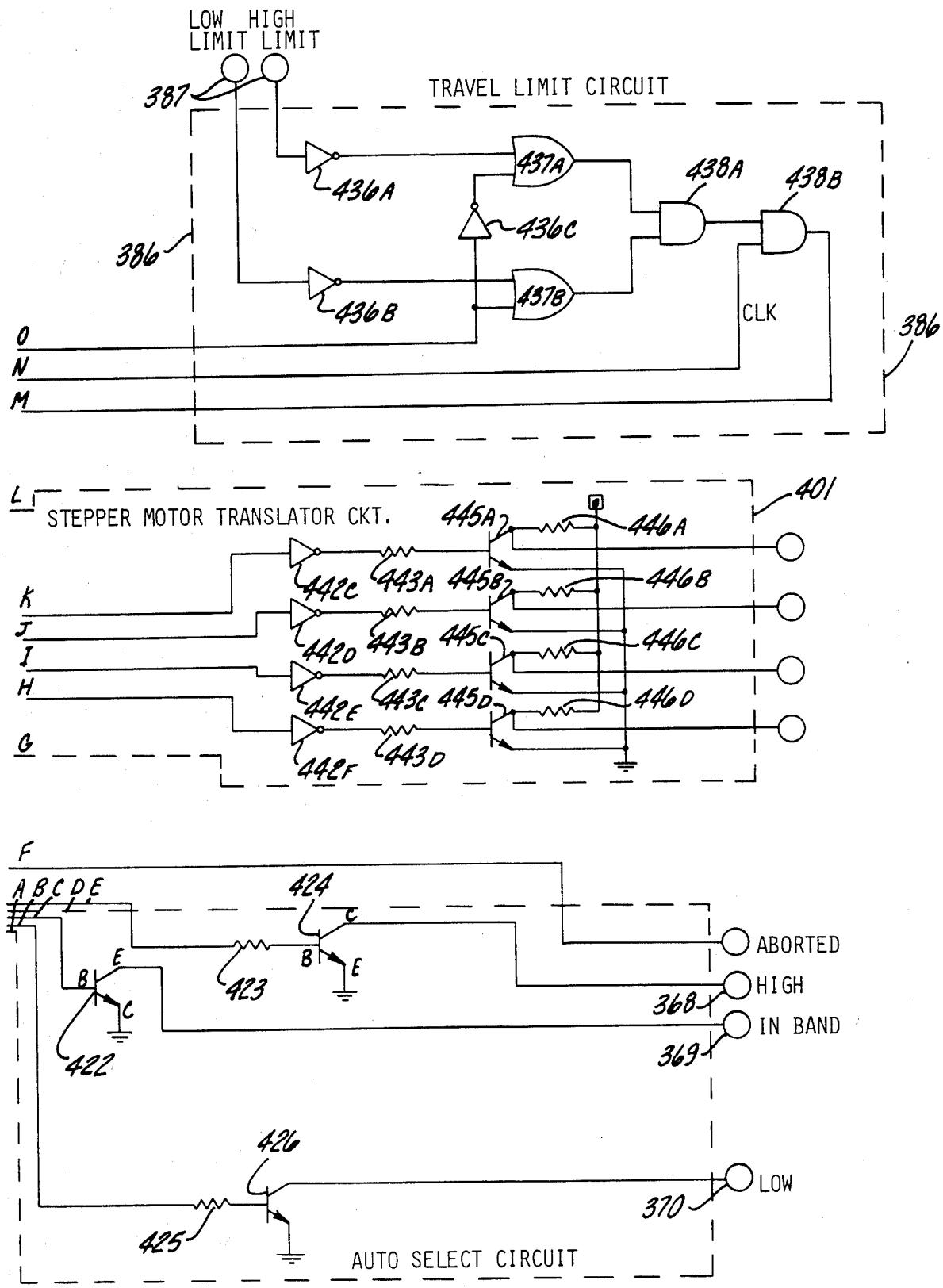
FIG. 27B is an electrical diagram showing the travel limit circuit and a continuation of the stepper motor translator circuit and auto select circuit shown in FIG. 7.

FIGS. 39A–39D are schematic diagrams of the circuits shown in FIGS. 27A and 27B as actually built.

Figure 21A:
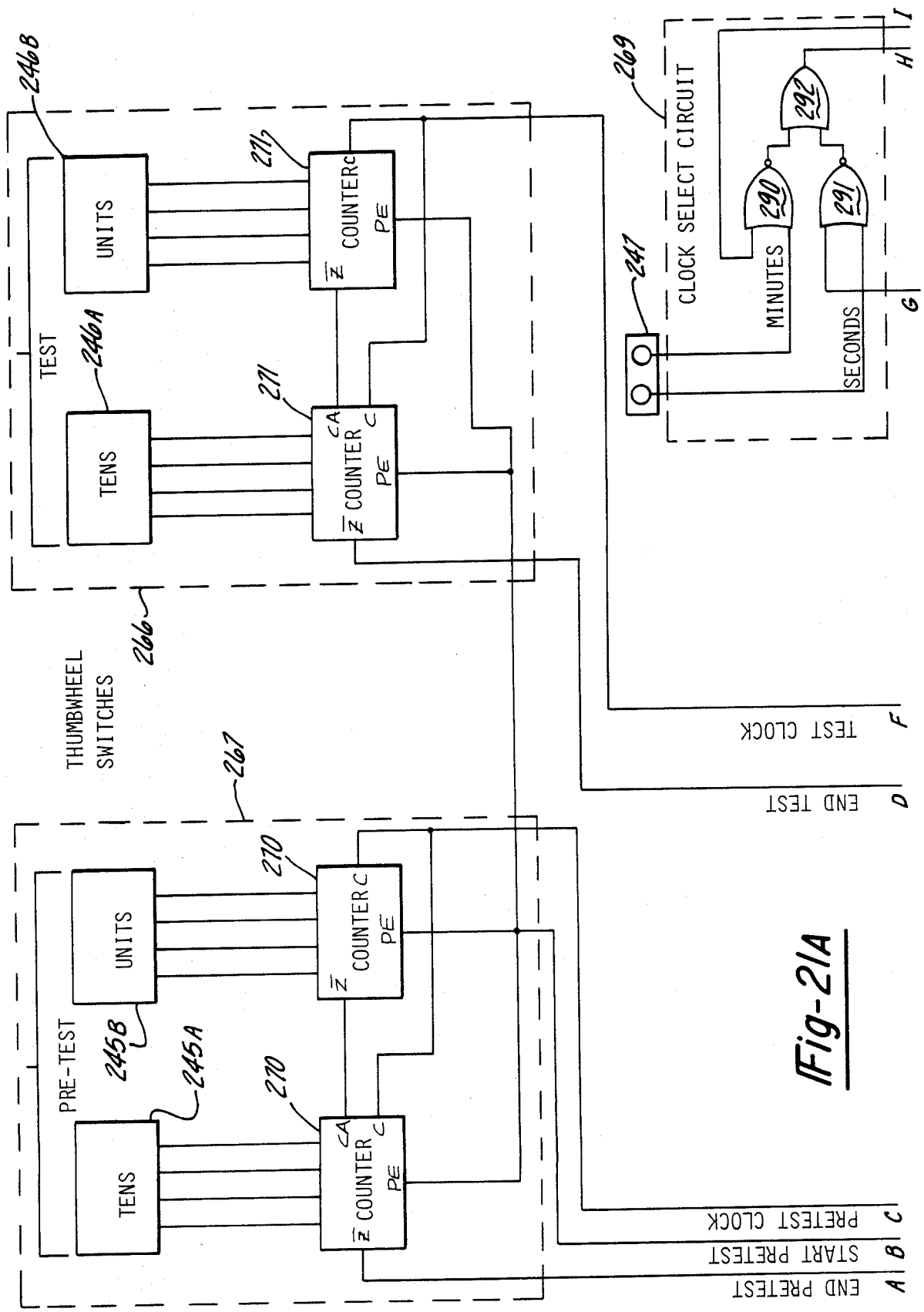
FIG. 21A is a circuit diagram of the pretest test and clock select circuits of the time weight scale control and timing circuit of FIG. 8.
Figure 40A:
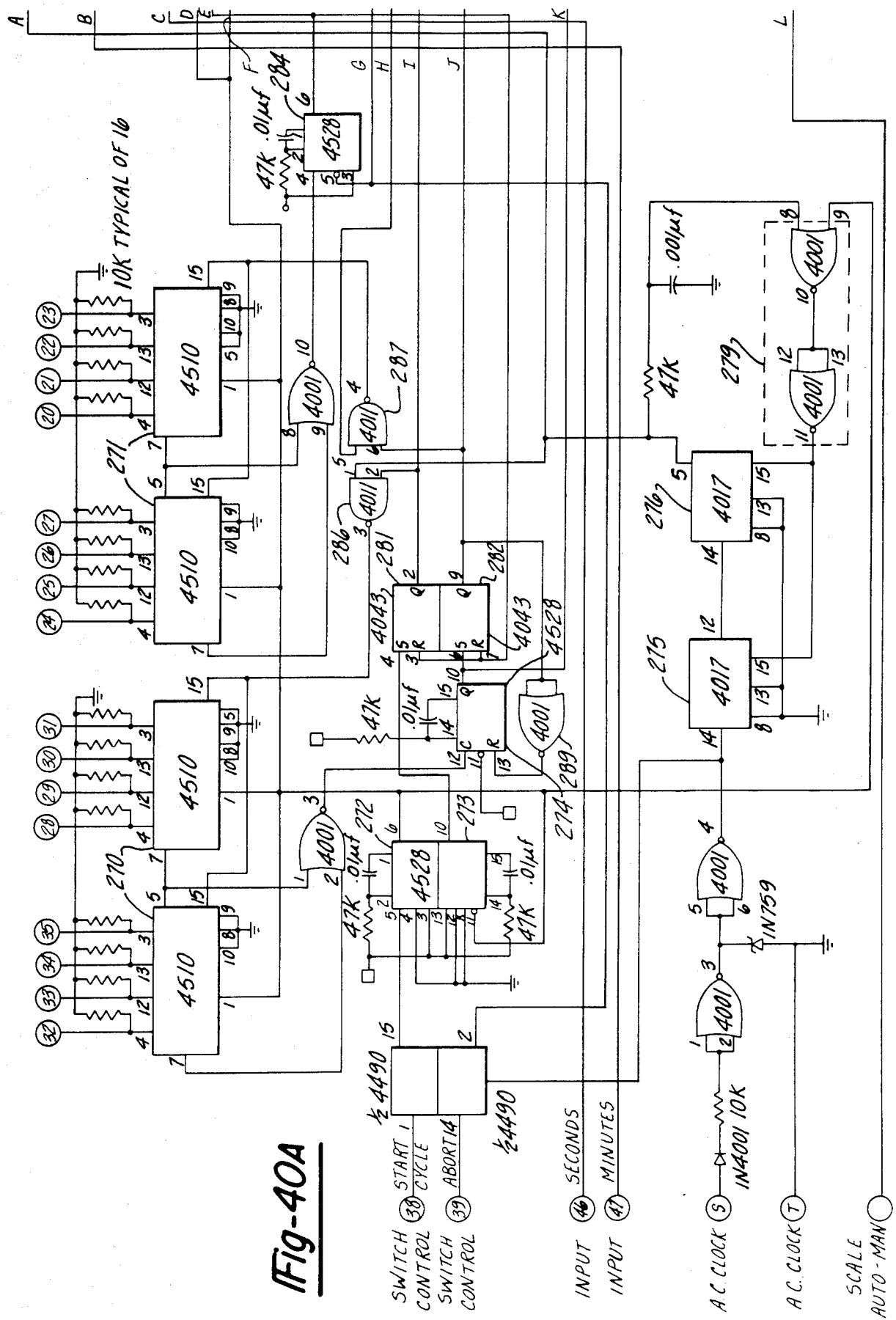

FIGS. 40A and 40B are schematic diagrams of the circuit of FIGS. 21A and 22B as actually built.

Figure 41:
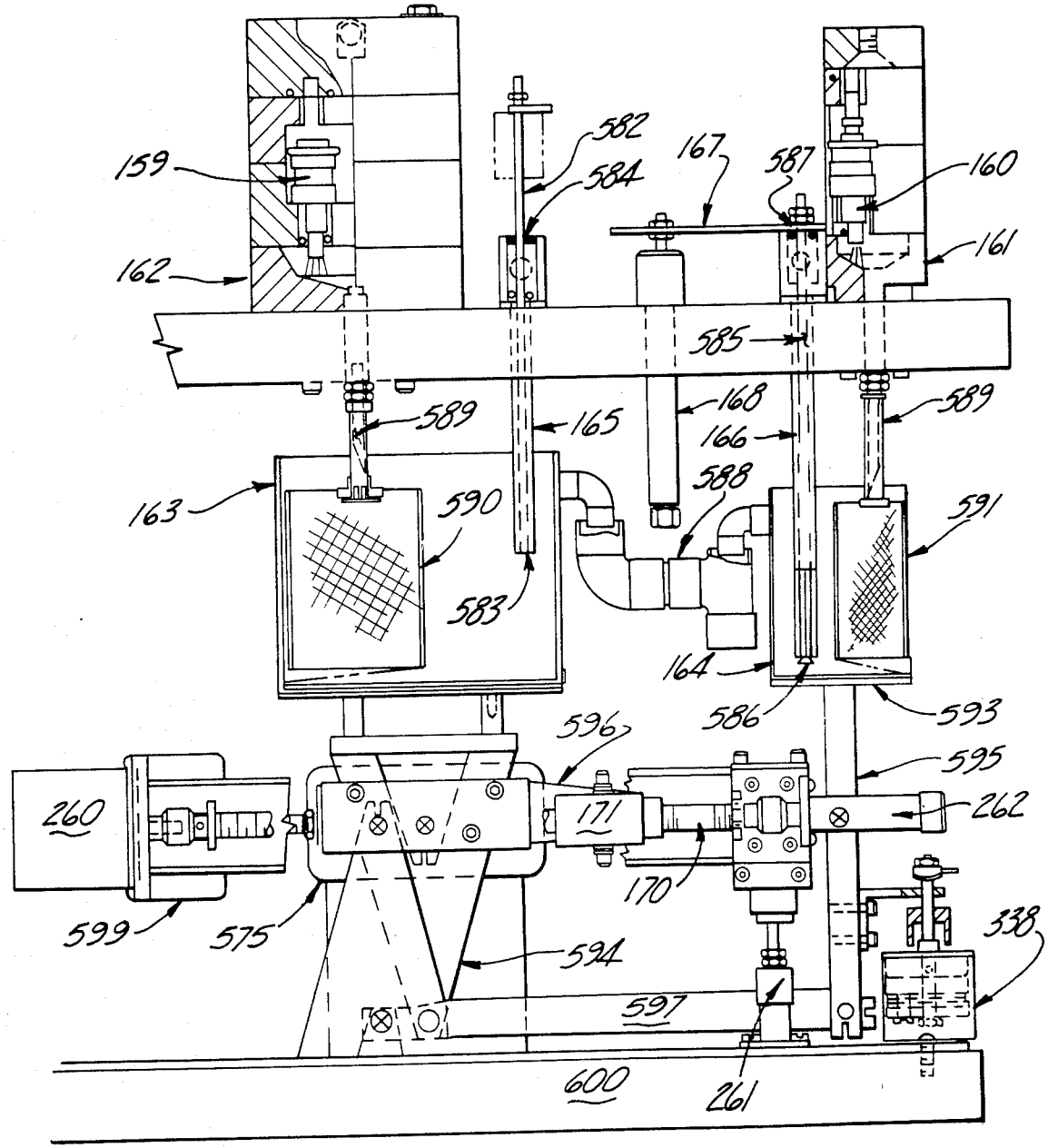

FIG. 41 is an elevational view of the weigh scale used in the present invention, and also showing the injectors used to supply the fuel to the weigh scale, as well as the extraction tubes used to remove the fuel.

Figure 42:
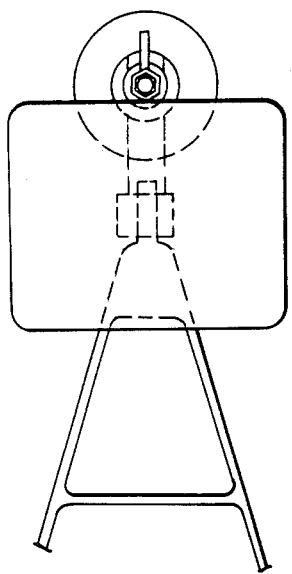

FIG. 42 is a partial plan view of the weigh scale of FIG. 41.

Figure 43:
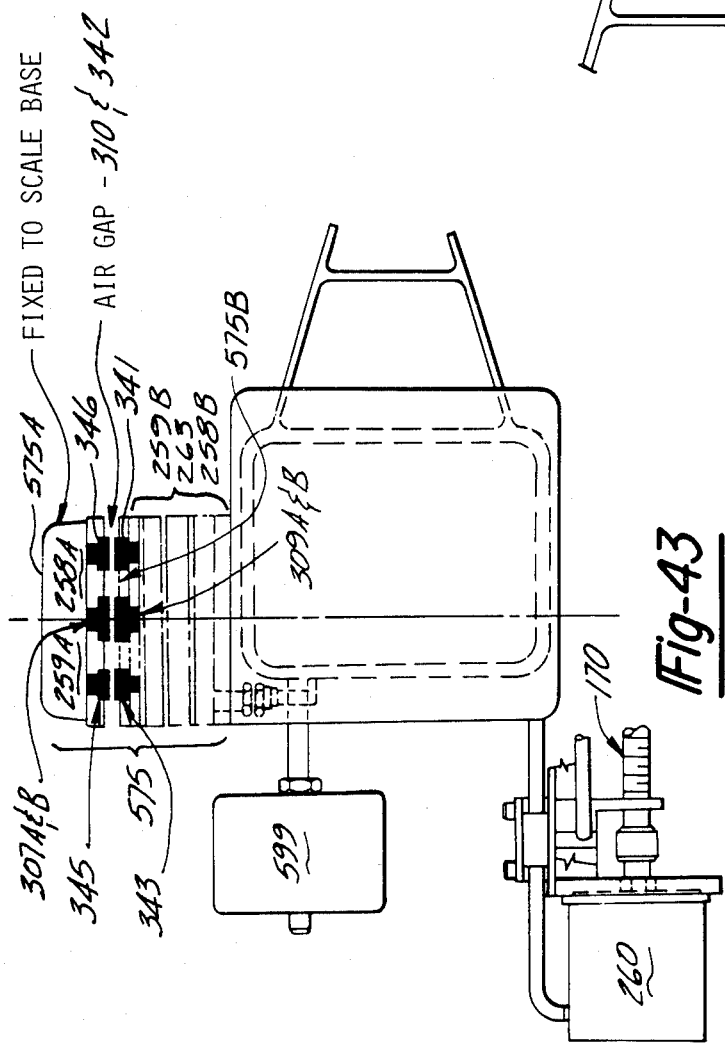

FIG. 43 is a partial plan view of the weigh scale shown in FIG. 41 showing the optical encoder, air gap transformer, counterweight and ball screw.

Figure 44:
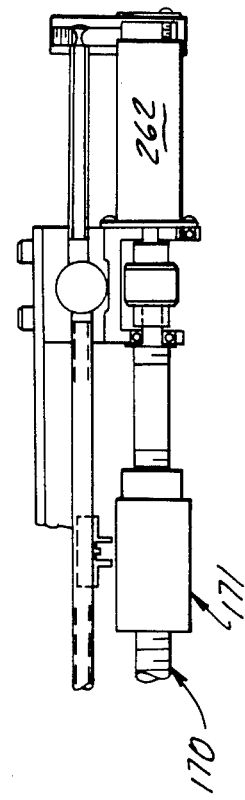

FIG. 44 is a partial elevational view of the weigh scale illustrated in FIG. 41 showing the drive motor, the ball screw and the movable poise weight.

Figure 45:
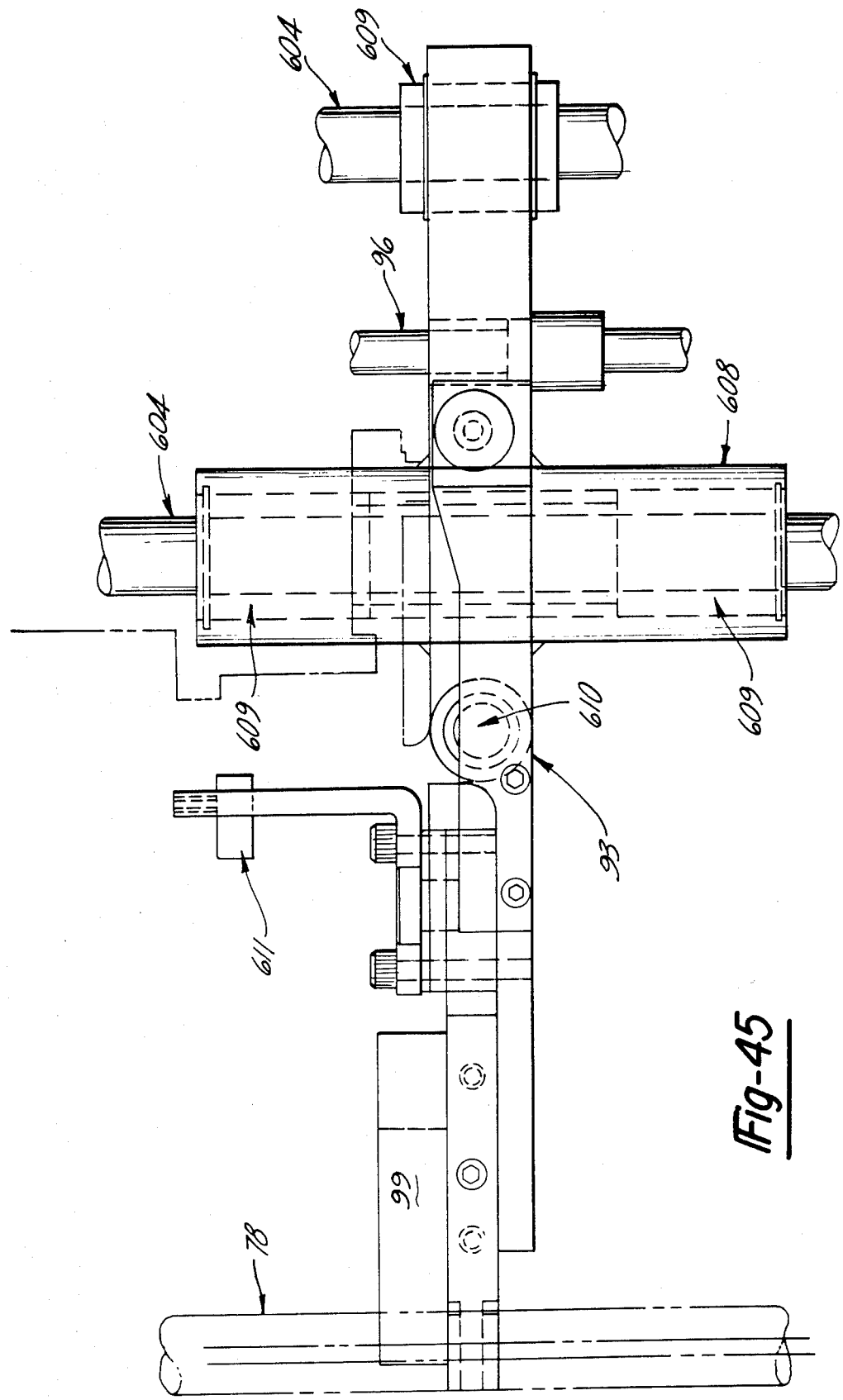

FIG. 45 is a partial elevational view illustrating the float follower utilized in the present invention.

Figure 46:
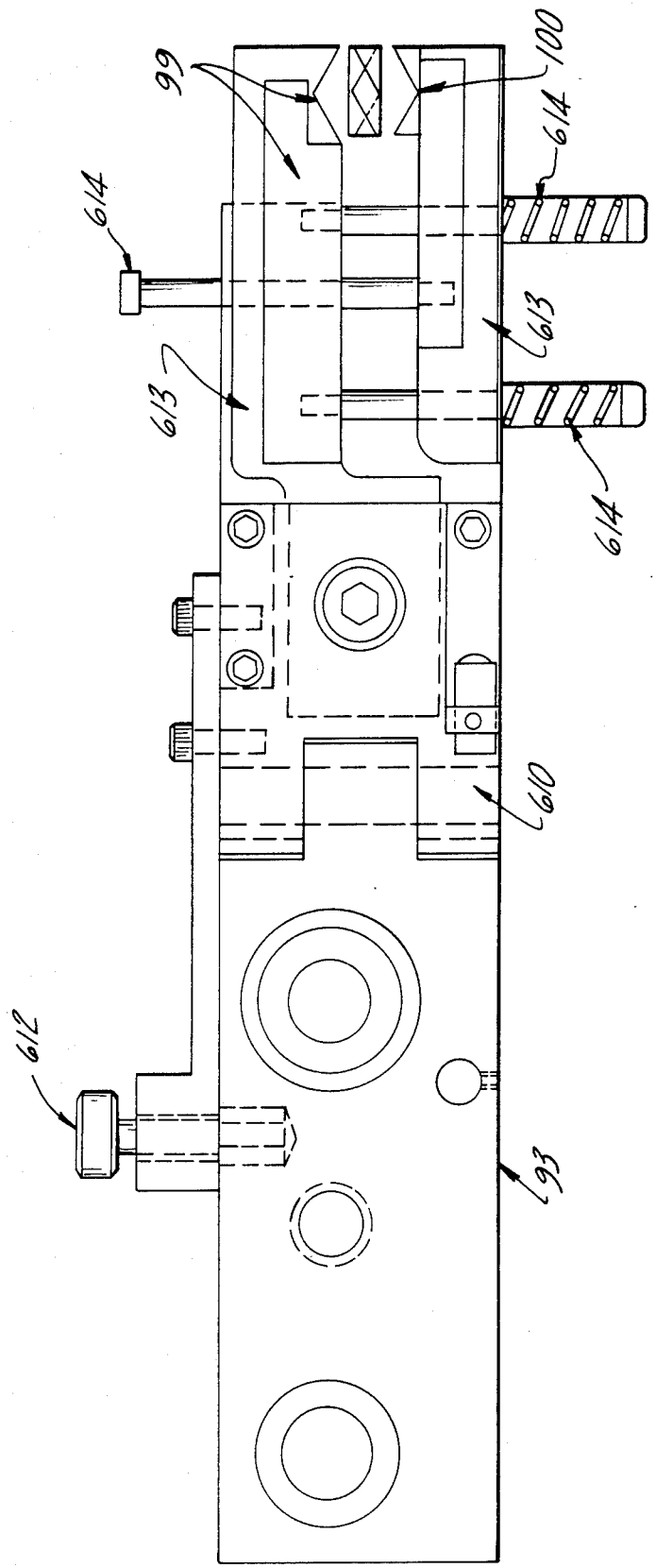

FIG. 46 is a plan view of the float follower shown in FIG. 45.

Figure 47:
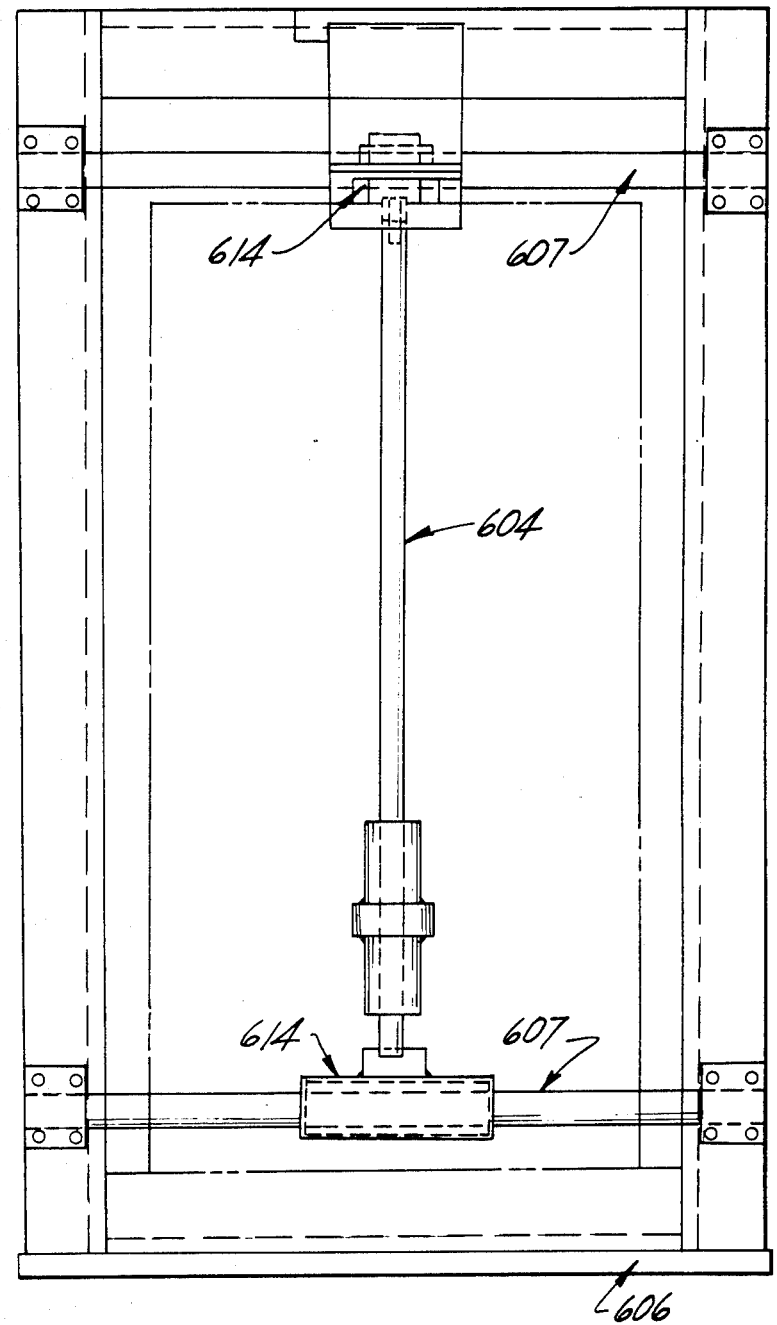

FIG. 47 is a front elevational view of the apparatus used to move the float follower illustrated in FIGS. 45 and 46.

Figure 48:
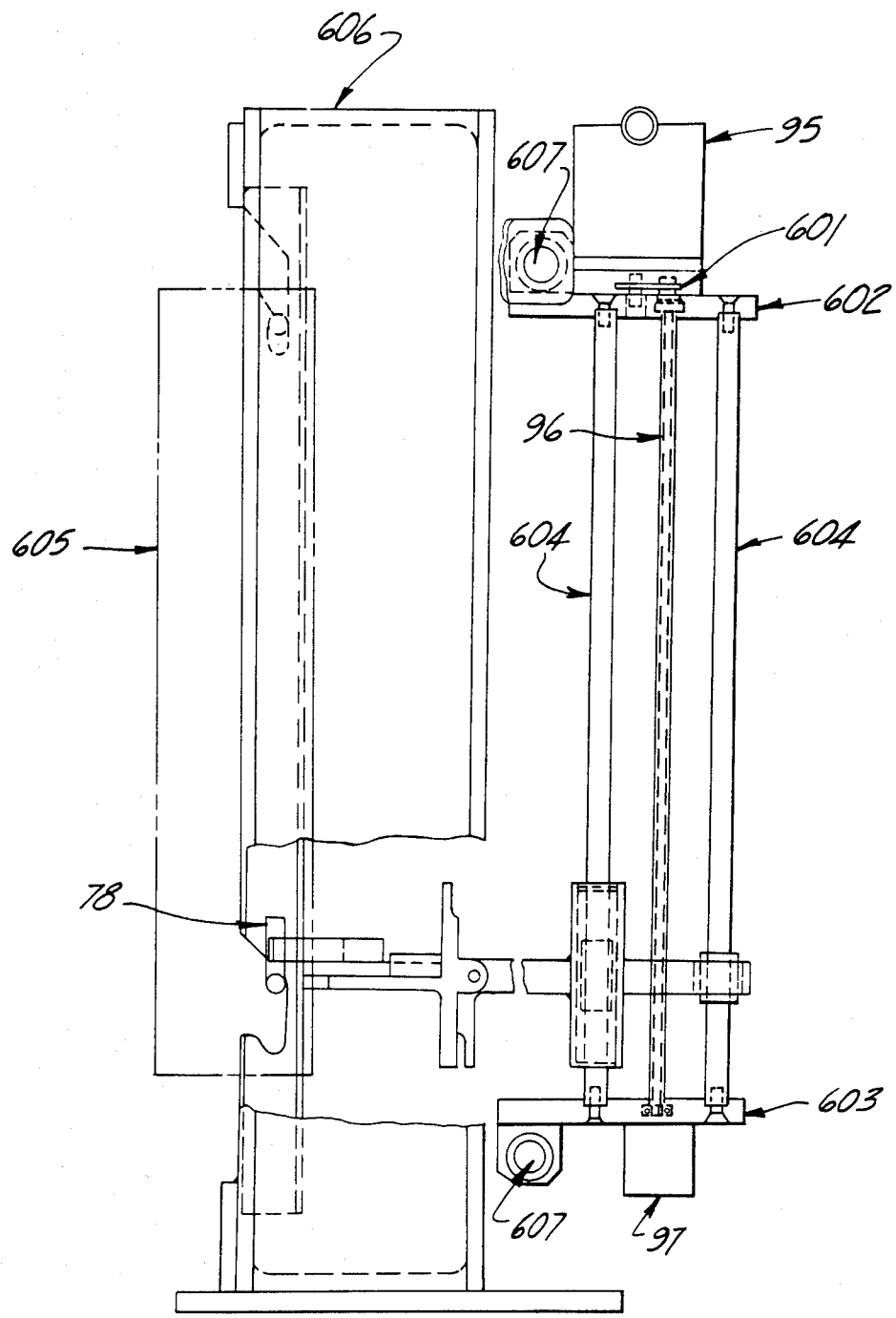

FIG. 48 is a side elevational view of the apparatus shown in FIG. 47.

Figure 49:
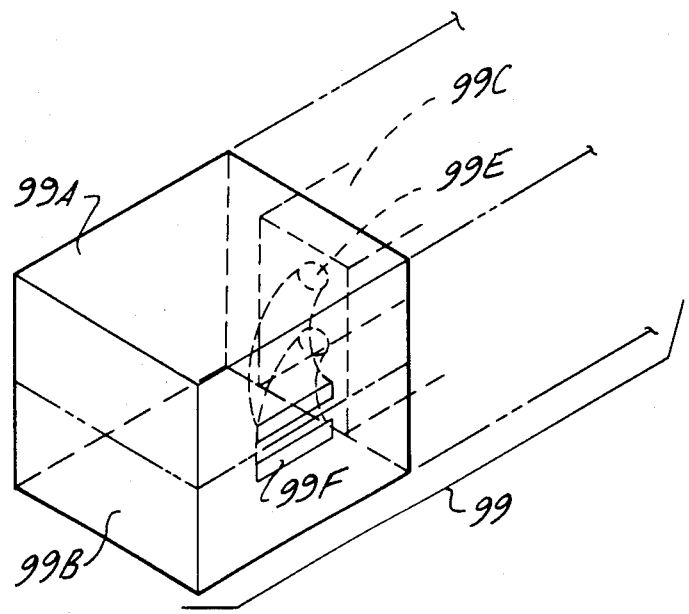

FIG. 49 is a perspective view showing a portion of the receiver.

Figure 50:
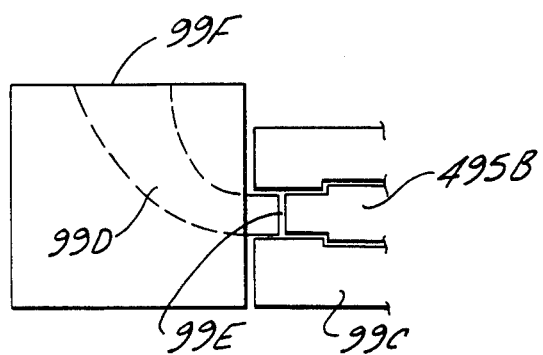

FIG. 50 is a plan view of the receiver shown in FIG. 49.

It is to be understood that the present invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for purpose of description, and not of limitation.

Our flow meter calibration system can be used for any flow rate, including the very large flow rates which prior art calibration systems were used for, and still be well within the scope of the present invention. We only wish it known that, as stated in the objects of our invention, we encountered and solved many problems long standing in the art because our particular application was for the minute flows which are needed in the present day technology.

To complete our solution to the problem of accurately measuring low flows, we were determined to control the ambient variables to a closer degree than was heretofore done in the prior art. As already mentioned, since it is volumetric flow which is being measured, the calibration preferably should take place in a temperature controlled room, and this involves the supplying of temperature control systems well known in the art.

We have also provided for humidity and pressure control to increase the accuracy of this system, although, of course, one could use the system without such temperature, pressure and humidity controls if desired.

Figure 1:
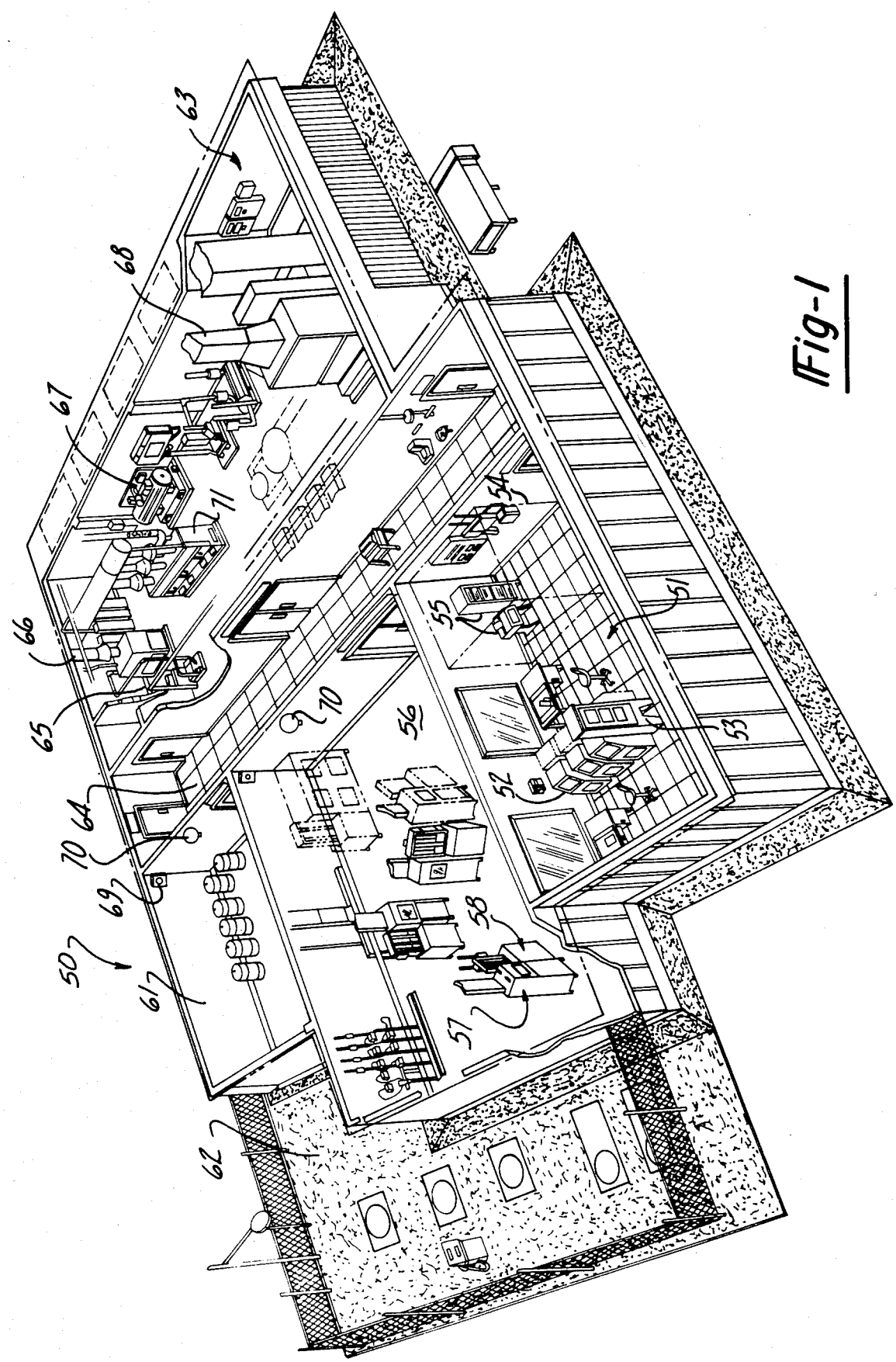
FIG. 1 is an artist's rendition of a laboratory installation containing one or more constructions embodying our improved flow meter calibration system.

In order to provide the constant temperature and humidity which our system needs to operate properly, we prefer to have a special installation for its use, although it is to be understood that this certainly is not necessary. We provide, as shown in FIG. 1, a building having several rooms specially adapted for use in calibrating flow meters. Such building may be generally referred to as the calibration facility 50.

In the calibration facility, one may find such rooms as a control room, generally designed by the numeral 51, having therein (referring to FIG. 2) one or more power supplies 53, and one or more control consoles 52 used in our invention, and to be more fully described below. The control room 51 may also contain, if it is desired to operate our system by computer control, a isolated computer room 54 having a computer 55 enclosed therein.

Figure 3:
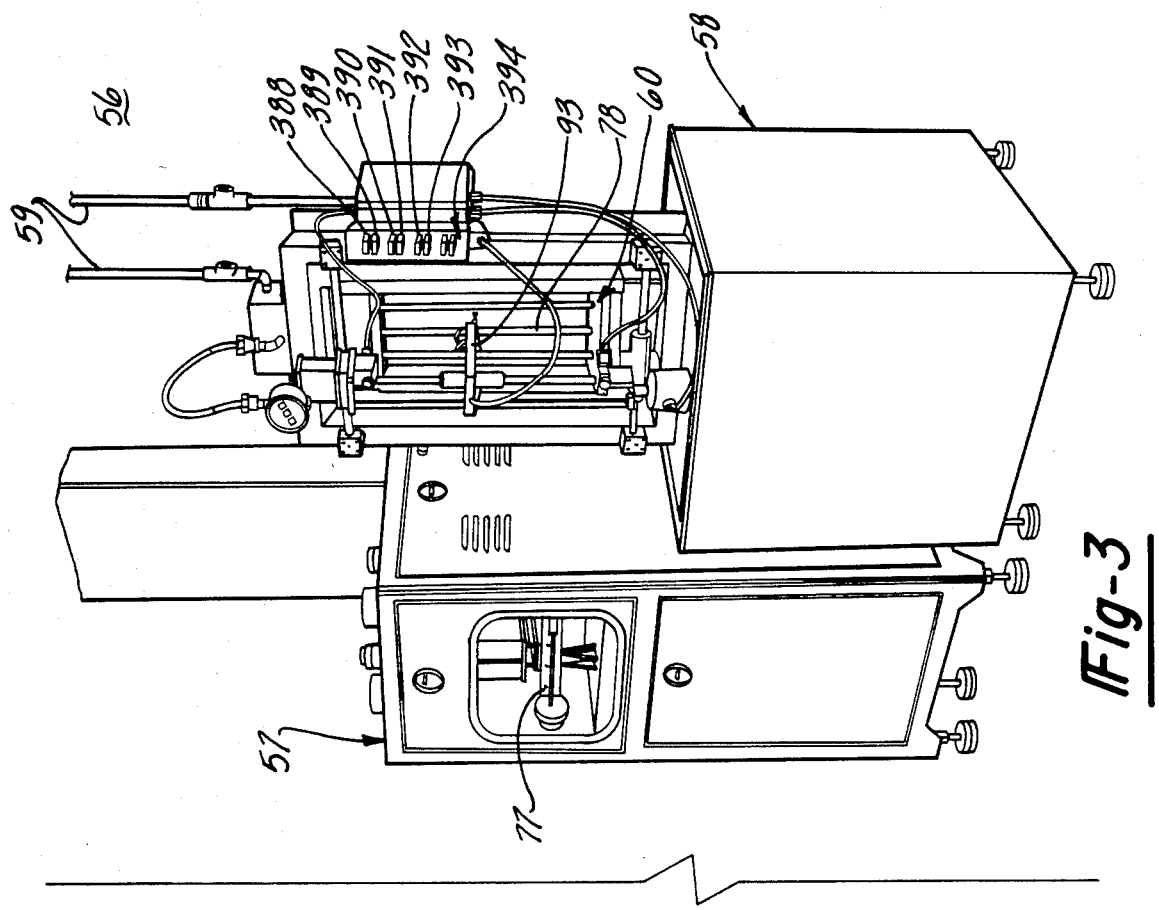
FIG. 3 is a perspective pictorial view of the actual calibration equipment embodying the construction of the present invention.

Preferably adjacent the control room 51 is a flow room, generally designated by the numeral 56, containing one or more calibration apparatus generally designated by the numeral 58, and one or more weigh scale apparatus, generally designated by the numeral 57 (see FIG. 3).

Figure 2:
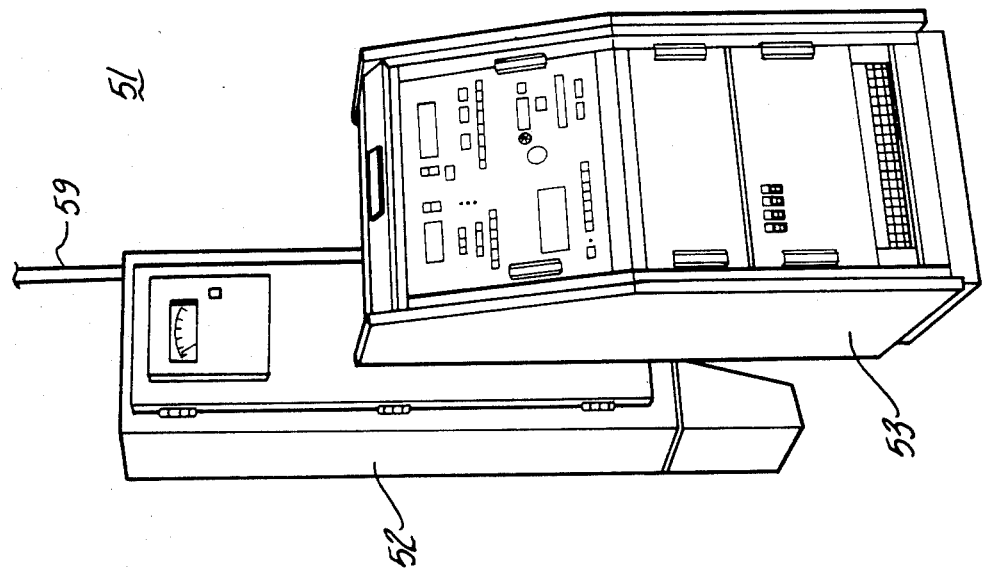
FIG. 2 is a perspective pictorial view of the electronic control instrumentation used to operate constructions embodying our invention as they may be installed in the control room of FIG. 1.

As illustrated in FIGS. 2 and 3, suitable electrical connections indicated by the numeral 59 are made between the power supplies and control consoles, and the calibration and weigh scale apparatus. Depending on the type of flow meter being calibrated and the fluid which is being used to calibrate the flow meter, it is well within the scope of the present invention that some type of special electrical connections may be needed. For example, some types of fluid used to calibrate a glass tube flow meter, such as indoline or gasoline, are rather volatile and thus flammable, and all electrical connections may need to be made to code, which requires them to be explosion proof.

Since how to make these electrical connections is known to those skilled in the art who must deal with these codes, and such connections are not always necessary depending on the type of flow meter being calibrated and the fluid being used, it is not felt necessary to describe such connections further herein. It should be understood though, that they should be used with our invention where required.

Since it is contemplated by the inventors that their system often will be used with such fluids as indoline and gasoline, even though the specific electrical connections between the control room and the flow room have not been shown with specific types of interlocks which may be required by local codes, the system has been illustrated with some common safety features which it is believed will be needed. For example, the electrical connections 59 are shown enclosed in conduit, and the calibration facility 50 would be equipped with a fire extinguisher dump system (such as Cardox). Also, the fluid to be used in the system would be stored in a separate fuel room 61, with excess fuel being stored in an underground bulk storage yard 62. All of the mechanical equipment necessary to provide temperature and humidity conditioned air and fuel at as close a constant temperature as possible is kept in a separate mechanical room generally designated by the numeral 63, with a hallway 64 provided between the mechanical room and the control room, fuel storage room and flow room.

In the mechanical room 63, depending on the particular needs of the user, will be various equipment. Contained in the mechanical room 63 are such things as a water purification system 65, a humidity control system 66, a heating system 71, an air compressor 67 and an air conditioning package 68.

For safety purposes, there are illustrated a number of flash detectors 69 and Cardox discharge bottles 70, which would be in the flow and fuel rooms.

Referring again to FIG. 3, in accordance with our method, the operator of the system embodying our invention will set, with the aid of the control panel 79 mounted on the control console 53, a constant flow of fluid to one of the glass tubes 78 in the glass tube flow meter 60, with the aid of the weigh scale 77. This will cause the float follower 93 to follow the float (not shown) in the glass tube 78 to a certain height which can be measured from a fixed reference point, and then when the flow is calculated for a fixed period of time, for example, one minute, the flow rate which the operator established will be known, and the distance of the float from a fixed reference point on the tube 78 will have been established.

Subsequent to this, a scale can be made having as a zero point the fixed reference point on the tube, and the different flows can be marked on the scale at different points from the fixed reference point, which will then correspond exactly to the position which the float was at when the flow was established by the system operator.

In a method to be more fully described later, the operator has various ways to set the float in the tube at different heights by varying the flow rate. Since we use injectors in our invention to establish the rate of flow through the flow tube and the weigh scale, the operator may turn on one or more of these injectors by means of the injector switches 81 (FIG. 4) having thumbwheels 81A thereon. When the injectors are off, the readings on any of the switches will read 00, and turning the thumbwheels to a reading from 01 up to 99 will tell you the percentage of time that the particular injector is on.

Also, the operator has the choice of varying the frequency of the injectors themselves by varying the setting on the period switch 84. Also available to the operator is a means for adjusting the pressure of the fluid flowing through the flow meter by means of the pressure adjust potentiometers 83 and 83A.

Before disclosing the preferred method in more detail, it is necessary to have a greater understanding of the apparatus which is needed to supply the temperature and humidity conditioned air, and the temperature conditioned fuel, to our flow meter calibration system.

Referring now to FIGS. 1, 5, 5A, 5B, and 5C, there is shown a fluid diagrammatic view of our entire flow meter calibration system. The system itself is divided into five subsystems, and these can be identified as the supply subsystem, generally designated by the numeral 85, the control subsystem, generally designated by the numeral 86, the monitoring subsystem, generally designated by the numeral 87, the weigh scale subsystem, generally designated by the numeral 88, and the flow detection subsystem, generally designated by the numeral 89.

It should be understood, as previously described, that our invention can be used to calibrate many types of flow meter devices. Although the preferred embodiment is described for use in calibrating a glass tube flow meter, which is the most common type of flow meter presently used, it can also be used to calibrate turbine flow meters, single or multiple orifice flow meters, and linear mass flow meters. For this reason we have labeled the box in FIG. 5B a flow detection subsystem, generally designated by the numeral 89, so that the flow detection subsystem in FIG. 5B could be replaced by the various flow detection subsystems shown in FIGS. 23, 24 and 25. For example, a system for detecting flow through a turbine flow meter carries numeral 89B, while a system used for a single or multiple orifice flow meter carries numeral 89C, and a system used for a linear mass flow meter carries numeral 89D.

Figure 5A:
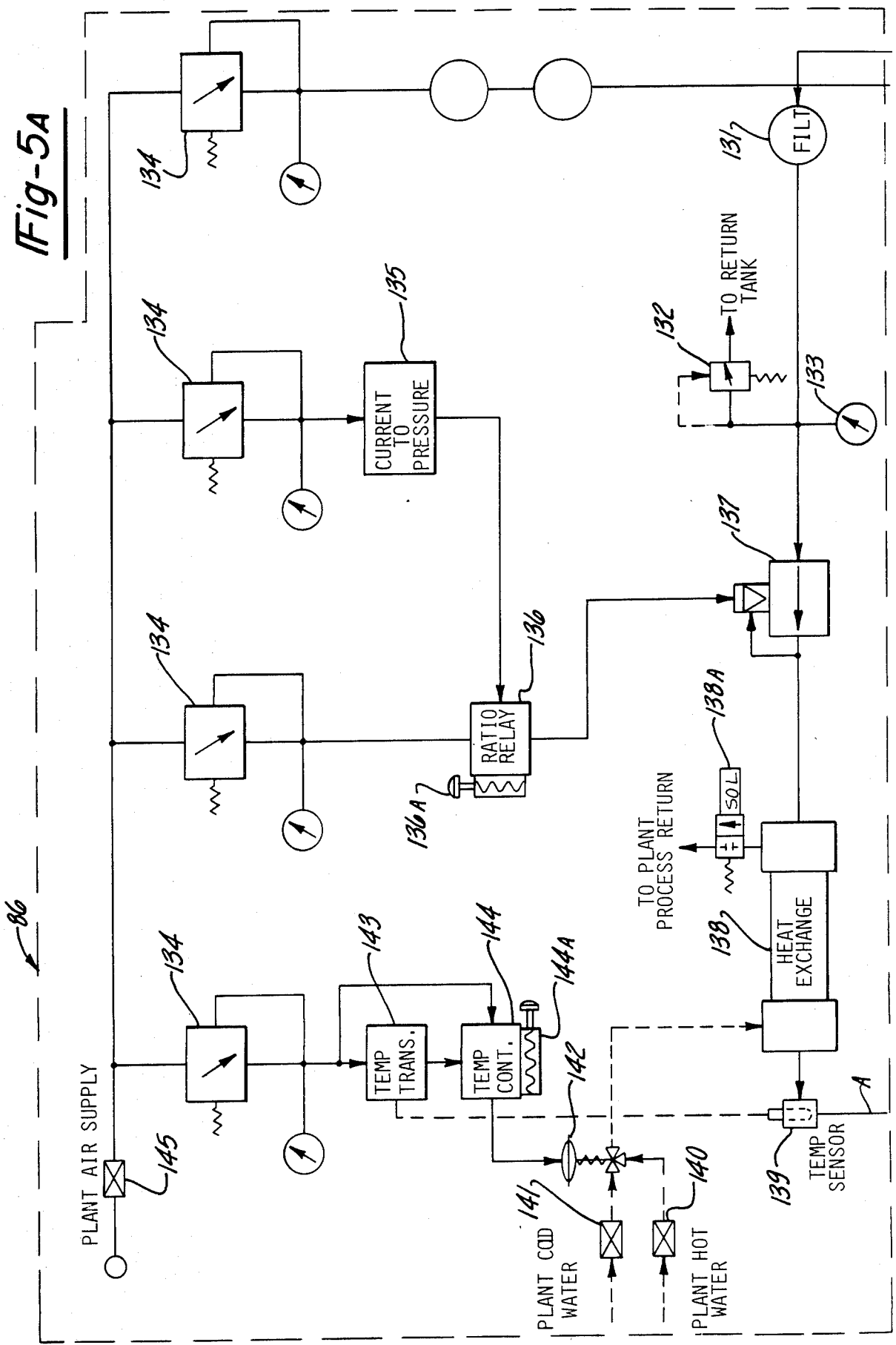
FIG. 5A is a diagrammatic view showing the control subsystem of our present invention which supplies means for controlling the plant air supply, the plant water supply and the fuel supplied to the present invention.
Figure 5B:
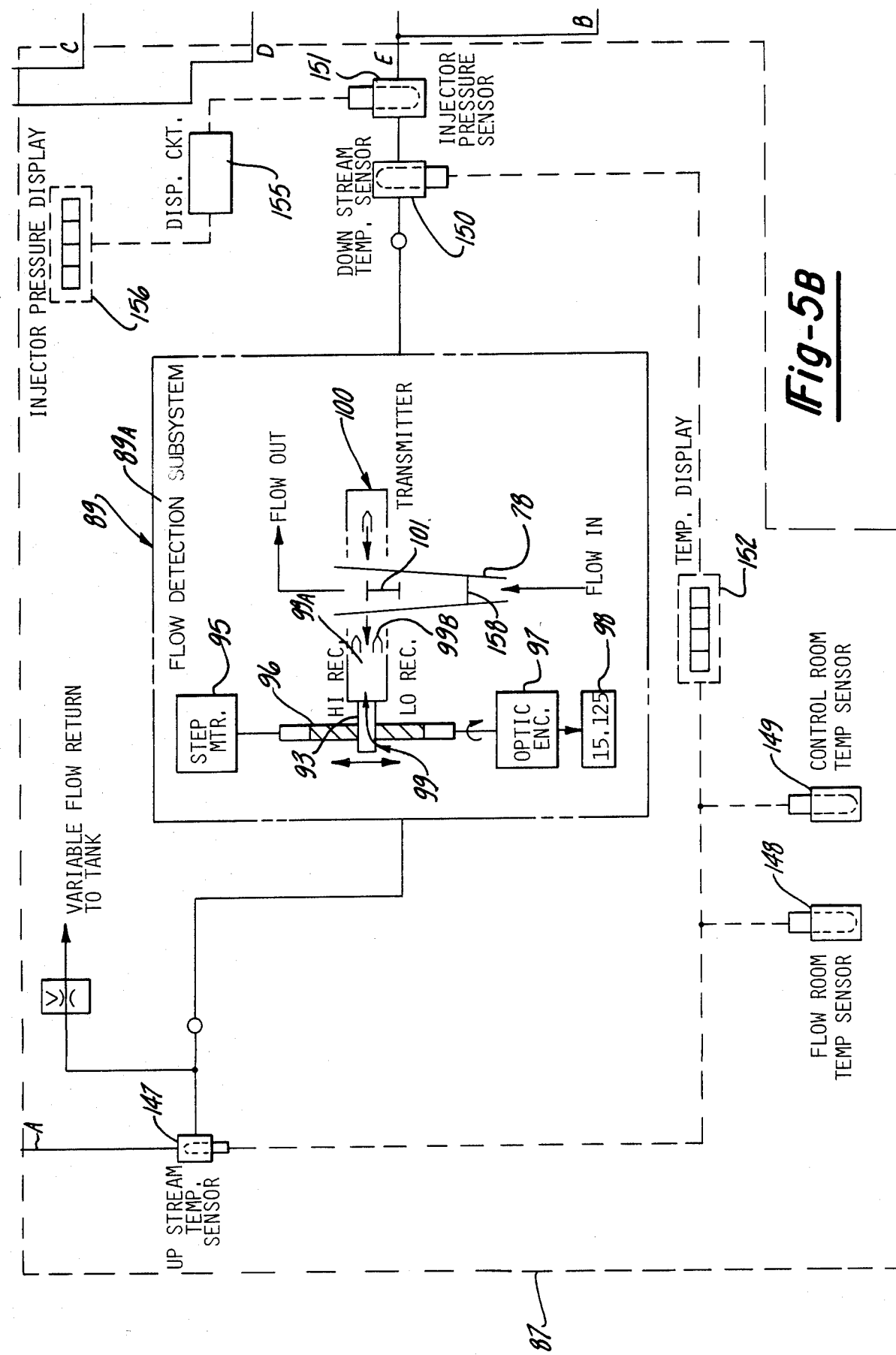
FIG. 5B is a diagrammatic view showing the detection subsystem of the present invention, which supplies a means for detecting the current operating condition of the flow meter being calibrated, and the monitoring subsystem, which supplies a means for monitoring the physical condition of the media being calibrated.

Referring to FIG. 5B, when, as in the preferred embodiment, our invention is to be used to calibrate a glass tube flow meter, the flow detection subsystem 89 will include a stepper motor 95 operating a ball screw 96 which is attached to an optical encoder 97 to provide a readout 98. Attached to the ball screw 96, in a manner to be more fully described hereinafter, are a receiver 99 and a transmitter 100 of infrared light which is adapted to track the position of the float 101 in the glass flow tube 78.

Figure 23:
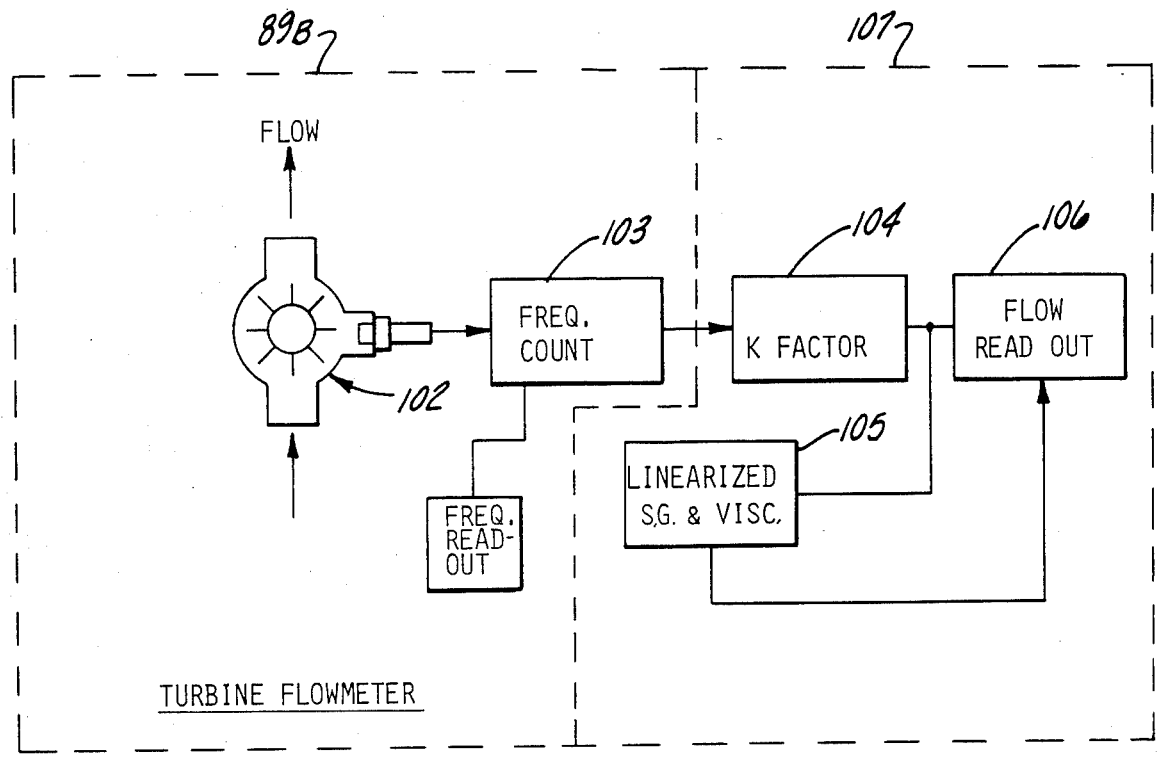
FIG. 23 is a view similar to the detection subsystem shown in FIG. 5B, which may be used when a turbine flow meter is being calibrated.

Referring to FIG. 23, there is a turbine flow meter system 107, including generally the well known components of a turbine flow meter, outputting a signal to a frequency counter 103 which is then operated on by a K-factor circuit 104 and a linearized specific gravity and viscosity circuit 105 to produce a flow readout 106. Such turbine flow meter systems are well known in the art and need not be described further herein.

Where our invention becomes useful for manufacturers of turbine flow meters is to obtain a relationship between the frequencies counted by the frequency counter 103 and the actual flow through the turbine flow meter 102 and, in this case, our flow detection system 89B will comprise the turbine flow meter 102, the frequency counter 103 and a readout 103A. As before, a flow will be set up through the weigh scale apparatus in a manner to be more fully described hereinafter, and will be taken for a fixed period of time and will be determined. Such determined flow will, of course, have a related frequency reading, and the turbine flow meter manufacturer, then having a table of frequency counts related to flow through the turbine flow meter can determine values needed for the K-factor circuit and the linearized specific gravity and viscosity circuit to give a linear flow readout through the turbine flow meter readout 106 in engineering terms.

Figure 24:
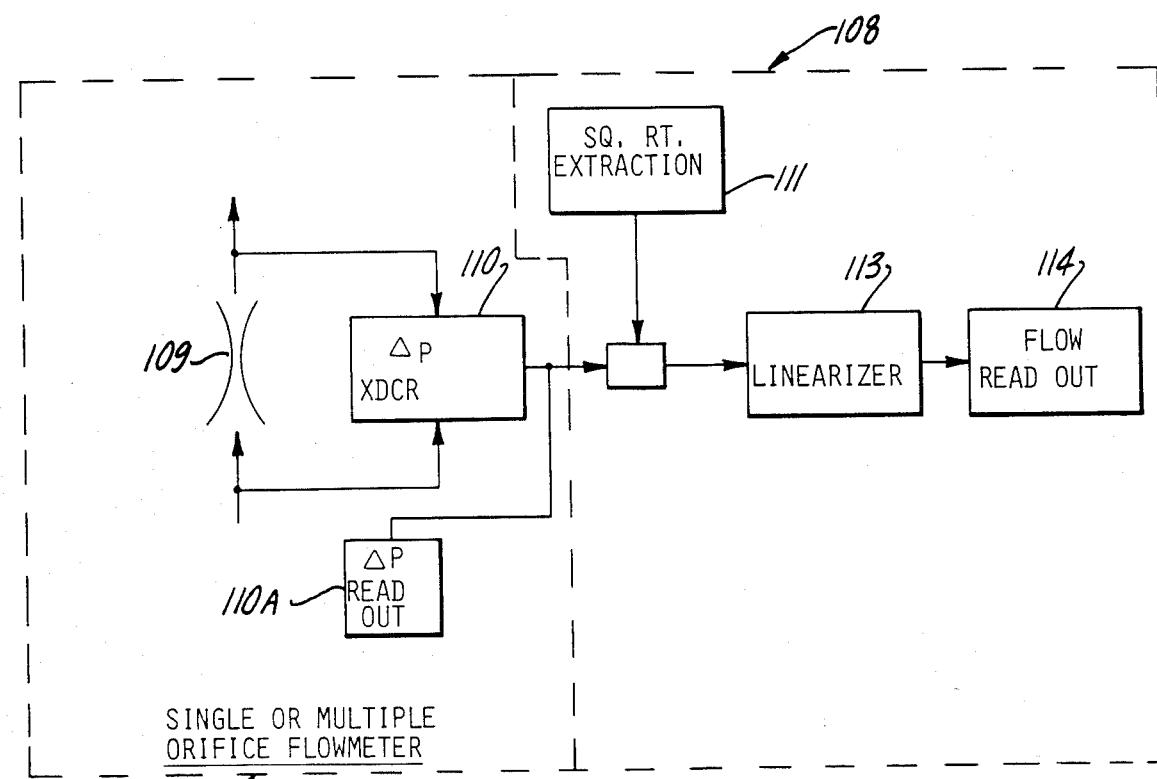
FIG. 24 is a view similar to the detection subsystem shown in FIG. 5B, which may be used when a differential pressure transducer is being calibrated.
Figure 25:
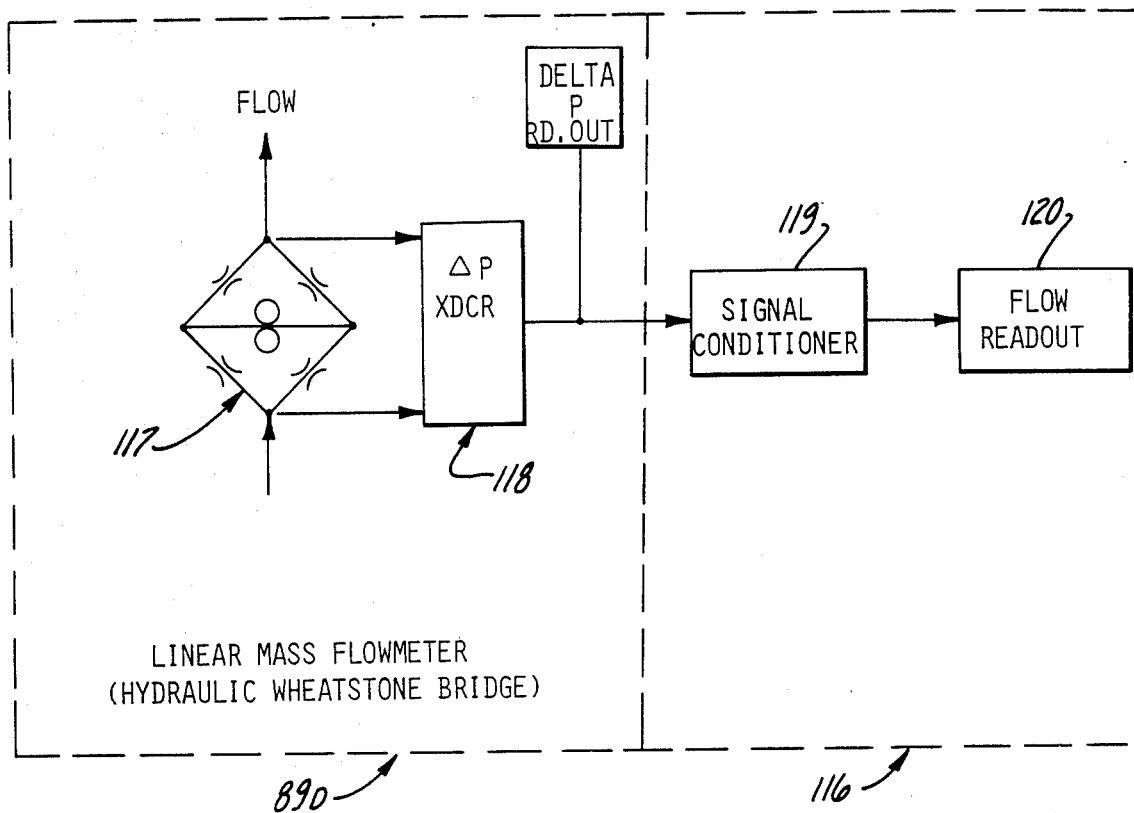
FIG. 25 is a view similar to the detection subsystem of FIG. 5B, which may be used when a linear mass flow meter is being calibrated.

Similarly, now referring to FIG. 24, there is shown a single or multiple orifice flow meter system generally designated by the numeral 108, and including generally a single or multiple orifice flow meter 109 which transmits a differential pressure signal to the differential pressure transducer 110. Since the differential pressure transducer 110 gives an output in the form of a square root function, a circuit known in the art is needed to extract the square roots from the signal to provide a nominally linear function, which is further operated on by the linearizer circuit 113 to provide a linear signal to the single or multiple orifice flow meter readout 114.

To enable the manufacturer of the single or multiple orifice flow meter to choose the right functions to provide an accurate readout, a table giving the relationship between the actual flow through the flow meter 109 and the signal produced by the differential pressure transducer is needed, and our system can give just such a table by considering our flow detection subsystem to be the box labeled 89C. As before, a constant flow is established through the weigh scale apparatus 57 at several different flows which have several different corresponding outputs of the differential pressure transducer and, therefore, a table can be produced relating its specific flow to a pressure transducer signal as read on the readout 110A.

Our system can also be used to calibrate the well known linear mass flow meter or hydraulic wheatstone bridge known under the tradename "Flotron". Such a system, generally designated by the numeral 116, consists of the linear mass flow meter 117 which, as illustrated, generally consists of four orifices and a pump. A pressure reading is taken across the inlet and the outlet of the wheatstone bridge and supplied to the linear mass flow meter differential pressure transducer 118.

That signal, to aid in obtaining a linear readout, is operated on by the known signal conditioner 119 and that result is supplied to the linear mass flow meter readout 120. Again, our system aids in calibrating linear mass flow meters by giving a table of values of actual flow through the linear mass flow meter related to the differential pressure transducer.

In this case, the signal conditioner 119 is mainly to convert the signal from the differential pressure transducer from the voltage signal received therefrom to a reading in engineering units, but it is contemplated that such signal conditioning circuit could also be used to make any corrections necessary if the linear mass flow meter, as shown by calibration on our equipment, turned out to be not exactly linear and some corrections were needed.

Figure 5C:
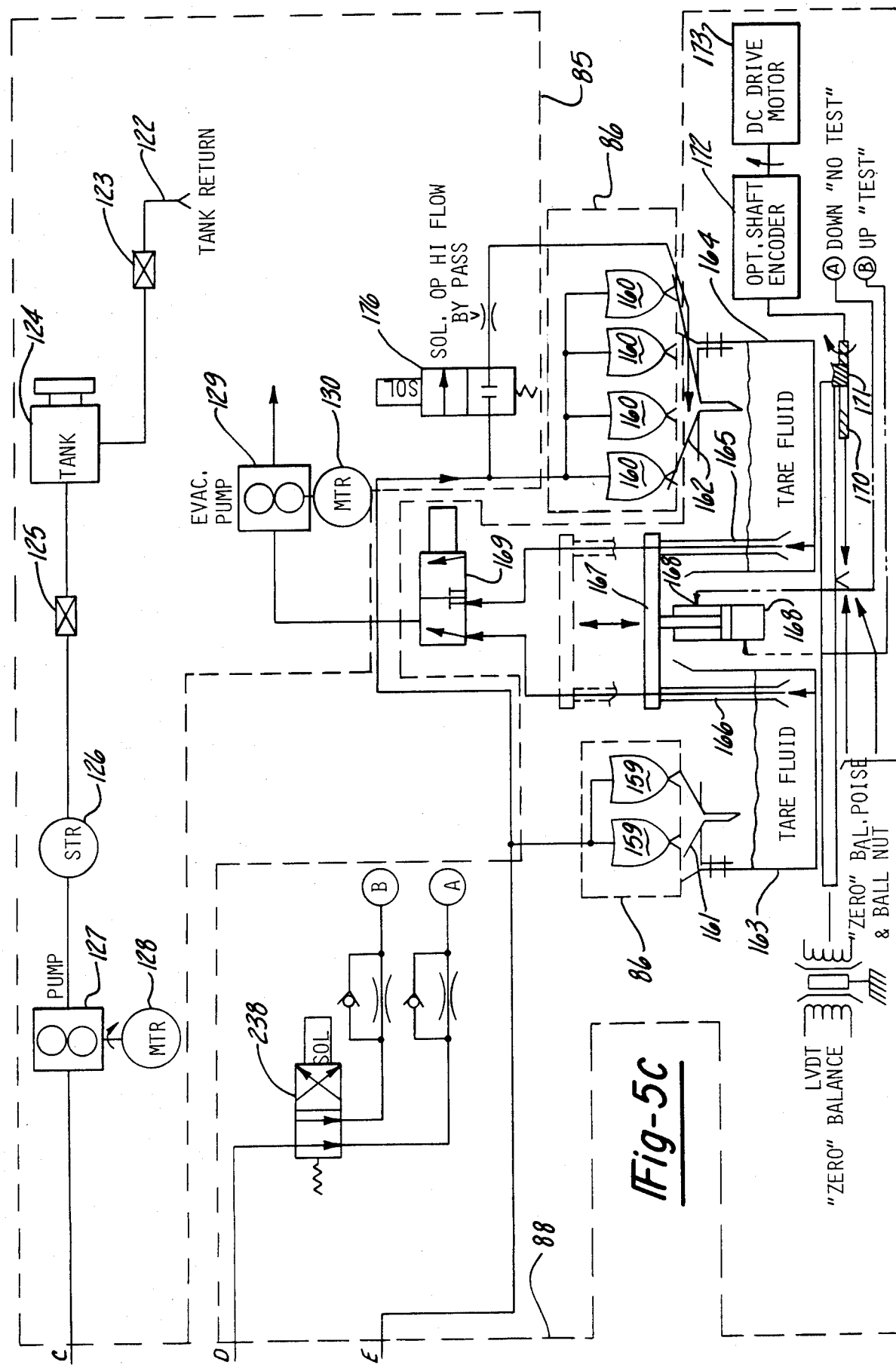
FIG. 5C is a diagrammatic view showing the weigh scale subsystem of the present invention.

Now returning to FIG. 5B showing the flow detection system used to calibrate a glass tube flow meter, which is the preferred embodiment of the present invention, an explanation of the diagrammatic view of our system consisting of FIGS. 5A, 5B and 5C can be understood. As can be seen by referring to FIGS. 5A, 5B and 5C, the float detection subsystem 89A is shown contained within the monitoring subsystem 87. Of course, it is to be understood that this is only for the purpose of illustration, and it could have easily been drawn outside the boundary lines of the monitoring subsystem.

Since it is the fuel passing through the meter 60 (FIG. 3) which causes the movement of the float 101 within the glass tube 78, the travel of the fuel throughout our fuel flow calibration system shall first be described. In order to supply an ample amount of fluid for operation of our system, a fuel storage tank 124 (FIG. 5C) is provided. Since the tank must accept returns of excess fluid from various parts of the system, a tank return 122 is connected to a first shut-off valve 123, and then to the tank 124.

A second shut-off valve 125 is placed immediately downstream of the tank for shutting off fuel flow through the system when it is in its inoperative state. Following the shut-off valve, to make certain that no impurities are left in the fuel, is a strainer 126, which is then connected by suitable conduit to the pump 127 driven by the motor 128. Also, in the supply subsystem is an evacuation pump 129 driven by the evacuation pump motor 130 which, as just described, returns fluid to the tank through the tank return 122. This will be described in more detail below.

Since our system is useful in calibrating a wide range of sizes and types of flow meters, the pump 27 must be large enough to accommodate such variety. However, we also do not want to allow the pump to become overloaded and, for this reason, want to set the maximum pressure in the system somewhat below the maximum possible output of the pump 127. Therefore, after the fuel passes through the pump 127 and the fuel filter 131, it is passed through the back pressure regulator 132, which is set to have an output readable on the back pressure meter 133, attached to the regulator 132, somewhat less than the maximum output of the pump.

After this first stage of pressure reduction, it is desired to bring the pressure of the fuel down to that useable in the system, since we are dealing with a glass tube flow meter and anticipate dealing mostly with low flows in such flow meters, we like to operate our system at a very low pressure, for example, from zero to three pounds per square inch.

To reduce the fuel pressure to the pressure actually useable in the system, since we may have an operating range of from zero to thirty p.s.i. which must remain extremely stable throughout that range, we have found it necessary to use an air operated pressure regulator such as Twin Bay Model No. TB 100 V. To operate that regulator 137, since it is a one-to-one device, air must be supplied to the top end of the regulator in a range of zero to thirty p.s.i. in order to have an output of zero to thirty p.s.i., and to supply that range of input to the regulator and to allow it to be controlled electrically from the panel 79 by the pressure adjustment potentiometer 83, it is necessary to connect the air operated pressure regulator 137 to a ratio relay 136.

To enable an output of zero to thirty pounds from the ratio relay, it is necessary to have a constant input from the plant air supply to shut-off 145, and therethrough to air pressure regulator 134, to the top end of the ratio relay, and to have the variable pressure, once the ratio is set into the ratio relay 136 by the ratio adjustment knob 136A, determined according to the formula: Output=d divided by c, where is c is a setting of the ratio adjustment knob 136A, and d is the variable pressure coming from the current to pressure regulator 135, which has been previously set by the pressure adjustment potentiometers 83 and 83A.

To enable operation of the current to pressure regulator, air must be supplied at a predetermined pressure from the plant air supply through the plant air supply shut-off valve 145, through the air pressure regulator 134. This then allows the pressure downstream of the air operated pressure regulator to be set to the pressure desired for use in the system.

Next, the temperature of the fuel must be set at a temperature useable in the system, which ideally is the temperature in the flow room 56. It is also preferably with the temperature of the fuel be set after its pressure is regulated, because otherwise the drop in pressure would cause further changes in temperature, which would be undesirable in the system.

To set the temperature of the fuel at the desired temperature, which is preferably the temperature to which your flow room 56 is set, to prevent additional temperature change problems, it is first passed through a heat exchanger 138. The heat exchanger is a device well known in the art where a fluid from an outside source at the desired temperature is passed in a closed-loop system through a device which the fluid whose temperature it is desired to set is also passed. In this case, the fluid flows through the heat exchanger 138 while being acted on from fluid coming from the mixing valve 142, which may be such as Model No. 753 manufactured by Research Control Corporation.

The temperature of the flow through the mixing valve is controlled by a feedback circuit. The mixing valve 142 is supplied with hot and cold water from the plant water supply through the cold and hot water shut-off valves 140 and 141 respectively. The temperature of water leaving the mixing valve 142 and entering the heat exchanger 138 is controlled by the temperature controller 144, which may be such as Model No. 43AP-PA42C/PC manufactured by Foxboro Corporation, in combination with the temperature transmitter 143, which may be such as Model No. 43C-AN manufactured by Foxboro Corporation.

The desired temperature is initially set by the temperature control knob 144A, and the temperature of the fuel leaving the heat exchanger is sensed by the temperature sensor 139, which may be such as Model No. E119ZC manufactured by Foxboro Corporation. If there is any variation in the fuel leaving the heat exchanger 138, this is sensed by the temperature sensor 139, which sends a signal to the temperature transmitter 143 which, in turn, will supply a correction signal to the temperature controller 144, which changes the setting of the mixing valve 142.

To enable operation of the temperature transmitter, which is pneumatic in nature, plant air is again supplied to the plant air shut-off 145 through an air pressure regulator 134, to the temperature transmitter. Since it is desirable to have a constant flow of water through the heat exchanger, the cold and hot water shut-off valves 140 and 141 are normally left open, and the flow of the water through the heat exchanger is shut-off electrically by the heat exchanger solenoid 138A.

After the fuel has been conditioned as to temperature, it is now ready to enter the float detection system 89A (FIG. 5B). Since, however, the float detection system is at least some distance from the heat exchanger, a second temperature sensor 147 measures the temperature of the fuel just before it enters the flow meter undergoing calibration.

In order to be certain the system described so far, together with the systems for controlling room air pressure, temperature, and humidity previously described, are working properly, there is also provided a flow room temperature sensor 148, a control room temperature sensor 149, a downstream temperature sensor 150, and an injector pressure sensor 151. The second temperature sensor 147, the flow room temperature sensor 148, the control room temperature sensor 149 and the downstream temperature 150 can be selectively displayed on the temperature display 152.

The value obtained by the injector pressure sensor 151 is outputted to the display circuit 155, which converts the signal into a signal useable by the injector pressure display 156.

The fuel is now ready to enter the glass flow tube 78 which is being calibrated. The flow tube is provided with a reference mark 158 to which the operator brings the float follower 93 until he gets a signal indicating perfect alignment. The operator then sets the optical encoder readout 98 to zero.

In a manner to be more fully described, the operator will then set various flows through the glass tube flow meter, which the float follower 93 will follow, and the optical encoder readout 98 will indicate the position of the float with regard to the reference mark for each flow. The operator, after having taken enough of these readings of flow in regard to the reference mark, can calibrate a flow meter scale and mount it in the flow meter in which the glass tube 78 is mounted, with regard to the same reference mark, and thus produce a calibrated glass tube flow meter.

In order to determine the flow through the flow meter at these various positions according to our method, it is necessary to establish a constant flow and measure it for a fixed period of time. As explained previously, this is in contrast to systems old in the art which operated on the basis of fixing the weight and measuring a variable time of flow until that weight of fluid flowed into a weigh pan. This is accomplished by our weigh scale subsystem 88.

The flow coming through the glass tube 78 must now be measured accurately and in a manner so as to eliminate the inaccuracies present in measuring in the systems old in the art. Depending on the flow rate of the fuel, such fuel will either be supplied to one or more of the small injectors 159, or the large injectors 160. These injectors will either flow into a low flow gathering device 161, or a high flow gathering device 162, which are representative of devices to be explained further below which absorb any kinetic energy due to the force of the fluid leaving the injectors, and then allows the flow to flow either in the low flow bucket 163 or the high flow bucket 164.

The fluid may be allowed to remain in the bucket, or may be extracted from the bucket by the high flow extraction tube 165, or the low flow extraction tube 166, which are raised or lowered into the bucket by means of the tube bracket 167 being reciprocally raised and lowered by the extraction cylinder 168. The fluid being removed from the buckets when the extraction tubes are lowered is selectively removed from one tube or the other by means of the extractor solenoid valve 169 which selects the tube from which the fluid will be removed, and this fluid is removed by means of the extraction pump 129 being operated by the motor 130 and returned to the tank return 122. Thus, we provide for the removal of the kinetic energy of the fluid as a source of error.

We further provide for removal of inaccuracies in the system by providing for all electronic connections to be made by an air gap transformer, to be described, which provides for the removal of any drag on the scale, such as was present in the old scales using magnetic switches.

We also provide for the scale to be very accurately calibrated in advance so that each position of the poise weight 171 is related to a position of the ball screw 170, which is driven by the drive motor 173. The optical shaft encoder enables us to know the precise position of the poise weight as a function of the number of revolutions of the ball screw 170. In this way, no matter what weight is placed on the scale platform, the amount of weight on the scale, since the poise weight will automatically travel to a position to bring the scale in equilibrium, will always be known.

We have now solved the problems of the pulsating flow and evaporation of the fluid being measured at low flows by providing for measurements of the flow into the scale in a dynamic fashion, in which we establish a flow into the scale and continually move the poise weight at a rate to keep the scale in equilibrium while the fluid is flowing into the bucket. We also drastically minimize the effects of kinetic energy errors due to dripping of the fluid into the tank at very low flow rates and minimize the evaporation which could take place with volatile fluids at low flows. The reason that this occurs, is due to the dynamic operation of the scale and the integrating effects of the electronics, wherein the poise weight is constantly moving as the flow is going into the scale buckets, thus averaging out the effects of the drippings into the bucket.

The evaporation is minimized by weighing at the same time that you are flowing into the bucket. Because you are not having to wait a finite amount of time after the flow occurs before you weigh the amount in the bucket. Also, you are not having to move the bucket in any way before it is weighed, which could make the possibility of an air current dissipate any evaporative fumes which may be present, and this effect may be further eliminated with very low flows by providing covers on the buckets, etc.

Figure 4:
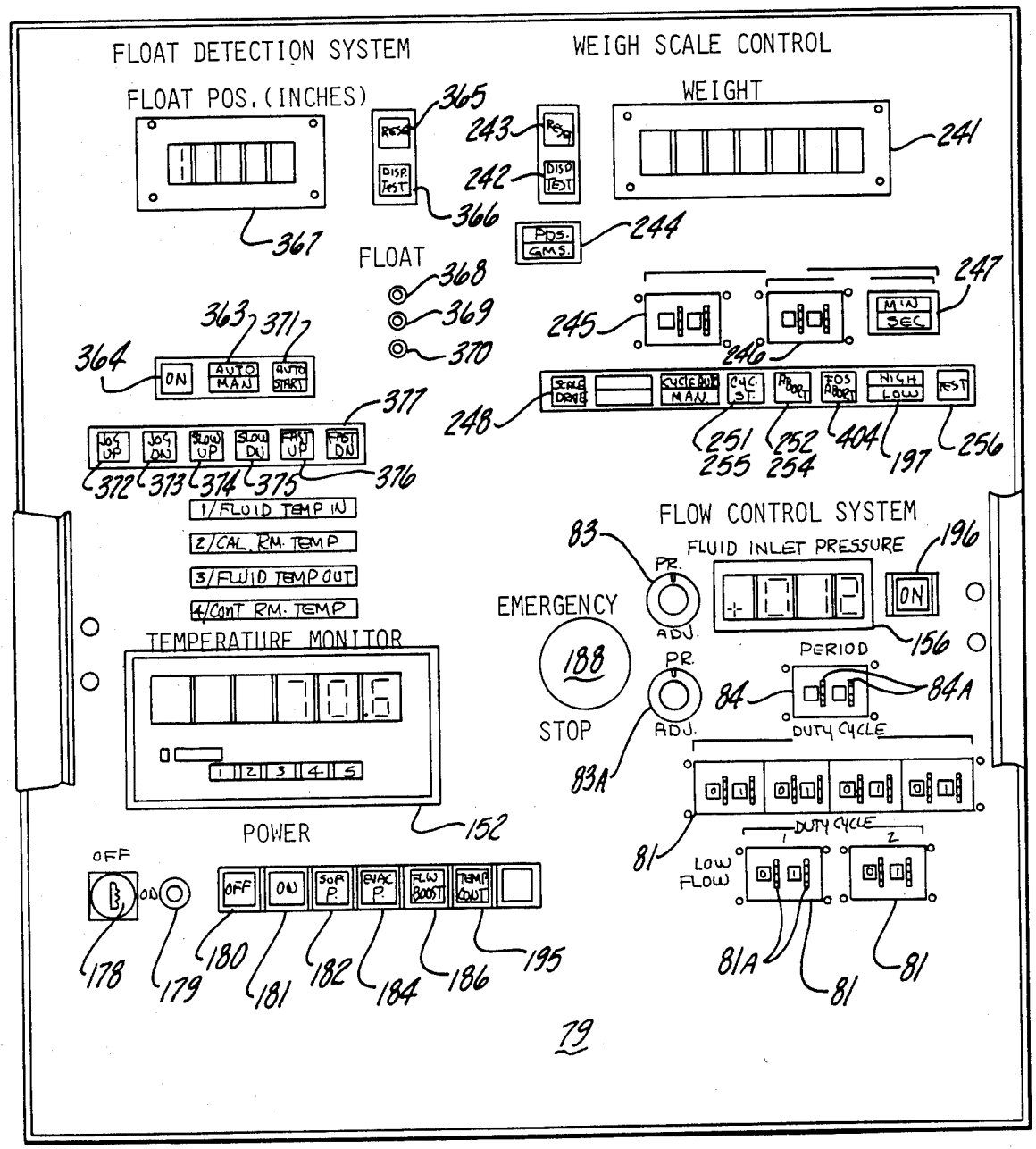
FIG. 4 is an elevational view of the control panel of the equipment shown in FIG. 2.

The electrical controls necessary to operate the supply subsystem can be seen by reference to FIGS. 4 and 15. Power is supplied to the entire system by the key lock on-off switch 178. The fact that the system has been activated is indicated by the illumination of the pilot light 179.

For operator convenience in starting and stopping the system, other than at the beginning and end of the day, a separate off switch 180, and on switch 181, are provided. The supply pump which supplies fuel to the system is turned on and off by the supply pump on-off switch 182, which is connected to the supply pump relay 183, which is, in turn, connected to the supply pump motor 128.

Similarly, the evacuation pump motor 130 is operated by the evacuation pump on-off switch 184, which is connected to the evacuation pump relay 185, which, in turn, is connected to the said evacuation pump motor 130.

The fuel boost solenoid is connected similarly, having a fuel boost on-off switch 186 connected to a fuel boost relay 187 which is, in turn, connected to said fuel boost solenoid 176.

To complete the discussion of the electrical controls needed to operate the supply of subsystem of the present invention, there is provided an emergency stop switch 188 which will cutoff all power to the system should the occasion arise. It is to be noted that the emergency stop switch 188 is mounted on the control panel for ease of operation by the operator in the control room 51. For safety purposes, it is felt that the operator in the flow room 56 should also have a means for turning the system off in case of an emergency and, for this reason, the emergency off switch 189 is provided, which is mounted with the controls for the float follower 93 in remote control panel 395.

The electrical controls necessary to operate the control subsystem of the present invention can be seen by referring to FIGS. 4, 5C, 12, 13A, 13B, 14A, 14B, 17, 18 and 19.

Referring first to FIGS. 4, 5C and 12, it can be seen that the fuel pressure set or adjust potentiometers are indicated by 83 for the coarse adjust potentiometer, and 83A for the fine adjust potentiometer. These are connected to the pressure regulator control circuit 193 shown in greater detail in FIG. 18, while the potentiometer circuit is shown in greater detail in FIG. 17. The pressure regulator control circuit 193 is, in turn, connected to the current to pressure regulator 135 to perform the functions previously described.

The fuel temperature function is initially started by the operator depressing the fuel temperature on-off switch 195 which supplies power to the fuel temperature transmitter 143. A signal is received by the transmitter from the fuel temperature RTD probe 139 and this, in turn, causes a transmitter 143 to supply a signal to the fuel temperature controller 144 to perform the functions diagramed in FIG. 5C.

The depressing of the fuel temperature on-off switch 195 also supplies power to the solenoid relay 194 which operates the relay, when desired, to operate the heat exchanger solenoid 138A, to open the solenoid valve and permit flow to start through the heat exchanger 138. As previously described, the operator can set predetermined flow through the flow meter being calibrated by turning on or off one or more injectors, and the injector on-off switch would be depressed first by the system operator, which would then supply power to the high flow-low flow select switch 197, which would select either the operation of the small injectors 159, or the large injectors 160 by operation of the fuel injection control circuit 198 and the injector solenoid driver circuit 199.

The operator, to obtain the wide range of flows necessary for calibrating all sizes of flow meters, can control the injectors as to period, defined as the reciprocal of the frequency, and as to the duty cycle within that period. For example, if the frequency was to be one hundred cycles per second, the period would be one one hundredth of a second, which means an individual injector would be turning on every one hundredth of a second. The duty cycle tells you what percentage of that period the injector would actually be flowing fuel. For example, if the switches 81 were set for a duty cycle of 50%, that means the individual injector would be on 50% of one one hundredth of a second, or the injector would flow for one two hundredths of a second. These signals are sent to the injector driver circuit 199 and to the injectors 159 and 160 by operation of the fuel injector control circuit 198 which will be more fully described.

A more detailed drawing of the pressure adjustment potentiometer 83 is shown in FIG. 17. As can be seen, the pressure adjustment potentiometer consists of a one thousand ohm coarse adjustment potentiometer, and a one hundred ohm fine adjustment potentiometer connected in series with the ground leg of the coarse adjustment potentiometer 200, and acting as a variable resistor. This results in the needed resistance across the coarse adjustment potentiometer to affect the signal being supplied to the pressure adjustment circuit 193, which is shown in greater detail in FIG. 18.

It should be understood that while we have given the actual values of the potentiometers which are used in the preferred embodiment of our construction, depending on the user requirements of our system, different values for the potentiometers may be desirable, and these values, as well as other values which will be discussed in the circuit, must be determined by the user of the system, depending on the particular application for which our flow meter calibration stand is intended.

Since we must have accurate regulation by the current to pressure regulator which, as discussed in relation to FIG. 5, is active in controlling the fuel flow through the flow meter being calibrated, we need a very stable current to be supplied to said current to pressure regulator 135. This is done by the pressure regulator control circuit 193 which utilizes a regulator circuit consisting of a series dropping resistor 207 connected between positive system voltage and the cathode of a zener diode 206, with the anode of the zener diode connected to ground. Also connected to the cathode of the zener diode 206 is one end of a limiting resistor 208. This combination of components is known in the art as regulator circuit, and supplies a very stable voltage to the course adjustment potentiometer 200 previously discussed in relation to the pressure adjustment potentiometer 83. Once this very stable voltage is acted on by the coarse adjustment potentiometer 200, and the fine adjustment potentiometer 201, it is supplied to the positive input of the operational amplifier 204.

The output of the operational amplifier 204 is connected to the base of the follower transistor 205. The negative input of the operational amplifier 204 is connected to the emitter of said follower transistor, while the collector of the follower transistor 205 is connected to input of the current to pressure regulator 135, and to complete the pressure regulator control circuit 193, a scaling resistor 209 is also interposed between the emitter of the follower transistor 205 and ground. Thus, a means is provided for providing a very stable voltage to the current to pressure regulator for accurate control thereof.

It can be seen also that in the circuit 193, the other input of the current to pressure regulator is connected to the power supply at the same point that the series dropping resistor 207 is, and that the operational amplifier 204 must also be connected to the positive side of the power supply and to ground.

Figure 13A:
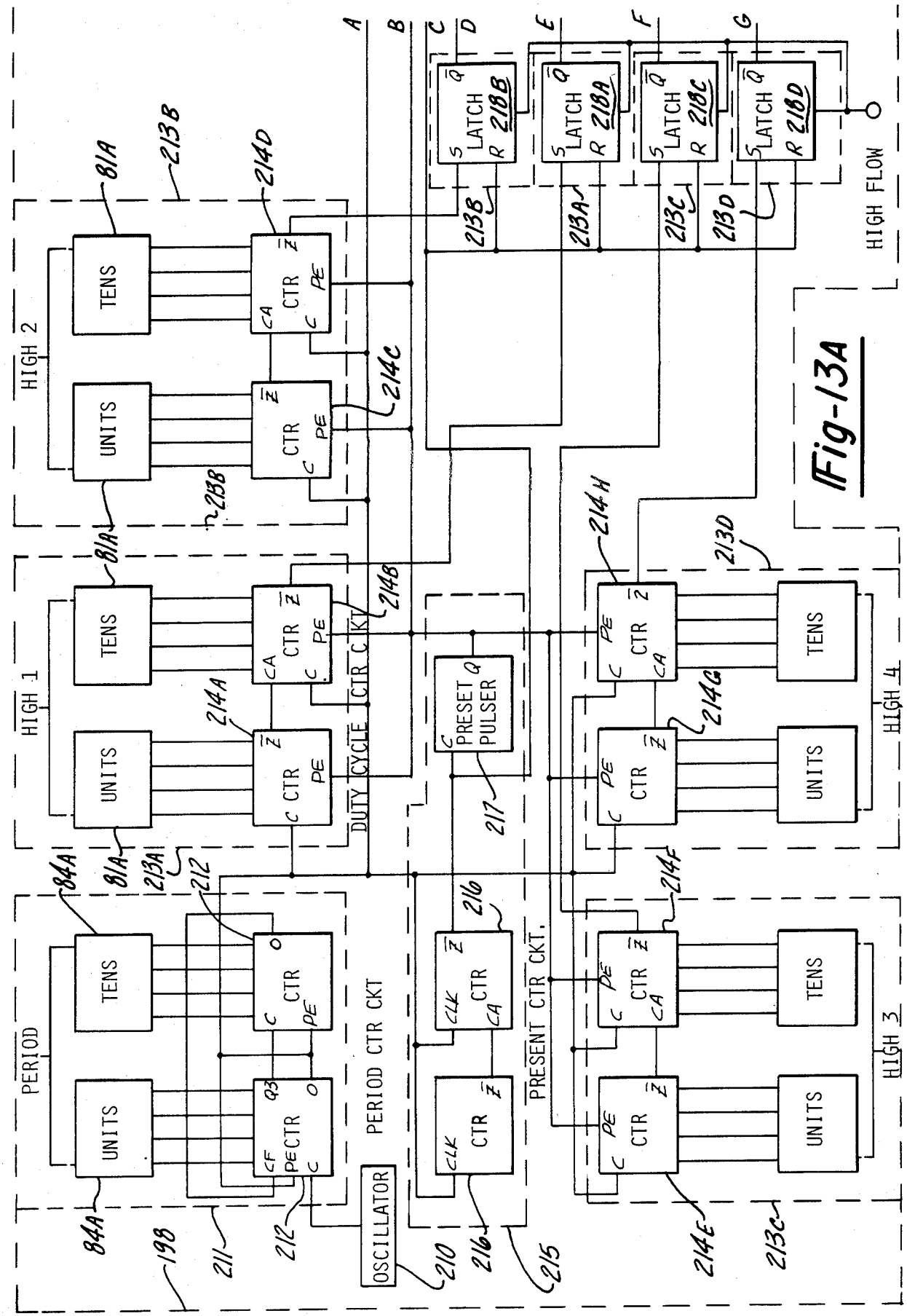
FIG. 13A represents a portion of the fuel injector circuit shown in FIG. 12.
Figure 14B:
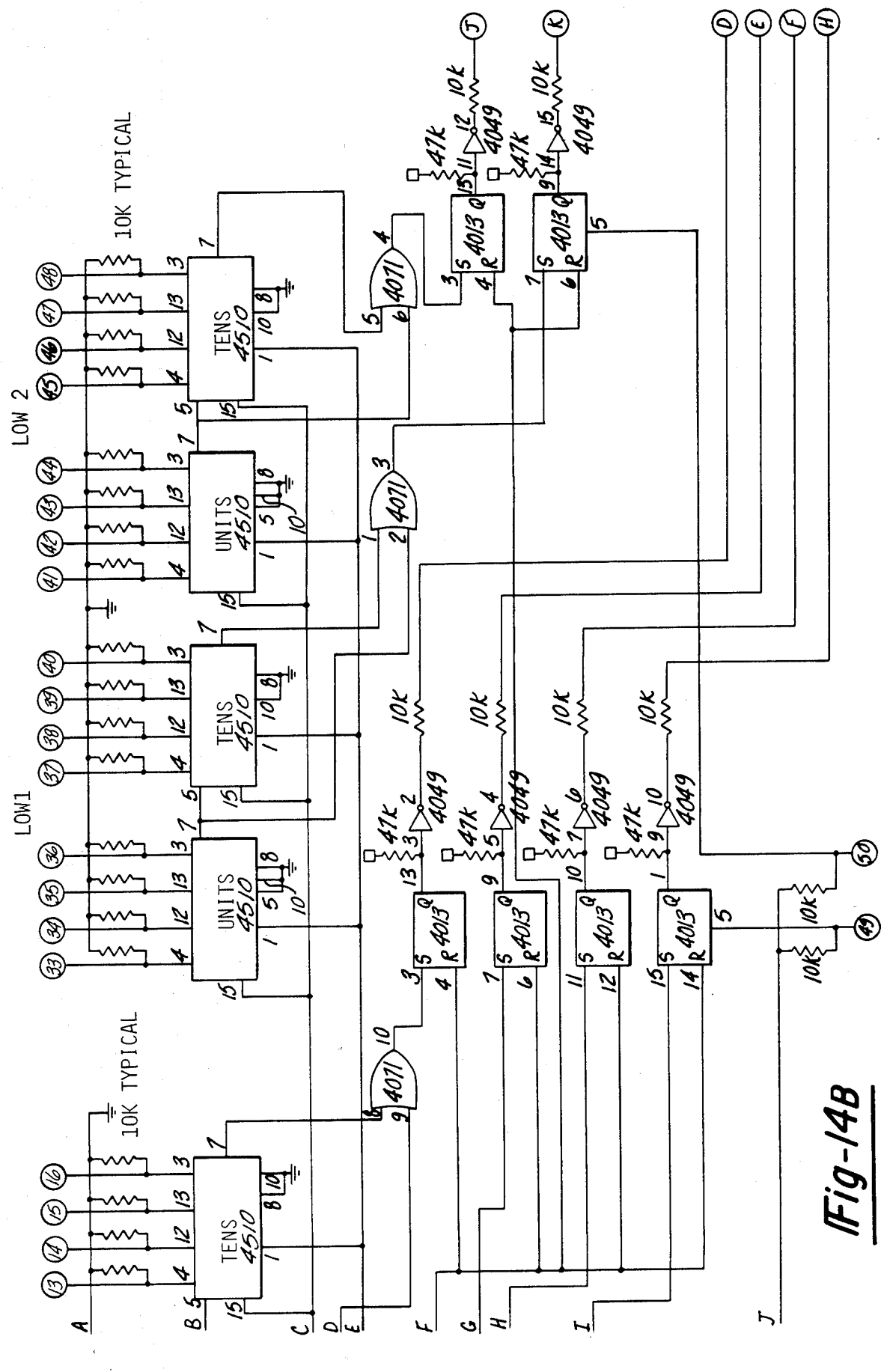

A more detailed illustration of the fuel injector control circuit 198 can be seen referring to FIGS. 13A and 13B. It will be remembered that as previously discussed, the operator of the system, in order to have system capable of calibrating a wide range of flow meters, must have the means to very precisely set a wide range of flows through the flow meter being calibrated.

Referring to FIGS. 4 and 12, it can be seen that the operator has the capability of setting the period and the duty cycle of the fuel injectors used. It should be remembered that there are two low flow injectors 59 which can have their duty cycle set by the thumbwheel switches 81A and there are four high flow injectors which have their duty cycle set by four thumbwheel switches which can be physically identical to the low flow thumbwheel switches, and are indicated by the numeral 81A on FIGS. 13A and 13B.

The fuel injector control circuit then must have a means to operate the injectors for a certain number of cycles per second called the "frequency", and have the capability of having the injectors on for a certain amount of time during the times per second it should be operated. As before, if an injector is supposed to operate one hundred times per second, there is another useful term called "period" which is defined as one over the frequency, and in a time unit. In other words, if it is supposed to operate at a hundred cycles per second, the period will be one over one hundred, or one hundredth of a second and the system must supply the proper signal to have the injector open every one hundredth of a second, and then supply the proper signal to tell it how much percentage of that time of the one hundredth of a second to be on and how much time should be off, this being called the "duty cycle".

This is accomplished by having a programable period counter circuit. Since the two small injectors 159 and the four large injectors 160 are driven by pulses supplied from the six identical solenoid driver circuits 199, the purpose of the fuel injector control circuit is to provide the proper input to the six identical injector solenoid driver circuits 199 so they are able, in turn, to operate the two small injectors 159 and the four large injectors 160.

Two ways are available to the operator to set the wide range of flows through the injectors needed to calibrate a large range of flows. One way is to alter the period of the injector, and this is set on the period selector 84 having thumbwheel switches 81A.

The other way the operator has to vary the operation is to select the injector duty cycle, which defines what percentage of the period the injector will be on for and what percentage it will be off for. If the duty cycle is 10%, for example, the injector will be open for 10% of the period and off for 90% of the period.

In order to provide the operator the opportunity of selecting these values in a convenient fashion, we provide the circuitry shown in FIGS. 13A and 13B. Since the injectors are operated by pulsations, we must provide in our flow meter calibration system a proper amount of pulsations through the injector to achieve the desired period and duty cycle, and we do this by first of all providing a programmable period counter circuit designated by the numeral 21 and a number of programmable duty counter circuits equal to the number of injectors, and indicated by the numerals 213A–213F.

We have learned by experimentation that an injector period of one millisecond is very desirable from the standpoint of operator use of our improved system. We provide a period switch 84 having thumbwheels 81A which can set integers from 01 to 99 indicating the selection of a period of one millisecond to 99 milliseconds. This switch provides an input to the programable period counter circuit which has the effect of modifying the output of the oscillator 210 in a desired manner.

We have found that the use of a 100 kilohertz oscillator, which gives you a pulse every one hundredth of a millisecond, is preferred in our system because when the integer value entered on the thumbwheels 81A is multiplied by the time base of the oscillator, which in this case is 0.010 millisecond, you get an output from the programable period counter circuit 211 equal to the ouput of the oscillator 210. This output is very conveniently used as the input to the preset counter circuit 215 which is adapted to multiply its input by one hundred to give a time value of the period equal to the integer selected on the thumbwheels 81A of the period switch 84. In other words, one hundred multiplied by 0.01 millisecond gives a one millisecond output from the preset counter circuit.

We thus now have a first output from the programable period counter circuit equal to the time base of the oscillator 210, and a second output one hundred times as great, defining the period, from the preset counter circuit. This output is supplied as a reset signal to each of the six identical latch circuits 218 contained in each of the six programable duty cycle counter circuits 213A—213F. The latches then operate to define the one millisecond period in a manner to be described below.

It, of course, should be understood that depending on user requirement, the range of the period we have used in our device from 1 to 99 milliseconds may change, requiring a change in the oscillator 210, and other circuit components.

To provide ease of operation in selecting the duty cycle of the injector, or, in other words, the percentage of the period the injector is on, we provide the six individual duty cycle select switches, all indicated by the numeral 81, in FIG. 12 and all having the integer selected on the injector duty cycle represent the percentage of time the injector is on. For example, if ten is selected, this means the operator, has selected that individual injector to be on for 10% of the period. In this case, we use the output from the programable period counter circuit 211 and the preset signal forming a portion of the output of the preset counter circuit. This signal is fed from the Q output of the preset pulser 217 into each of the PE inputs of the counters 214A–214L.

Also, an output from the period counter circuit is fed into each of the clock inputs of the 214A–214L counters. The output of the 214A, 214C, 214E, 214G, 214I and 214K counters are inputted to the carry in (CA) input of the 214B, 214D, 214F, 214H, 214J and 214L counters and the carry out output of the 214B, 214D, 214F, 214H, 214J and 214L counters are fed to the set input of the latches 218A–218F forming a portion of the programable duty cycle counter circuit 213A–214F respectively.

The other input to the reset input of the same latches comes from the preset counter circuit, and this has the effect of, everytime the pulse is supplied to the set input of the latch, supplying a pulse to the respective injector solenoid driver circuit to turn on its respective injector. When the reset input of the latch receives a pulse from the preset counter circuit, after an amount of time equal to the duty cycle, a pulse will be supplied to turn off the injector and the injector will not turn on again until the set input of the latch 218 receives another pulse. Thus, the injectors can only be turned on at time intervals equal to the period, and be turned off a period of time after they are turned on equal to the duty cycle, and we have supplied a means for turning on the injectors at time intervals corresponding to the period, and a means for turning off the injectors at a time after the beginning of each period corresponding to the duty cycle.

By referring to FIGS. 13A and 13B, it can be seen that the programable period counter circuit 211 consists of a pair of thumbwheel switches 84A connected to a pair of period counters 212. While each of the programable duty counter circuits consists of a pair of thumbwheel switches 81A, each of which is connected to a duty cycle counter 214 as shown.

The preset counter circuit consists of a pair of preset counters 216 connected in parallel, with the clock inputs of the counters 216 connected in parallel, and the carry out output of the preset counter being connected in series and being, in turn, connected to the clock input of the preset pulsers. With the Q output of the preset pulse 217, as before, being connected to the preset inputs of the counters 214A–214L respectively.

Figure 20:
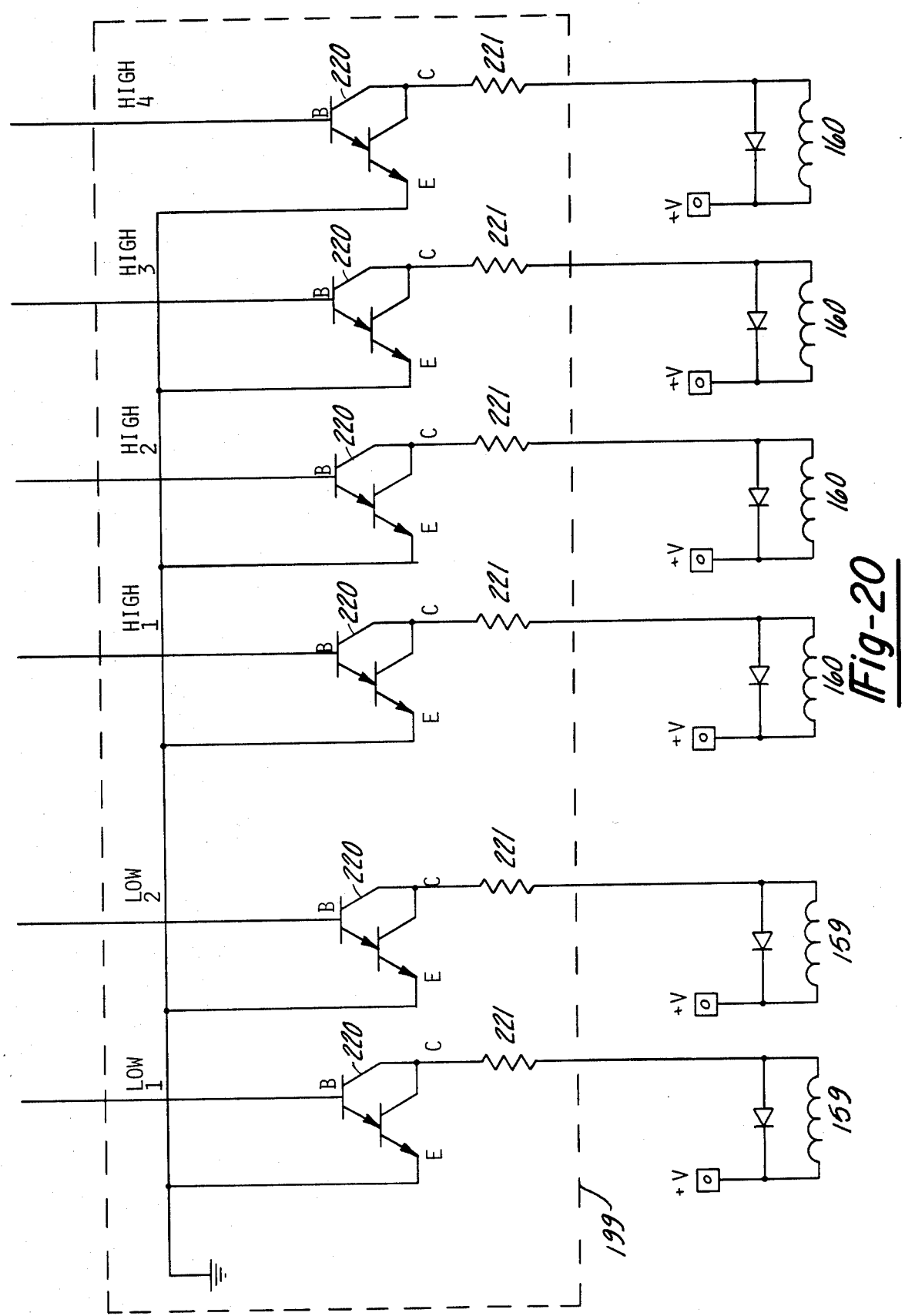
FIG. 20 is a schematic diagram of the injector solenoid driver circuit of FIG. 12.

The six identical injection solenoid driver circuits previously mentioned are shown in more detail in FIG. 20. It is the purpose of the injector solenoid drivers to take the output from the latches 218A–218F and convert this into a signal useable by the two small injectors, each labeled 159, and the four large injectors, each labeled 160. Before the signals pass from the latches 218A–218F to the injector driver circuits 199 to be hereinafter described, each such signal passes through a base current limiting resistor 219. Such signal then enters the injector driver circuit 199 shown in FIG. 20. Each of the six individual injector solenoid driver circuits consists essentially of a Darlington transistor 220.

Each transistor has an emitter, base and collector with the base receiving the signals from the respective base current limiting resistors 219. In each of the six injector solenoid driver circuits 199, the emitter is connected to ground, while the collector is connected to the injector through a collector current limiting resistor 211.

The collector current limiting resistors 221 are identical, regardless of whether it is a small injectors to which the signal is being supplied, or the the large injectors 160. The circuitry of the injectors need not be described in detail because these are commercially available, and may be such as Model No. GM#1606771 manufactured by Bendix Corporation as far as the small injectors are concerned, and Model No. 022-906-031A manufactured by Bosch GmbH so far as the large injectors are concerned.

Now referring to FIG. 16, the electrical apparatus necessary for the operation of the monitoring subsystems are shown. The thermocouples 147–150, which are commercially available, and may be such as Model No.

E119ZC manufactured by Foxboro Corporation, produce a signal which may be directly displayed on the temperature display 152, which may be such as Model No. 412A F manufactured by Doric Co. Inc.

The injector inlet pressure transducer 151 shown in FIG. 5B must have the signal produced thereby modified to a form useable by the injector pressure display meter 156, which may be such as Model No. 218-28 manufactured by Viatran Corporation. This is accomplished by the injector pressure display circuit 155 which is shown in greater detail in FIG. 19.

Figure 19:
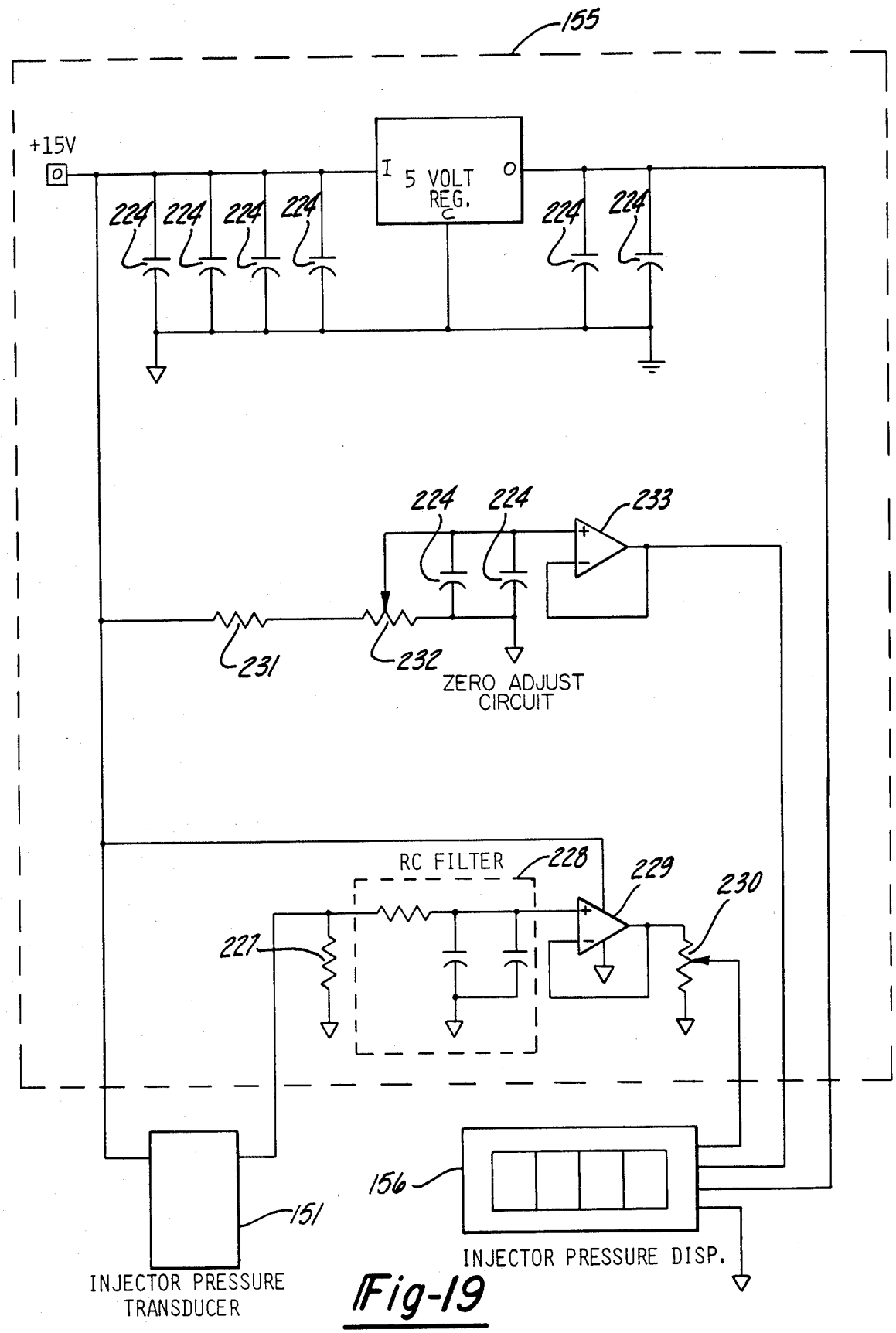
FIG. 19 is a schematic diagram of the injector pressure display circuit shown in FIG. 16.

Referring to FIG. 19, since the injector pressure display meter is, in essence, a four input volt meter needing a signal common, a power and a power common input to operate, these must be obtained from the injector pressure display circuit. The 5-volt DC power signal to the meter is obtained by utilizing the 15-volt power available in the system. The 5-volt power input to the meter 156 is obtained by connecting four filter power capacitors 224 across the 15-volt power available in the system, and then connecting a three terminal voltage regulator across the capacitors as shown, with the input and common terminals connected across the capacitors and the output and the common then connected in series with two further power filter capacitors to provide the 5-volt DC power.

To provide the analog signal to the meter 156, the injector inlet pressure transducer is connected across the plus 15-volt power supply as shown in FIG. 19 through a current sensing resistor 227. Since we have a current loop type injector inlet pressure transducer 151, the voltage across the current sensing resistor 227, because of Ohms law, will be proportional to the current passing through said resistor. This current is then passed through an RC filter 228 to the positive input of an operational amplifier follower 229.

The negative input of said amplifier 229 is connected to the output thereof. Between the output of said follower 229 and circuit common is connected a calibration potentiometer 230 whose output forms the analog signal supplied to the display meter 156. The power common signal to the meter 156 is simply connected to the power common available in the system, while the signal common input to the display meter 156 comes from the zero adjust circuit. Such a circuit consists of a limit resistor 231 and a zero adjust potentiometer 232 connected in series between ground and 15-volt source available in the system.

The output of the zero adjust potentiometer is connected to the positive input of the second operational amplifier follower 233, and interposed between ground and the output of the zero adjustment potentiometer are a pair of power filter capacitors 224. The negative input of the second operational amplifier follower is connected to the output thereof, and the output thereof forms the signal common input to the display meter 156. The display meter 156, now having all four needed signals will provide a display of pressure. It is felt that no additional discussion of the display meter is necessary, as this is a commercially available item.

Referring now to FIGS. 8, 10, 21A and 21B, there are shown in varying degrees of detail, the electronics needed to operate the weigh scale subsystem shown in FIG. 5C. Referring first to FIG. 10, it can be seen that there is a time weight scale control and timing circuit 250 which is central to the operation of the weigh scale subsystem. Into the circuit are fed signals from the power supply by the scale power on-off switch 248, which the operator depresses when he wishes to put the weigh scale subsystem in operation.

Also supplying signals to the time weight scale control and timing circuit 250 are the pretest time select switch 245 on which the operator selects the pretest time in seconds by operation of the pretest time select thumbwheel switches 245A and 245B. The signal supplied by the thumbwheel switches need not be described in detail, as these are commercially available units, and the instructions therewith amply inform one skilled in the art of the type of signal which may be obtained therefrom.

The operator also selects the test time on the test time select switch 246 in seconds or minutes by setting the test time select thumbwheels 246A and 246B. This will also supply a signal to the time weight scale control and timing circuit. The units in seconds and minutes which the pretest time select switch 245 and the test time select switch 246 are in is selected by the operator by the means of the test time unit select switch 247 which is connected to the time weight scale control and timing circuit 250 as shown.

The scale control and timing circuit 250, in a manner to be described hereinafter in more detail, receives the signals just discussed and, in turn, output signals to many devices. Among them will be a signal to the drain lift relay 239 to operate the drain lift valve 238, shown also in FIG. 5C, which physically lifts the evacuation tubes 165 and 166 out of the low flow bucket 163 and high flow bucket 164 as desired by the operator, by means of the extractor cylinder 168. This occurs automatically when the cycle start button 251 is pushed.

The operator, to start the test, must push the cycle start button 251 previously described, and if the test must be aborted for any reason, he has an abort switch 252 available to him should the occasion arise. To indicate to the operator the condition, or the status, of the mode of the weigh scale subsystem there are provided a cycle abort light, a cycle light and a test light 254, 255 and 256 respectively. Once all of these signals are supplied to the time weight scale control and timing circuit 250, this circuit can begin its operation and, in turn, supply further signals to the various other circuits.

Primary among these are the circuits that control the actual weigh scale to dynamically weigh the fuel as it is put into the flow buckets 163 or 164 as previously discussed. These circuits include the power supply circuit 258 which supplies power to the electronics of the weigh scale and is connected to the poise control circuit 263, which is the circuitry that keeps the scale level by moving the poise weight while the scale is filling with the fluid flowing through the flow meter. This is accomplished by means of the poise motor 262 and the linear variable displacement transformer 261, in combination with the encoder 260.

The encoder 260, in turn, supplies a signal to the pulse encoder circuit which enables one to determine the position of the scale and calculate the weight that has been placed in the scale during the test time. This signal is then supplied to the time weight display circuit 264 which makes the calculations necessary to display the weight on the time weight display 241. A pounds/grams select switch 244 is operatively connected to the time weight display circuit so that the time weight display will either read in grams or pounds.

Connected to the time weight display 241 is a weigh scale display test switch 242 which lights up all the segments of the time weight display when it is depressed. Also connected to the time weight display 241 is a weigh scale reset button 243.

Figure 8:
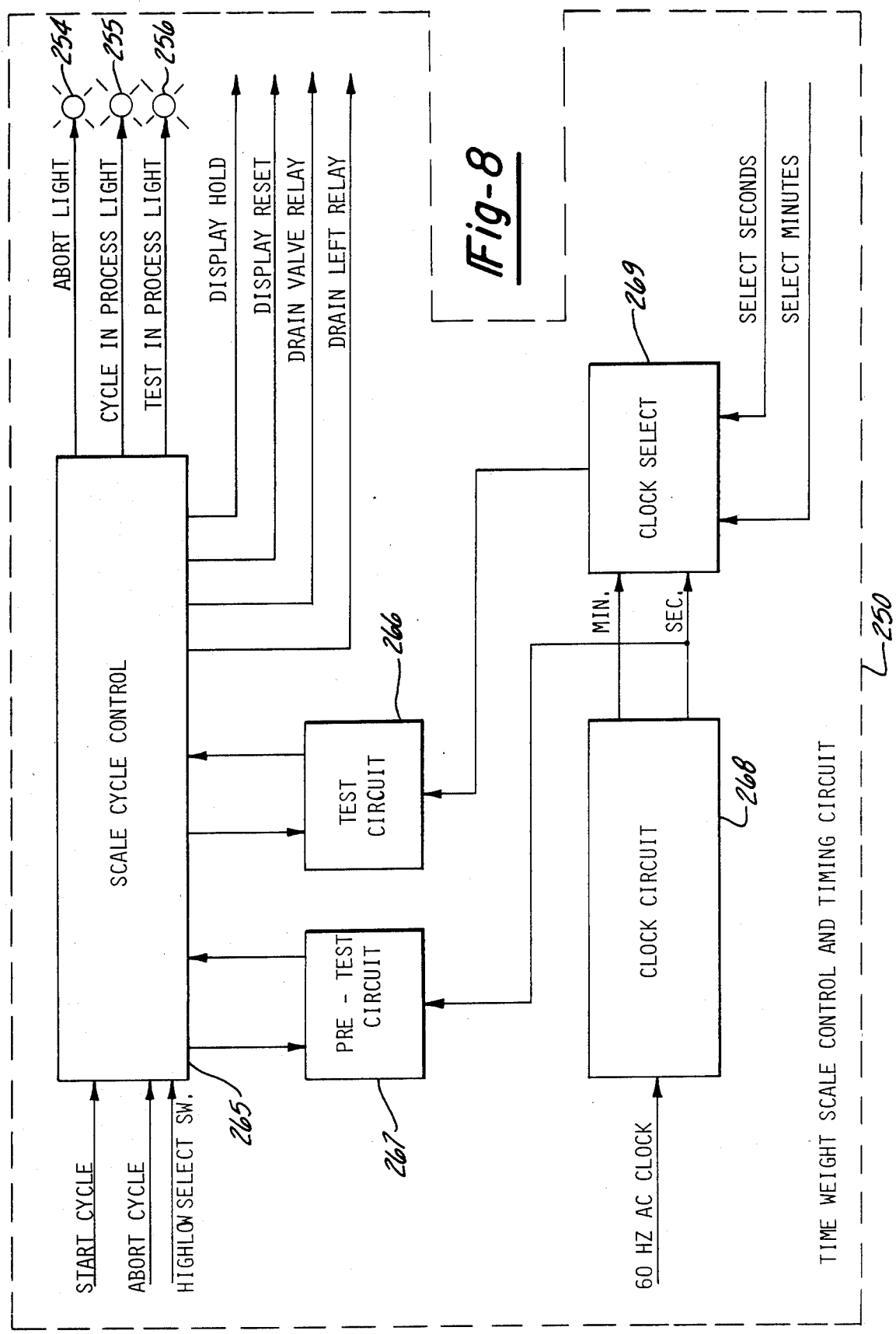
FIG. 8 is a block diagram of the time weight scale control and timing circuit shown in FIG. 10.

A more detailed illustratration of the time weight scale control and timing circuit 250 is shown in FIG. 8. As can be seen in FIG. 8, the time weight scale control and timing circuit can be further broken down into a scale cycle control circuit 265 which sends and receives signals via connections to the pretest circuit 267 and the test circuit. Connected to the test circuit is a clock select circuit 269 which receives a signal from the test time unit switch 247 previously described on FIG. 10. To enable it to supply the proper time interval to the test circuit, it receives minutes and second inputs from the clock circuit 268. Since the pretest time is always in seconds, seconds are directly supplied from the clock circuit 268 to the pretest circuit 267 and, in turn, to the scale cycle control 265.

All of this enables the scale cycle control 265 whenever a start cycle signal is received from the cycle start button 251, together with a high flow-low flow select signal from the the high flow-low flow select switch 197 (FIG. 12) to light the cycle in process light 255, to choose between the high flow extractor tube 165 or the low flow extractor tube 166, and to also operate the drain lift relay 239 to operate the drain lift relay 240 to remove the extractor tubes 165 and 166 from the scale high flow and low flow buckets 163 and 164 respective.

If for some reason an abort cycle signal is received from the abort test switch 252, the scale cycle control 265 also has the ability to light the abort light 254, turn off the cycle in process light and/or the test in process lights 255 and 256 respectively, send a display hold signal to the time weight display 241 to freeze the display, and operate the drain lift relay 239 to operate the drain lift 238 in a manner to lower the extractor tubes 165 and 166 into the high flow and low flow buckets 163 and 164 respectively.

Also, if the test is operating normally, at some point the pretest time will be completed, and then the test in process light 256 will light, and the cycle in process light 255 will remain lit, and at the same time a brief display reset pulse will be supplied to the time weight display 241 to reset it to zero.

Assuming the test runs normally to completion, at some point the test circuit 266 will signal the end of test, at which time the cycle in process light and the test in process lights are turned off, a display hold signal is supplied to the time weight display 241 to freeze the reading thereon, a signal is supplied to the drain valve relay 240, and a signal is supplied to the drain lift relay 239 to operate the drain lift 238 to lower the extractor tubes 165 and 166 into the buckets 163 and 164. For a more detailed illustration of the cycle control circuit 265 to describe the manner in which the pretest circuit 267 supplies signals to the scale cycle control circuit 265 to determine the length of the pretest portion of the flow meter calibration, one may refer to the illustration of the pretest circuit 267 on FIG. 21A.

As before, the operator sets the pretest time in seconds by means of the pretest select switch 245 shown in FIG. 4 and, more particularly, by means of the pretest thumbwheel switches 245A and 245B which are connected in a manner well known in the art to identical pretest counters 270, which are adapted to include a start pretest signal and send end pretest and pretest clock signals and receive the pretest clock.

Likewise, the test circuit 266 receives signals from the test time select switch 246 through the thumbwheel switches 246A and 246B which are operatively connected to identical counters 271. The same start pretest signal which loaded the counters 270 in the pretest circuit 267 is used to load the counters in the test circuit 266. The counters 271 are adapted to receive the test clock signal from the second NAND gate 287 which receives a signal from the cycle latch 281 everytime a signal is received from the start cycle pulser 273, which occurs when the start test signal is applied to the reset pulser 272.

Figure 21B:
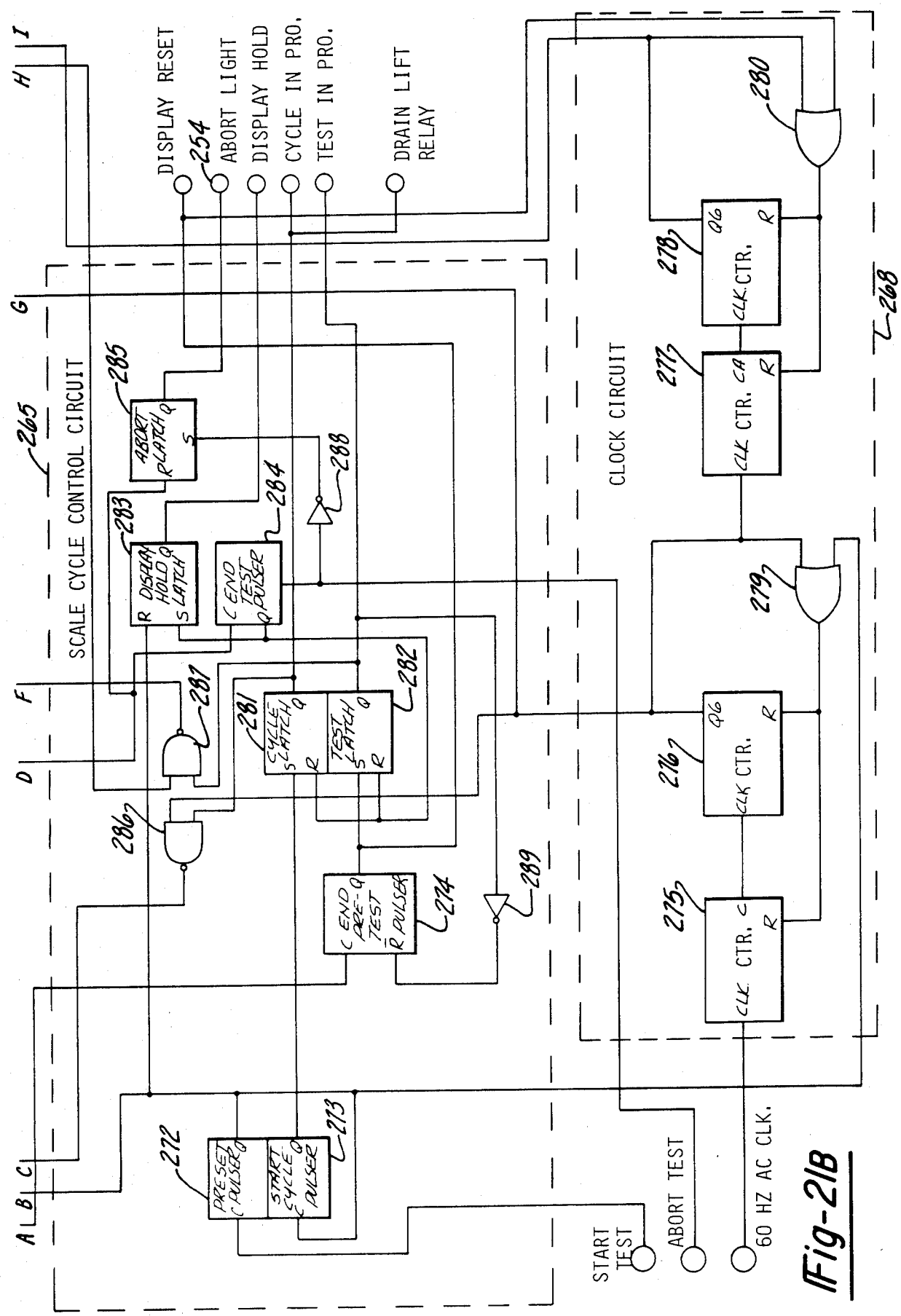
FIG. 21B is a circuit diagram of the clock circuit and scale cycle control circuit shown in FIG. 8.

As can be seen, the same start pretest signal that loads the counters 270 and 271 is also used to reset the display hold latch 283 (FIG. 21B). The display hold latch 283 is, in turn, set or turned on by the end test pulser 284, and this causes a display hold signal to be sent from the display hold latch. The end test pulser will turn on the display hold latch when a signal is received. Two things may cause the end test pulser 284 to send a signal to a display latch. Either an end test signal coming down from the counters 271 to the end test pulser 284, or an abort test signal, which will cause a test to end at any time.

If the end test pulser 284 is activated by an abort test signal, a signal is also sent through the first inverter 288 to the set input of the abort latch 285, which causes an output to the abort light to be sent. It should be understood that the abort latch has a reset input which is dependent on the end test signal coming from the counters 271. When the counters 271 are loaded by the start pretest signal, the end test signal is turned off, thus resetting the abort latch 285. Thus, the abort latch is continually reset, ready to receive the abort test signal at any time.

The end pretest signal coming from the counter 270 in the pretest circuit 267 comes down and enters the clock input of the end pretest pulser 274, causing the Q output from the end pretest pulser to cause the weigh scale display 241 to reset. Such output then continues through the set input of the test latch, causing the Q output from the test latch to send a test in process signal. That output is also supplied through the second inverter 289 to reset the end pretest pulser 274 and enable it to receive the next subsequent end pretest signal.

When the output of the end pretest pulser 274 is providing a display reset signal, the same output is provided to one input of the second clock OR gate 280, which causes the third and fourth clock counters to be reset to zero. It can be seen that the third and fourth counters, 277 and 278 respectively, are second and minute counters respectively, by tracing the circuit from the input from a 60-hertz AC clock to the clock input of the first counter 275, which also is inputted to the second counter 276. Since the first counter 275 is a decade counter, and does not reset itself, it has the effect of dividing the input of the 60-hertz AC clock by ten and making a 6-hertz input to the clock input of the second counter 276. We choose to use an output from the Q6 output of said counter, which gives this counter the effect of additionally dividing by six, making the Q6 output a 1-hertz output. This output is supplied to the clock input of the third counter 277, which will be described later, and every time the Q6 output passes through the first clock OR gate 279, the first and second counters, 275 and 276 respectively, are reset.

The Q6 output is used for many purposes in our circuit. It is supplied to an input of the first NAND gate 286 which, every time it receives a signal from the Q output of the cycle latch 281, enables the clock to be passed to the counters 270. Since the cycle latch output has previously been inputted to the othe side of the first NAND gate 286, such a signal being the pretest enable signal, this allows the pretest clock signal to be supplied to the countes 270.

Also, the Q6 output of the second clock counter 276 is then supplied to the clock select circuit 269. This clock signal is applied to the one input of the second clock select NOR gate 291 causing an output to be supplied to the OR gate 292 which, in turn, causes an output to be supplied to the second NAND gate 287, and causes the output from the OR gate 292 to be supplied as an input to the second NAND gate 287. The test latch 282, at this time will enable the output of the test clock signal to the counter 271 in the test circuit 266.

As previously mentioned, the Q6 output of the second counter was a 1-hertz output. That output, as can be seen, is also supplied to the clock input of the third clock counter 277, which is a further decade counter, which divides by ten and supplies that output to the input of the fourth clock counter 278. By again taking a Q6 output from the counter, we have effectively divided the 1-hertz clock signal by an additional factor of sixty, to have a 1/60-hertz signal, or one-minute signal, which is supplied both to the input of the second clock OR gate 280 to reset the third and fourth clock counters 277 and 278 respectively, and also to the input of the first clock select NOR gate 290.

The signal to the first clock select NOR gate 290, which arrives every minute, causes an output from the NOR gate at like intervals which is then supplied, as before, to the second NAND gate 287, which has been previously enabled, and thus causes the gate 287 to put out the test clock signal at one-minute intervals rather than one-second intervals.

It must be understood that the first clock select OR gate 292, and the first and second clock select NOR gates, 290 and 291 respectively, are enabled, or disabled, by the inputs from the test time unit select switch 247. For example, if the seconds line is always allowed to be high, and the minutes line is kept continuously low, only the first clock select NOR gate 290 will be enabled to pass signals through it to the OR gate 292, and in this fashion you have selected the minutes unit. If the situation is reversed, and the minutes line is kept high, the seconds line will be kept low, enabling the second clock select NOR gate 291 to provide the signal to the OR gate 292, and thus you will have selected a signal every second to the pretest as the test clock signal.

It therefore can be seen that the test clock signal, if it is in seconds, and the unit thumbwheel switch 246B is set at five, for example, will cause, in a manner well known in the art, the counter 271 to count five test clock signals before supplying the end test signal to the rest of the system. Similarly, if the minutes unit is selected, the test clock signal will arrive every minute, and if the unit thumbwheel switch 246 is set at five, the end test signal will not be supplied for five minutes. Thus, the operator is enabled to very carefully select the pretest and the test time and control them by means of the scale cycle control, the clock select circuit, and the clock circuits, 269, 265 and 268 respectively.

Having now selected the test time, the operator must turn his attention to the operation of the weigh scale to accurately measure the flow for the test time. As previously discussed, ours is a dynamic system. The means to control the scale, as described in FIGS. 10, 22A and 22B, include a pulse encoder circuit operatively connected to a power supply circuit 258. The power supply circuit 258 supplies power to the encoder 260, the linear vertical displacement transformer (LVDT) 261 and the poise control circuit 263. Operatively connected to the poise control circuit is the poise motor 262.

Now referring to FIGS. 22A and 22B, it can be seen that there is first provided a power supply circuit 258. It should be noted that a portion of the power supply circuit labeled 258A, and a portion of the pulse encoder circuit 259A are mounted in the stationary portion of the air gap transformer as indicated in FIG. 22A, while the remaining portion of the power supply circuit 258B, the remaining portion of the pulse encoder circuit 259B, as well as the poise control circuit 263 are mounted on the rotatable portion of the air gap transformer as shown in FIG. 22B.

To now understand the operation of the power supply circuit 258, it can be seen that system common and a positive 12-volt power are brought to the power supply circuit as shown in FIG. 22A. Since we desire to use an air gap transformer to supply power to the components mounted on the scale, such as the drive motor and the encoder, etc., to eliminate friction which is present in previous measuring scales due to electrical connections, etc., we must transform the 12-volt power supply in our system to an alternating current. We do this by using a known inverter circuit connected in the manner shown in FIG. 22A, consisting of a first voltage divider resistor 295 and a second voltage divider resistor 296 connected in series between system common and the system voltage.

Also in the inverter circuit as shown, is a frequency determining capacitor 299, positive and negative feedback resistors, 297 and 298 respectively, together with an oscillator operational amplifier 300, a positive driver operational amplifier 301, and a negative driver operational amplifier 302. The outputs of the amplifiers 301 and 302 are, in turn, connected as shown to a first pull-up resistor 303 and a second pull-up resistor 304 and, in turn, to a positive switching transistor 305 and a negative switching transistor 306 which have their collectors connected to the primary coil 307 of the air gap transformer at 307A and 307B respectively. A third pull-up resistor 308 is also connected as shown.

Now to describe the portion of the air gap transformer which is mounted to the scale as shown in FIG. 37, there are shown the secondary coil 309 of the air gap transformer. On the rotatable portion of the air gap transformer 310 is mounted the portion of the power supply circuit labeled 258B, which consists of a positive secondary coil 309A and a negative secondary coil 309B connected as shown. The positive secondary coil 309A is connected in a known manner to the positive rectifier 311, while the negative secondary coil 309B is connected to the negative rectifier 312.

In the known manner, these rectifiers are, in turn, connected to the plus 5-volt regulator, the plus 15-volt regulator and the minus 15-volt regulator 314, 315 and 316 respectively (FIG. 22B), which provide power outputs to the scale components of plus 5, plus 15, and minus 15 volts respectively. It should be understood that the air gap transformer 310 just described is one of three air gap transformers on the scale, and two additional air gap transformers identified as a second air gap transformer and a third air gap transformer, 342 and 344 respectively, are in the pulse encoder circuit 259. This circuit is also known from previous weigh scales built by Applicants' assignee.

Having now brought power to the scale components, we use the plus 15 and minus 15-volt signal sources to energize the LVDT 261 which will produce a signal indicating the linear displacement of the scale. This signal, which is used to control the speed of the poise motor to keep the scale in balance, is supplied to the poise control circuit which is novel and an improvement over Applicants' previous poise control circuits.

The signal from the linear voltage displacement transformer 261 enters the poise control circuit through the first signal conditioning input resistor 323, and then travels to the inputs of the signal conditioning operational amplifier 324 and integrating capacitor 326. The output of the integrating capacitor 326 and the signal conditioner feedback resistor 325 are connected together and the signal therefrom is supplied, both to the output of the signal conditioning operational amplifier 324, and to one side of the calibrating switch 327. The output of the signal conditioning operational amplifier 324 is connected through a driver input resistor 331 to the negative input of the driver operational amplifier 332.

Returning to the calibrating switch 327 just discussed, connected to the other side of the calibrating switch 327 is a first calibrating input resistor 328. Connected in parallel between the first calibrating input resistor 328, and the negative input of the driver amplifier operational 332, are a second calibrating input resistor 329, and the rate determining capacitor 330.

The output of the driver operational amplifier is connected to the base of a positive follower Darlington transistor, as well as to the base of negative follower Darlington transistor, 336 and 337 respectively, as well as to the input of a crossover capacitor 335. The emitters of the positive follower Darlington transistor 336, and the negative follower Darlington transistor 337, are tied together and are connected to the output of the crossover capacitor 335.

The collector of the positive follower Darlington transistor is hooked to the plus 15-volt power available in the system, while the collector of the negative follower Darlington transistor is connected to a minus 15-volt potential. The emitters of the transistors 336 and 337, which were previously discussed are, in turn, connected to the poise motor 262 with the other connection to the poise motor being connected to the power supply. Thus, current is now being supplied to the poise motor and it is ready for operation.

However, two additional components of the poise control circuit which contribute to making it novel and an advance over Applicants' assignee's previous poise control circuit must still be discussed. These involve the driver feedback resistor 333 and the driver integrating capacitor 334 which are in parallel and connected between the emitters of the Darlington transistors 336 and 337, and the negative input of the driver operational amplifier 332.

Applicants have found in their previous poise control circuits two serious and opposite problems in attempting to dynamically weigh fuel while it is being introduced into a flow bucket on a weigh scale.

In the run mode, at very low flows, where you have fuel literally dripping into a bucket or, even worse, dripping slowly one drop at a time into a bucket, with Applicants' previous poise control circuit, the signal supplied by the linear variable displacement transformer 261 to the circuit would reflect this dripping type of flow even with the provision of the dash pot 338, and Applicants' felt that some type of integrator circuitry with a very low gain would be desirable to overcome this problem.

However, these are just the opposite requirements which are needed when one is to calibrate the scale by placing a dead weight in one of the weigh pans, and in such calibration it is desired to have the poise weight go quickly to one position and stop. If one attempts to calibrate with low gain and high integration, there will be such a time lag that the signal from the linear vertical displacement transformer will not get through the integrator circuitry in time to make the appropriate correction signal to the poise motor, and you will end up with a serious hunting condition in which the poise weight never stops.

Overcoming these mutually opposite problems provided a serious challenge to Applicants until their novel circuitry was discovered. Applicants felt that since the weigh scale operates in the run mode for a great percentage of the time, the circuitry that they build should have low gain with high integration and, indeed, it can be seen that the novel poise control circuit has a two-stage integrator function built in, but how to make this run in a calibrate mode reliably alluded Applicants until they came up with the idea of add on circuitry which would bypass such circuitry when required.

Applicants knew that they had to add gain without affecting the reliability of the integrator circuit, and had to subtract the integrator function, again without affecting reliability. Applicants finally achieved this by placing the calibrate switch 327, the first calibrate input resistor 328, and the second calibrate input resistor 329 in parallel with the driver input resistor 331 so that, when the calibrate switch was closed, and, in effect, two resistances were put in parallel, this had the effect of giving a DC gain boost because the resistance in effect was lowered between the two operational amplifiers 324 and 332.

To achieve this effect simultaneously with converting the system to a low integration system, Applicants added a derivative effect to the circuitry, which is the inverse of the integrator effect, by placing the rate determinant capacitor 330 in parallel with the second calibrate input resistor 329. Thus, when the calibrate switch 327 is in its closed position, the circuitry has high gain with low integration for use in the calibrate mode, while when the calibrate switch is open the reliability of the circuitry which was carefully designed to provide low gain and high integration for the run mode at very low flows is preserved. Thus, Applicants have solved a long standing problem in the art as to how to dynamically measure low flows in a weigh scale in quick and accurate manner.

The remaining circuit which must be described to complete the description of the circuits related to the operation of the scale is the known pulse encoder circuit 259. As was previously discussed, power has been supplied to the encoder 260 which is mounted on the weigh scale at the opposite end thereof from the poise motor 262. The encoder output signals are supplied in the manner shown, and are connected one each to an up pulse follower transistor 339 and a down pulse follower transistor 340. The emitter of the up pulse follower transistor is connected to the primary coil 341 of the second air gap transformer 342, while the emitter of the down pulse follower transistor is connected to the primary coil 343 of the third air gap transformer 344.

Mounted to the stationary portion of the air gap transformer 344 is the secondary coil 345. The secondary coil of the second air gap transformer is indicated by the numeral 346 and this coil is connected through the up base resistor 347 to the base of the up inverter transistor 349, while the secondary coil 345 of the third air gap transformer 344 is connected through the down base resistor 348 to the base of the down inverter transistor 350.

The emitters of both the up inverter transistor and the down inverter transistor, 349 and 350 respectively, are connected to the system common. The collector of the up inverter transistor 349 is connected through an up pull-up resistor 351 with the 5-volt regulator 294 in the power supply circuit.

The collector of the down inverter transistor 350 is connected through the down pull-up resistor 352 with the same terminal on the 5-volt regulator 294. The collector of the up inverter transistor 349 is also connected to the input of the up count pulser 353, while the collector of the down inverter transistor is also connected to the input of the down count pulser 354.

The output of the up count pulser 353, in turn, is connected to the base of the up output follower transistor 359, while the output of the down count pulser 354 is connected to the emitter of the down output follower transistor 360. The base of the up output follower transistor 359 is connected to system common through the up emitter resistor 361, while the emitter of the down output follower transistor 360 is connected to system common through the down emitter resistor 362.

A major portion of the pulse encoder circuit past the air gap transformer itself has the function of improving the countability of the encoder pulses. Since the gap of the air gap transformers 342 and 344 can vary during operation, and the device is variable in other ways, the pulses coming from those secondary coils 345 and 346 can vary in characteristics from the pulses present at the primary coils 341 and 343 and make countability difficult and thus effect the accuracy of the system.

By supplying the pulses to the count pulsers 353 and 354, the pulses are amplified, stretched out and made more uniform to make for easier countability when they are supplied through the up count output and the down count output to the time weight display circuit 264 which is more fully described in FIG. 35.

We have now explained the circuitry involved with the air gap transformer, and to now show how the air gap transformer is physically mounted to the weigh scale, one may refer to FIG. 43 for a more detailed illustration of the complete air gap transformer, generally designated by the numeral 575, and the mounting thereof.

It can be seen that the axis of the air gap transformer 575 must be mounted on the center line of the primary fulcrum of the weigh scale. The transformer itself consists of a stationary portion 575A fixed to the scale base 600, and a movable portion 575B fixed to the upper scale beam 596.

As described, interposed between the rotatable portion of the transformer 575B and the upper scale beam 596 are several printed circuit boards containing on various portions thereof parts of circuits 259B, 263 and 258B which are portions of the time weight scale control and timing circuit 250.

Mounted on the stationary portion of the air gap transformer 575A are the primary coils 307A and 307B from the power supply circuit, the second coil of the third air gap transformer 345 and the second coil of the second air gap transformer 346.

Mounted on the rotatable portion 575B of the transformer are the primary coil of the third air gap transformer 343, the second coil of the primary coil 341 and the positive secondary coil 309A and the negative secondary coil 309B of the power supply circuit.

Although air gap transformers are old in the art, we found none satisfactory for our purpose of using with weigh scales, and had to manufacture our own transformer using standard available commercial parts. Even though the scale has been known in the art, to enable one to practice the invention easily, some description thereof is offered herein, primarily dealing with the winding of the primary coils about the cores necessary to make the transformer operate.

In regard to the primary and secondary coils of the power supply circuit, the core is what is known as a "ferroxcube" No. 3622 material with the primary coils 307A and 307B being wound with 50 turns of No. 24AWG wire in a bifilar wound pattern which, in effect, gives you a center tapped primary coil. The second coils 309A and 309B are each wound with 120 turns of No. 20AWG wire in a bifilar wound pattern which, in this case, gives you isolated secondary coils.

In regard to the primary coils 345 and 346 of the pulse encoder circuit, these are made of a ferroxcube No. 1408 material and both the primary windings 345 and 346 and the secondary windings 341 and 343 are made with 100 turns of a No. 34AWG wire. It is believed that no further description of the air gap transformer 575 is needed since this particular rotary transformer has been known to the art and, in addition, numerous texts and manufacturers' instructions are available to one skilled in the art.

A more detailed illustration of the time weight display circuit 264 is shown in FIG. 35. We can see that the time weight display circuit consists of a decimal select circuit 620 receiving a select signals such as the high-low select and the pounds/grams select signals as chosen by the operator. The decimal select circuit 260 outputs a signal to the 6½ digit display decoder and driver circuit 621.

The select signals just mentioned are also supplied to a scaling circuit 623. A reset signal is supplied to the seven decade BCD counter circuit 622 which also receives the output of the scaling circuit 623.

A clock signal is supplied to the input circuit 624 and the output of input circuit 624 forms the second input to scaling circuit 623. All of this has the effect of providing a signal from the seven decade BCD counter 622 to the 6½ digit display decoder and driver circuit 621, which it will be recalled is receiving an input from the decimal select circuit 620, and causing an output to go from this circuit to the time weight display 241. A more detailed description of the block diagrams of FIG. 35 can be obtained by referring to FIGS. 36A and 36B.

The purpose of the decimal select circuit 620 is to place the decimal point in the correct position in the time weight display 241 depending on whether the pounds or grams input are selected from the pounds/grams switch 244, or the high and low flow through the injectors is selected by the high-low select switch 197. Based on these selections, you could have four possible positions of the decimal point on the meter. This is because you can have four different combinations of flow. You can have pounds of flow in low or high flow, and grams of flow in low flow or high flow.

To illustrate the outputs occurring, let us first assume that we have signals coming in on the pounds and low flow lines, which would supply an input to one input of the first decimal select NAND gate 625 and to one input of the second decimal select NAND gate 626. The output of the first and second decimal select NAND gates respectively are supplied to the input of the first and second decimal select inverters, 629 and 630 respectively.

The output of the first and second decimal select inverters is in each case outputted. The output of the first decimal select inverter 629 goes to the input of the most significant digit 633, while the output from the second decimal select NAND gate 626 goes through the second decimal select inverter 630 to the second most significant digit 634.

Since we must, of course, have along with the indication of pounds a low or high indication, let us assume now that we have a low indication, which will cause an input into the third decimal select NAND gate 627. Since there is not an input from the grams input to the third decimal select NAND gate 627, there will be no outputs from that AND gate, but there will be now the second input, because of the low signal, to the first decimal select NAND gate 625 which will be passed through the first decimal select inverter 629 to the most significant digit which will now light a decimal point.

It can be seen by tracing the various combinations that, for having the pounds and high signal, a signal will travel from the second decimal select NAND gate 626 through the second decimal select inverter 630 to the second most significant digit 634. Taking the grams low and high examples, when you have a grams and a low signal, it can be seen that a signal will pass through the third decimal select NAND gate 627 and through the third decimal select inverter 631, to the fourth most significant or middle digit 636. Similarly, when a grams and high signal is present, an output will be forthcoming from the fourth decimal select NAND gate 628 through the fourth decimal select inverter to the fifth most significant digit 637.

It can be seen that in the present embodiment of our invention, we choose not to use decimal points associated with the third most significant digit 635 and the sixth and seventh most significant digits 638 and 639 respectively.

As just described, the pounds and grams signals also are supplied to one input of the scaling circuit 623 and are supplied one each to the input of the first scaling circuit AND gate 640 (FIG. 36B) and the second scaling circuit AND gate 641. At the same time the grams and pounds signals are being supplied to the first scaling circuit AND gate 640 and the second scaling circuit AND gate 641, the up and down clock signals from the pulse encoder 97 are being supplied to the first input latch 643 and the second input latch 644. The Q bar output from the first and second input latches is being supplied is connected to the inputs of the two input NOR gates 645 and to the count polarity latch 646.

Depending on whether grams or pounds are selected, the output of the two input NOR gate 645 is supplied to each of three identical rate multipliers 647, and also to the second input of the second scaling circuit AND gate 641, which, if a pound signal is being supplied, will cause an output to occur from the scaling circuit OR gate 642 and provide an input to both the up NAND gate 648 and the down NAND gate 649, and depending on which of the first input latch or second input latches are supplying the signal to the count polarity latch, the other input to the up NAND gate 648 or the down NAND gate 649 will be provided which is necessary to provide the proper signals to the counter circuit 622.

It should be noted that in the case where the grams signal is being supplied to the first scaling circuit AND gate 640, the grams conversion factor of four, five and four are set into the rate multipliers 647, which will cause the correct count to be transmitted through the first scaling circuit AND gate 640 and the scaling circuit AND gate 641 and scaling circuit OR gate 642 to the inputs of the up NAND gate 648 and the down NAND gate 649.

Here again, depending on whether the first input latch 643 or second input latch 644 is supplying a signal to the count polarity latch 646, either the up NAND gate 648 or the down NAND gate 649 will receive the second input which it needs to provide an output through the counter circuit 622.

To now describe the counter circuit in more detail, it can be seen that this circuit receives a manual reset signal from the auto manual switch 363 and an auto reset signal from the float detection control circuit 381. This signal comes into a reset OR gate 650. It is to be noted that it does not matter which of these signals is being supplied, as it long as either signal is being supplied, an output will be provided from the reset OR gate to each of the seven BCD counters in the seven decade BCD counter circuit 622. Providing that neither the auto reset or manual reset signals is causing an output from the reset OR gate 650, the counters will immediately start counting up or down upon receipt of an up or down signal from the scaling circuit 623 and this will continue until either the auto reset or manual reset signal is received by the reset OR gate 650 which will immediately, but momentarily, cause all the counters to be reset to zero. Each of the decade counters 651 in the seven decade BCD counter circuits are connected to a corresponding decoder driver 652 in the 6½ digit display decoder and driver circuit, except the most significant counter 651A, which is connected directly to a transistor driver circuit 623, well known in the art.

The decoder drivers 652, upon receiving signals from the decade counters, provide the appropriate seven segment code to the appropriate digits 633–639 respectively. In turn, the signals from the significant digits 633–639 provide the necessary signal to the time weight display 241 to illuminate the same, and provide the system operator with an accurate an instantaneous indication of the weight present in the weigh scale at any time.

Now that we have seen how the weigh scale in our system dynamically weighs fuel as it is placed on the scale to eliminate the problems long standing in the art due to scale friction, and the errors due to static weight and fuel drip effects at low flows, we shall now describe how the signals coming from the weigh scale are utilized to display the weight of fluid in the scale at any given time.

Referring now to FIG. 11, the electronics necessary to operate the detection subsystem of the present invention and, more particularly, the float detection system, are shown in block diagram form in FIG. 11. As previously discussed, it is necessary, during a flow meter calibration, to eliminate the need for an operator to keep the float at an accurate level by the use of his eyes to gauge the movement of the float.

As it has been shown, the float can fluctuate enough to greatly effect the accuracy of the calibration without the operator even being aware of it, or being able to correct it satisfactorily. We have, therefore, provided an electromechanical means of detecting and monitoring the position of the float in the flow tube as depicted in the float detector system 89A shown in FIG. 5.

It can be seen that the actual device which detects and keeps track of the float consists of an infrared transmitter 100, and a pair of dual photo receivers generally designated by the numeral 99 and including a high receiver 99A and a low receiver 99B. The transmitter and receiver are movable up and down the length of the flow tube by moving up and down as part of a float follower apparatus 93 on the ball screw 96, which is rotated by the stepping motor 95 in response to signals received from the high receiver 99A and the low receiver 99B.

Since the operator of our improved system must set up the float detection system before beginning flow into the weigh scale previously described, he is provided with a series of switches to perform this function, which operates through the float detector circuit. One set of these switches is provided on the control panel of FIG. 4 and these switches consist of a fast down switch 377, a fast up switch 376, a slow down switch 375, a slow up switch 374, a jog down switch 373 and a jog up switch 372. These switches operate through the float detector control circuit 381 to control the movement of the float follower 93 previously described.

A second set of identical switches are intended for remote use, and are illustrated at the bottom of FIG. 11, and are placed on the calibration apparatus 58 on the control panel 395 thereof. In this case, the fast down, fast up, slow down, slow up, jog down and jog up switches are numbered 393–388 respectively.

The operator will switch the system on by depressing the on-off switch 364 and will first select the manual mode of operation on the mode select switch 363. If necessary, he will test out the segment of the float detector position display 367 by pushing the light test switch 366 and reset it with the reset switch 365 before operating the manual button.

To set up the float detector subsystem 89A for use, the operator will make certain that the float 101 in the glass tube flow meter 78 is above or below the reference line on the glass tube 159. He will then cause the float follower 93 to be positioned between the reference mark 159 and the float 101 by use of the button just described. When the float is so positioned, the operator will depress the auto enable switch 371 which will cause the float follower 93 to automatically seek the float, and push the auto start switch 371 which, because the circuitry assumes that the float is always below the float follower 93, will cause the float follower to proceed in a downward direction, which it will continue to do until it detects the reference line 158.

At this point, the float detector control circuit will automatically cause the float detector position display 367 to assume a zero reading because of the operation of the float detector display circuit 379.

The float detector position display is enabled to display the position of the float because of the operation of the other circuits shown on FIG. 11. The LED transmitter 100 transmitting infrared light to the high receiver 99A and the lower receiver 99B across the float will give an indication of whether the float is high, low or in-band, and the test will continue to proceed as long as the float is in-band.

The receiver sends a signal to the optical conditioner circuit. The optical conditioner circuit 384 provides power to the transmitter 100, as well as receive signals from the receiver 99, and amplifies and decodes the signals into high, low and in-band signals, and supplies them to the float detector control circuit 381 for the purposes previously described.

To move the float follower 93 having the transmitter 100 and receivers 99A and 99B, a driver circuit 383 receives signals from the float detector control circuit when it is necessary to move the float follower and this, in turn, supplies the proper signals to the stepper motor 95, which causes the float follower to move up or down.

To accurately determine the location of the follower with respect to the reference point, which as previously discussed must be very accurately done, as this will be used to make the flow meter scale, the position pulse encoder 97 sends precise pulses in regard to its position to the float detector control circuit which converts these pulses into a distance from the reference mark and displays the same.

A more detailed illustration of the float detector control circuit 381, the optical conditioner circuit 384, the driver circuit 383, the transmitter 100 and receiver 99 can be obtained by referring to FIGS. 27B, 28, 29, 30, 31, 32, 33A, 33B, 33C, 34A, 34B and 34C. Such more detailed circuits also include the travel limit circuit illustrated in FIG. 11 which prevents the float follower 93 from extreme travel either up or down, which may bring it to the end of the ball screw 96 and cause damage to the apparatus.

Figure 7:
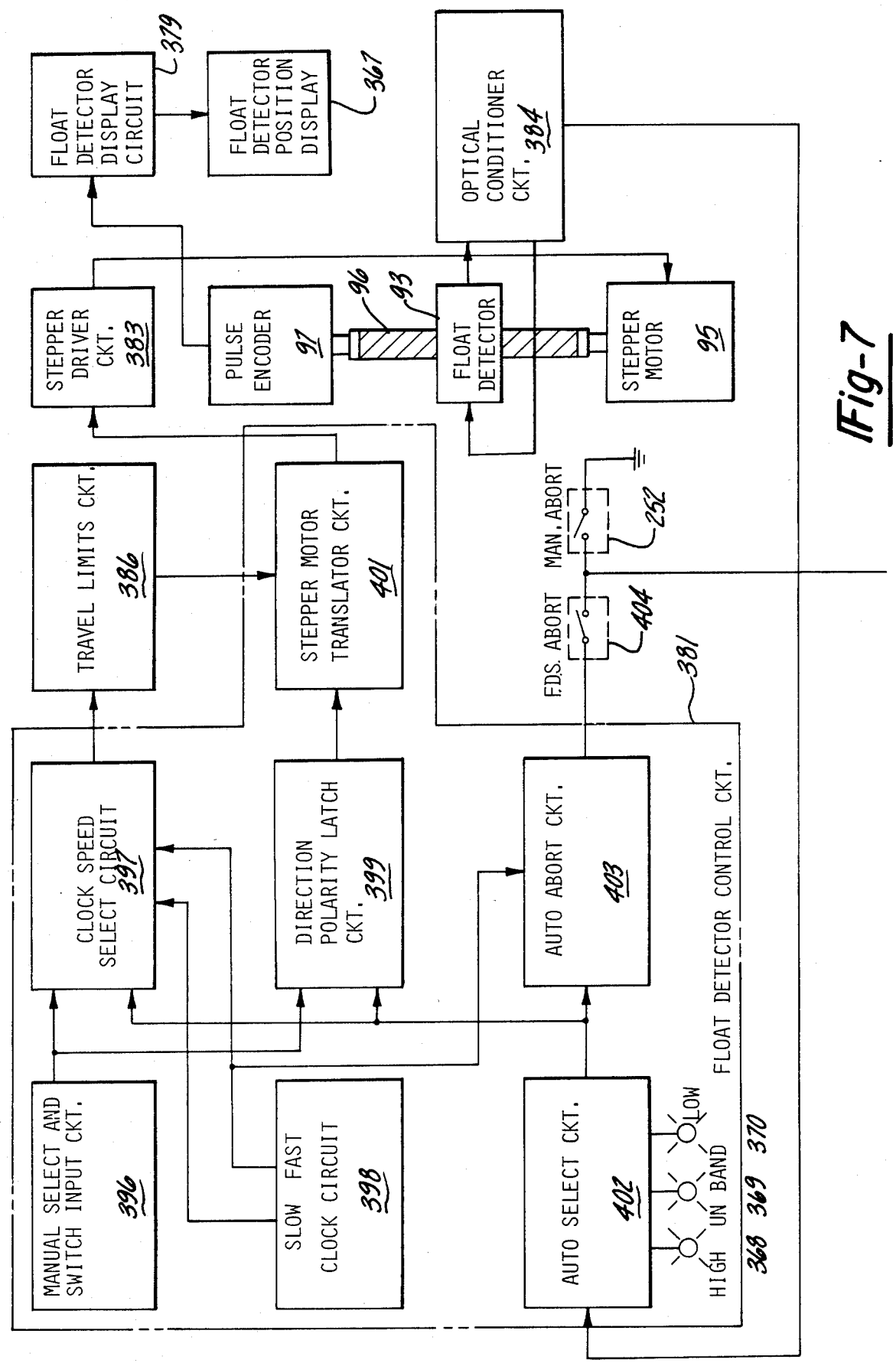
FIG. 7 is a block diagram of the float detection control circuit shown in FIG. 11.

Referring now to FIG. 7, the switches previously described which the operator uses to set up the float detection system and begin its automatic operation such as the mode select switch 363 and the auto enable switch 371, the fast down, fast up, slow down, slow up, job down and job up switches, 377, 376, 375, 374, 373 and 372 respectively, all input to the manual select and switch input circuit 396 within the float detector control circuit 381.

Depending on the switch the operator has pushed, for example, if he has pushed the fast up switch 376, the manual select and switch input circuit sends a signal to the clock speed select circuit 397 and the direction polarity latch circuit 399. Since we have assumed the operator has pushed a fast up switch 376, the direction polarity latch circuit will be latched in the up position.

While this is occurring, the clock speed select circuit 397 is continually receiving slow and fast signals from the clock circuit 398. Again, depending on which button is pushed, one of the signals will be passed through the clock speed select circuit to the travel limit circuit 386. The function of the travel limit circuit is to merely inhibit travel in a direction when a travel limit for that direction has been reached.

When a travel limit has been reached for a certain direction, the travel limit circuit discontinues passing the signals it receives from the clock speed select circuit 397 through to the stepper motor translator circuit 401. Under normal conditions however, when neither of the limits has been reached, the travel limit circuit 386 merely performs the function of passing whatever signals the clock speed select circuit outputs through to the stepper motor translator circuit 401.

The stepper motor translator circuit's function is to first of all receive a signal from the direction polarity latch circuit 399 which will tell the stepper motor which way to rotate, and then to use this signal in combination with the clock signal being received from the travel limit circuit. The stepper motor translator circuit takes the signals received from the travel limit circuit 386 and direction polarity latch circuit 399 and produces the specific four phase of signals needed to operate the stepper motor 95.

However, before these signals can operate the stepper motor 95, they pass through the stepper driver circuit 383 where they are amplified to the level necessary to operate the motor. The stepper motor 95, in turn, drives the float detector up or down, again depending on the switch selected by the operator.

While this happening, the turning of the ball screw 96 is, in turn, rotating the pulse encoder 97 which produces pulses, depending on the amount of rotation of the pulse encoder, and sends these pulses to the float detector display circuit 379. These pulses are acted upon to produce a signal to the float detector position display representing the position of the float detector to produce a readout of the position of the flow meter float in relation to the fixed reference mark 158 on the glass flow tube 78.

If the operator has finished the preliminary setup of the system and has the float detector on the reference mark 158, the operator will now choose to go into the automatic mode of operation after resetting the float detector position display 367 to zero by pressing the display test switch 366.

In order to go into the automatic mode of operation, the operator must depress the auto manual switch 363 to the auto position, the auto start switch 371, and, if he wishes the automatic abort 403 operational, he must press the FDS abort switch 404. If the switches are set so these operations occur, the optical conditioner circuit 384 which is receiving signals from the float follower 93 will pass through a condition signal to the auto select circuit 402 whose purpose is to indicate whether the float is high, low or in-band.

The auto select circuit, as previously discussed, is the circuit that determines whether the float is high, low or in-band. First, assuming that the float is in-band, the auto select circuit 402 will not supply any signal to the clock speed select circuit 397, the direction polarity latch circuit 399, or the auto abort circuit 403.

However, if the auto select circuit determines that the float is high, a signal will be supplied to the clock speed select circuit 397 which will, in this case, act to take the fast signals from the clock circuit and pass them through the travel limit circuit, the stepper motor translator circuit 401, and the stepper driver circuit 383 to the stepper motor 95, to cause the float to move in the upper direction at a fast rate of speed. This occurs because the signal from the auto select circuit 402 is supplied to the direction polarity latch circuit to latch it in the up position.

The reverse happens if the auto select circuit 402 determines the float is low. The same signal will be selected and sent to the clock speed select circuit 397 and the direction polarity latch circuit 399 to cause the float detector to operate in a down direction at a fast speed.

Because the auto select circuit 402 also supplies a signal to the auto abort circuit 403, which is, in effect, the timer circuit, the auto abort circuit using the fast signals from the clock circuit 398, acts as a time base which will accept a certain number of signals before causing an abort to occur, presuming the FDS abort switch 404 is in its closed position. If it is, a signal will be supplied to the time weight scale control and timing circuit 250 (FIG. 10) to cause the test to abort.

This completes a general description of the float detector control circuit, and a more detailed description of each of the circuits within this circuit can be had by referring to FIGS. 27A and 27B.

Referring now to FIG. 27A and, more particularly, the manual select circuit 396, it can be seen how the signals from the fast up, slow up, fast down, slow down, jog up and jog down switches, 376, 374, 377, 375, 372 and 373 respectively, are supplied from the switches to the clock select circuit 397. Each of the aforementioned switches is connected by suitable electrical connections to the hex switch debouncer 406, whose purpose is to condition the switches signal to eliminate any extraneous electrical signals which may occur when the switch contacts physically contacts each other.

Each of the signals from the switches is then passed through one of six identical inverters 407, and then by means of the shown connections to an exclusive OR circuit consisting of five exclusive OR gates 408 connected in the manner shown. The purpose of the exclusive OR circuit is to provide that a signal will be supplied to the clock select circuit if, and only if, only one of the switches 372–376 is pushed. It can be seen that if one attempts to push two buttons at a time, or one pushes none of the buttons, no signal will be supplied through the last OR gate which, although identical to the other four OR gates of the circuit has been indicated by the numeral 408A. It can now be seen that the operator setting of the switches 372–377 does lead to a signal being supplied to the clock select circuit 397 as just described. It can be seen that at the same time this is happening, the clock circuit 398 is also supplying signals to the clock select circuit 397.

As previously explained, the function of the clock circuit is to provide pulses to the clock select circuit and other of the circuits shown in FIG. 7. It does this through a well known oscillator circuit consisting of the two oscillator inverters 410, the oscillator capacitor 411, the oscillator variable resistor 412 and the oscillator resistor 413. Since this oscillator circuit is well known in the art, it need not be described further herein. It suffices to say that the output of the oscillator circuit is supplied to the divider circuit 414 which has three outputs, those being a Q4 output, a Q5 output and a Q7 output.

It can be seen that the Q4 and Q5 outputs are supplied to the clock select circuit, while the Q7 output is supplied to the auto abort circuit, which will be described later.

The signal from the last exclusive OR gate 408A then enters the logic matrix formed by the plurality of identical AND gates 409A–409H. It can be seen that the Q4 and Q5 outputs are continuously being supplied to AND gates 409A and 409B which, in turn, then continually output to the AND gates 409C–409F.

Thus, each time one of these AND gates receives a signal from the inverter 407, corrrresponding to one of the switches 373–376, that AND gate will provide an input to the eight input OR gate 415. It can be seen that the output of the eight input OR gate 415 is the signal which is supplied to the travel limit circuit 386 illustrated in FIGS. 27B and 7.

We have now described how the fast up, slow up, fast down and slow down switches, 376, 374, 377 and 375 respectively, provide a signal to the travel limit circuit. The jog up switch 372 and the jog down switch 373 provide a signal in a similar manner. The previously described manual enable signal from the last exclusive OR gate 408A was previously supplied to the identical AND gates 409G and 409H.

It can be seen that when the jog up switch is pushed, the signal from the corresponding inverter 407 goes to the other input of AND gate 409G, which then produces an output to the eight input OR gate 415, which then provides the signal to the travel limit circuit. Similarly, when the jog down switch 373 is pushed, the corresponding inverter 407 supplies a signal directly to the other input of the AND gate 409H which, in turn, provides a signal to the eight input OR gate 415 and then to the travel limit circuit 386.

It should be noted in connection with the jog up and jog down switches 372 and 373 respectively, that when these switches are pushed, there is only a single instantaneous signal supplied to the travel limit circuit. This is essentially because the corresponding AND gates 409G and 409H are not being continuously supplied with the clock signal input from the AND gates 409A and 409B, as were the inverters 409C-409F corresponding to the other switches in the circuit.

It is to be noted that there are still AND gates 409I and 409J in the clock select circuit. In a manner to be defined hereinafter, these are each receiving the fast clock signal from the Q4 output of the clock circuit previously described, and also have an input from the auto high and auto low signals from the auto select circuit also to be described below.

When the AND gate 409I, for example, receives a signal from the auto high signal from the auto select circuit, the output of AND gate 409I will be supplied to the input of the eight input OR gate 415, and the output of the eight input OR 415 then supplies a signal to the travel limit circuit.

Similarly, when the auto low signal is supplied to the input of the AND gate 409J, the output of said AND gate is supplied to the input of the eight input OR gate 415, which again supplies a signal to the travel limit circuit. This completes the description of the clock select circuit 397.

To now more fully explain the auto select circuit, one can refer to the illustration thereof in FIG. 27A, and will notice that the auto high and auto low signals are the signals coming from the optical conditioner 384 of FIG. 7. It is to also be noted that the auto start signal and the auto mode signal come from the auto start switch 371 and the auto mode switch 363 shown on FIG. 4.

Depending on the position of the float follower 93, and thus the signals coming from the optical conditioner circuit 384, either the auto high, in-band or low signals will be entering the auto select circuit at any given time.

As was previously described in setting up the system, the detector had to be set on the reference line, and the float had to either be above or below that reference line before the system can be placed in automatic mode by the operator to calibrate the flow tube at different positions automatically. It has already been described how the operator can put the float either above or below the reference line and set the detector to the reference line.

It will now be described how the system works in the automatic mode.

As was previously described, the operator, to place it in automatic mode, will select automatic mode on the auto manual select switch 363. Assuming in the first instance that the operator has the float below the reference line, and the float follower 93 must now track and lock onto the float 101, the operator will momentarily depress the auto start button 371 and, as described, the optical conditioner circuit always assumes the float below the reference line, and the auto select circuit will then cause the float detector 93 to move downward and lock onto the float.

In this case, as will be described, a low signal is caused to enter the auto select circuit, which causes the float follower 93 to proceed downward and find the float. This will be described in more detail in connection with FIG. 32.

In the second case where the float is above the float detector, which is locked on the reference line 158 on the flow tube 78, when the auto start button 371 is depressed and held, this will cause the float follower 93 to rise in relationship to the reference mark as long as the button is depressed. Normally, the operator will view the float follower 93 and observe it until it rises above the float, release the auto start button 371, which allows the float detector to reverse position, and come down and lock on the float, after which the float detector will track the float automatically as the flow is changed through the flow tube by the operator.

This occurs because as long as the button 371 is held, the float detector will rise because the signal being supplied from the auto start button 371 to the input of the single debounce circuit 419 is supplied through the auto select inverter 416D to the set input of the auto latch 420, and to one input of the auto select OR gate 417. The inputting of the signal to the auto select OR gate 417 produces an output therefrom to the input of one of the auto select AND gates 418, as well as to the high transistor 424 through the high base resistor 423.

The collector of the high transistor 424 will cause the high light 368 to light. It should be understood that the resistor transistor combinations in the auto select circuit act as light drivers.

To now return to the auto select AND gate 418A, this is also receiving an input from the Q output of the auto latch 420 as previously described, as is the input of the other auto select AND gate 418B. Since 418A and 418B are also receiving an input from one of the auto select inverters, depending on which inputs are being received, a signal is transferred to the inputs of one of the clock select AND gates, 409I or 409J, which, in turn, produce outputs to the eight input OR gate 415 which, in turn, supplies a signal to the travel limits circuits to be described.

The low signal being supplied to the system by the optical conditioner circuit, in addition to being supplied to the auto select AND gate 418, is also supplied through the low base resistor 425 to the low transistor 426, which causes the low light 370 to light. In addition, that signal travels to the auto abort circuit 403 and the direction polarity latch circuit 399.

In the case where the operator wants the float follower 93 to rise because the float 101 is above it, and is continuously holding down the auto start button 371, in addition to the low signal being continually supplied, a high signal will be supplied through the auto select inverter 416A and the auto select OR gate 417 to the input of the auto select AND gate 418 to the input of the clock select AND gate 409I, and then to the input of the eight input AND gate 415. It will also be supplied to the auto abort circuit 403 and the direction polarity latch circuit 399.

It should be understood that in this case the high signal and the low signal will both be present at the direction polarity latch circuit, but since the high signal is dominant in the direction polarity latch circuit, whereas the low signal is dominant in the optical conditioner circuit 384, the direction polarity latch circuit will cause the float follower 93 to rise, as long as the auto start button 371 is held in.

When the operator has caused the float follower 93 to pass the float 101, he will remove pressure from the auto start button 371, which will remove the dominant signal from the direction polarity latch circuit 399, allowing the low signal to again become dominant, and cause the float detector to move in a downward direction to seek and lock onto the float 101.

When the float follower 93 locks onto the float 101, because of the decoding of the signal from the optical conditioner circuit 384 which will be described later, an in-band signal is caused to enter the auto select circuit, pass through the auto select inverter 416B through the in-band base resistor 421 to the in-band transistor 422. As before, the in-band transistor, in combination with the in-band base resistor, acts as a light driver circuit, and will cause the in-band light 369 to light.

If the operator is through calibrating a flow meter, or is at any point in the operation of the system where he desires to go to manual mode, he will switch the auto manual switch 363 to the manual mode, which will remove the auto mode signal from the auto select circuit and supply a manual mode signal to the reset input of the auto latch 420 to reset the auto select circuit. The same signal will also be supplied to the direction polarity latch circuit 399 and act as an auto polarity inhibit signal for purposes to be described.

A relatively slow time base signal is supplied from the Q7 output of the divider circuit 414 to the auto abort time counter 433. This counter will be held in its reset mode, as long as neither the high nor low signal is being supplied to the auto abort circuit from the auto select circuit 402.

At the point where a high or low signal is being supplied to the auto abort circuit 403, because of the actions of the auto abort NOR gate 430, a reset signal will be supplied to the auto abort time counter 433. This will cause the Q5 output from the counter to be supplied to one input of the abort NAND gate 432, and the same signal which was supplied to the reset input of the counter 433 will be supplied through the auto abort inverter 431 to the other input of the NAND gate 432.

The NAND gate 432 having two inputs present will then output an abort signal to the FDS abort switch 404 which, if closed, will cause that signal to travel to the time weight scale control and timing circuit 250 (see FIGS. 7 and 10).

The circuit that controls the direction of the movement of the float detector is the direction polarity latch circuit 399 consisting of the first and second two input NOR gates 434A and 434B, together with the first and second four input NOR gates 435A and 435B. The signals previously supplied to the first and second four input NOR gates 435A and 435B by the clock select circuit 397 and manual select circuit 396, together with inputs to the four input NOR gates from the first and second two input NOR gates 435A and 435B, together with each of the four input NOR gates receiving a signal by cross coupling from each other, form the input to these portions of the direction polarity latch circuit 399.

The two input NOR gates 434A and 434B receive an input from the manual mode portion of the auto manual select switch 363. The first two input NOR gate 434A also receives an input from the auto low signal in the auto select circuit 402. The second two input NOR gate 434B likewise receives a signal from the auto high signal from the auto select circuit 402. The output of the second four input NOR gate 435B is then supplied to the travel limit circuit 386 and to the stepper motor translator circuit 401.

It will be recalled that the purpose of the travel limit circuit was to prevent damage to the float detection system due to excessive travel in either direction by the float follower 93. The travel limit circuit, as previously described, receives signals from the direction polarity latch circuit 399 and the clock select circuit 397. In addition, signals are received from the travel limit switches 387 (FIG. 11).

Normally, you will not be receiving either the high limit or the low limit signals 387 because the float detector will not have reached either of the preset limits. This will result in off signals being supplied to both the first travel limit inverter 436A and the second travel limit inverter 436B. This, in turn, because of the action of the inverters, results in on, or high, signals being supplied to one input each of the first travel limit OR gate 437A and the second travel limit OR gate 437B. Because of the nature of the OR gates, they will both output to the inputs of the first travel limit AND gate 438 which will provide one of the inputs to the second travel limit AND gate 438A enabling the clock signal to be passed through the second travel limit AND gate to the stepper motor translator circuit 401 enabling the stepper motor to be operated.

However, as soon as a low limit or high limit signal is supplied, the situation changes. For purposes of illustration, let us presume that on signal is received from the low limit switch portion of the travel limit switches 387. This will then result in an off signal being applied from the second travel limit inverter 436B to one of the inputs of the second travel limit OR gate 437B.

Assuming at this point that the direction polarity latch circuit 399 is causing the stepper motor to travel in a down direction, you will have neither input to the second travel limit OR gate 437B. Even though you are still getting an output from the first travel limit OR gate 437A to the input which, in turn, causes one input to go to the first travel limit AND gate 438A, since the second input is not present there will be no output to the second travel limit AND gate which will not enable the clock signal to travel to the stepper motor translator circuit 401 causing the stepper motor to stop.

Presuming that the float detector 93 has been caused to reach its low limit by excessive downward travel of the float, at this point the operator must either change the flow through the flow meter 78 to cause the float to go up, and thus the float follower to follow it if we are to leave the system in the auto mode, or he must go into the manual mode and take the necessary actions to cause the float detector 93 to travel in the opposite direction.

When the operator does this, he will change the polarity of the signal being received from the direction polarity latch circuit. This will cause the input to the second travel limit OR gate 437B from the direction polarity latch signal to go to its high condition, thus, because of the input coming from the first travel limit OR gate being high and the output now coming from the second travel limit OR gate being high, will cause an output to come from the first travel in the AND gate into the second travel limit AND gate once again enabling the clock signal to be passed through to a stepper motor translator circuit 401.

Similarly, if the high limit signal is being supplied to the input of the first travel limit inverter 436A from the high limit portion of the travel limit switches 387, this will cause a low signal to be outputted to the input of the first travel limit OR gate 437A. Similarly to what happens before, the high signal coming from the direction polarity latch is inverted by the third travel limit inverter 436C causing two low signals to be present at the inputs of the first travel limit OR gate 437A.

Similarly to that just described, this prohibits the clock signal from passing through to the stepper motor translator circuit 401. Again, the operator must take the appropriate action to reverse the travel and enable the stepper motor to operate again.

In order to drive the stepper motor 95, it is necessary to have a stepper motor driver circuit and a stepper motor translator circuit 401. The stepper motor translator circuit has already been described as receiving the clock signal from the travel limit circuit 386, and the polarity signal from the direction polarity latch circuit 399, these signals are received by the clock and up down inputs of the binary counter 440.

These signals are converted with the aid of the stepper motor translator exclusive OR gate 441, and the first and second stepper motor translator inverters 442A and 442B into the standard four-step four-phase sequence needed by stepper motor translator circuits known in the art. While we have chosen to build our own stepper motor translator circuit 401, it should be understood that this circuit may be replaced by one well known in the art, such as one manufactured by the Superior Electric Co. and known as STM 1800, and our invention will work equally as well.

To continue with a description of our stepper motor translator circuit 401, it can be seen that there are four identical output circuits consisting each of a stepper motor translator inverter 442, a stepper motor translator output base resistor 443, a stepper motor translator output transistor 445 and a stepper motor translator pull-up resistor 446 to carry the four phases of signals necessary to drive the stepper motor to the stepper motor driver circuit 383. For purposes of illustration, we have numbered the first through fourth stepper motor translator circuits 442C–442F respectively, while we have numbered each of the stepper motor translator output base resistors 443A–443D respectively. Similarly, each of the four stepper motor translator output transistors have been labeled 445A–445D respectively, while each of the four stepper motor translator pull-up resistor has been labeled 446A–446D respectively.

A detailed description of the stepper driver circuit 383 is given in FIG. 26. It can be seen than the phase one, phase two, phase three and phase four signals being supplied by the stepper motor translator circuit 401, previously described, are being inputted to the driver circuit into corresponding Darlington transistors.

The phase one signal will be supplied to the first stepper motor driver transistor 448, the phase two signal will be supplied to the second stepper motor driver transistor 449, the third stepper motor driver transistor will receive the phase three signal, while the fourth stepper motor driver transistor will receive the phase four signal.

It is to be understood that the first, second, third and fourth stepper motor driver transistors 448–451 respectively, are identical Darlington transistors and may be such as Motorola Model No. MJ3000 manufactured by Motorola Semiconductor Products. Although not numbered, each of the stepper motor driver transistors include an identical diode as illustrated as part of the product. It is not felt that additional circuit description need be given on these items, since they are standard commercially available items.

The output from the selector of the transistors is then supplied to the stepper motor. For example, the emitter of the first stepper motor driver transistor 448 would supply a phase one output to the stepper motor 95 and similarly, the output of the second stepper motor driver transistor 449 would supply a phase two output to the stepper motor. Likewise, the third and fourth phase outputs are supplied by the outputs of the third and fourth stepper motor driver transistors 450 and 451 respectively, thus supplying the standard input to the stepper motor 95 needed by the well known commercial devices. The stepper motor has ample instructions with it for use by one skilled in the art, and may be such as Model No. MX111F012 manufacture by the Superior Electric Company.

To complete the description of the stepper motor driver circuit, it is to be noted that the stepper motor current limiting resistor 452 is placed in series between the stepper motor common and the power supply.

To understand how the float 101 is tracked, it is necessary to have a detailed description of the optical conditioner circuit 384. A detailed illustration of the optical conditioner circuit can be had by referring to FIGS. 32, 33, 33A, 33B and FIG. 33C.

Figure 32:
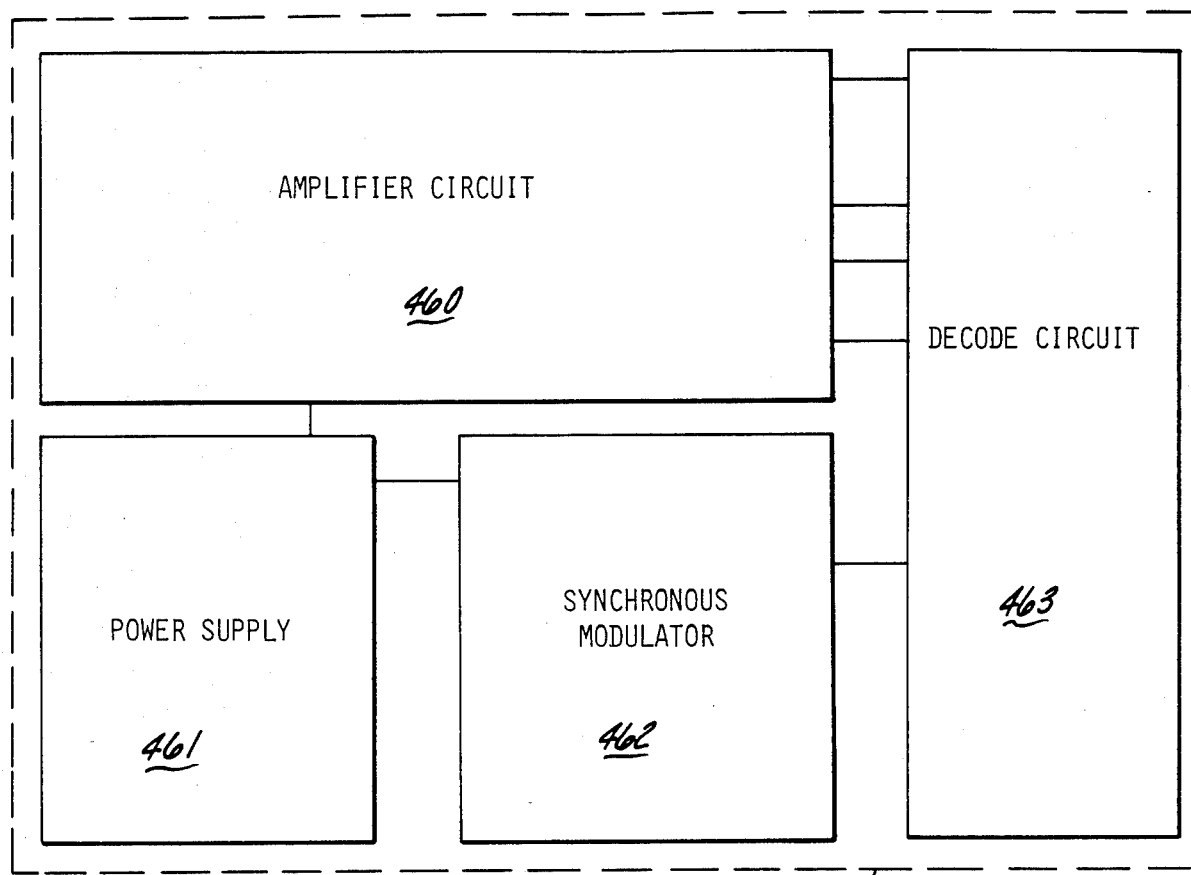
FIG. 32 is a block diagram of the optical conditioner circuit shown in FIG. 11.

A block diagram of the optical conditioner circuitry 384 is shown in FIG. 32. It can be seen that this circuit consists of a power supply 461, a decode circuit 463, an amplifier circuit 460 connected to said power and said decode circuit, and a synchronous modulator 462 connected to the power supply and the decode circuits.

Figure 33:
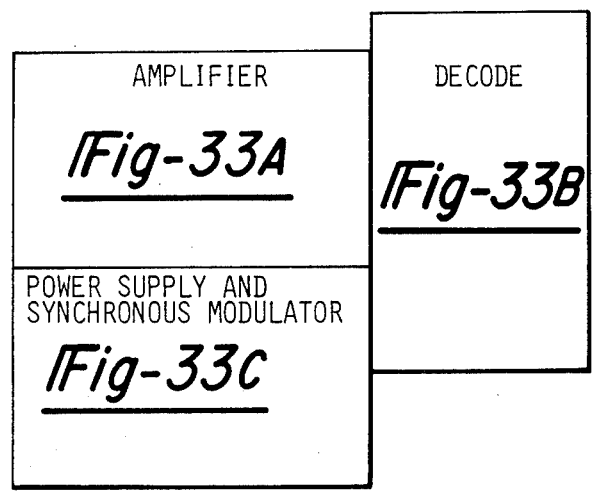
FIG. 33 is a view showing the arrangement of FIGS. 33A, 33B and 33C.
Figure 33A:
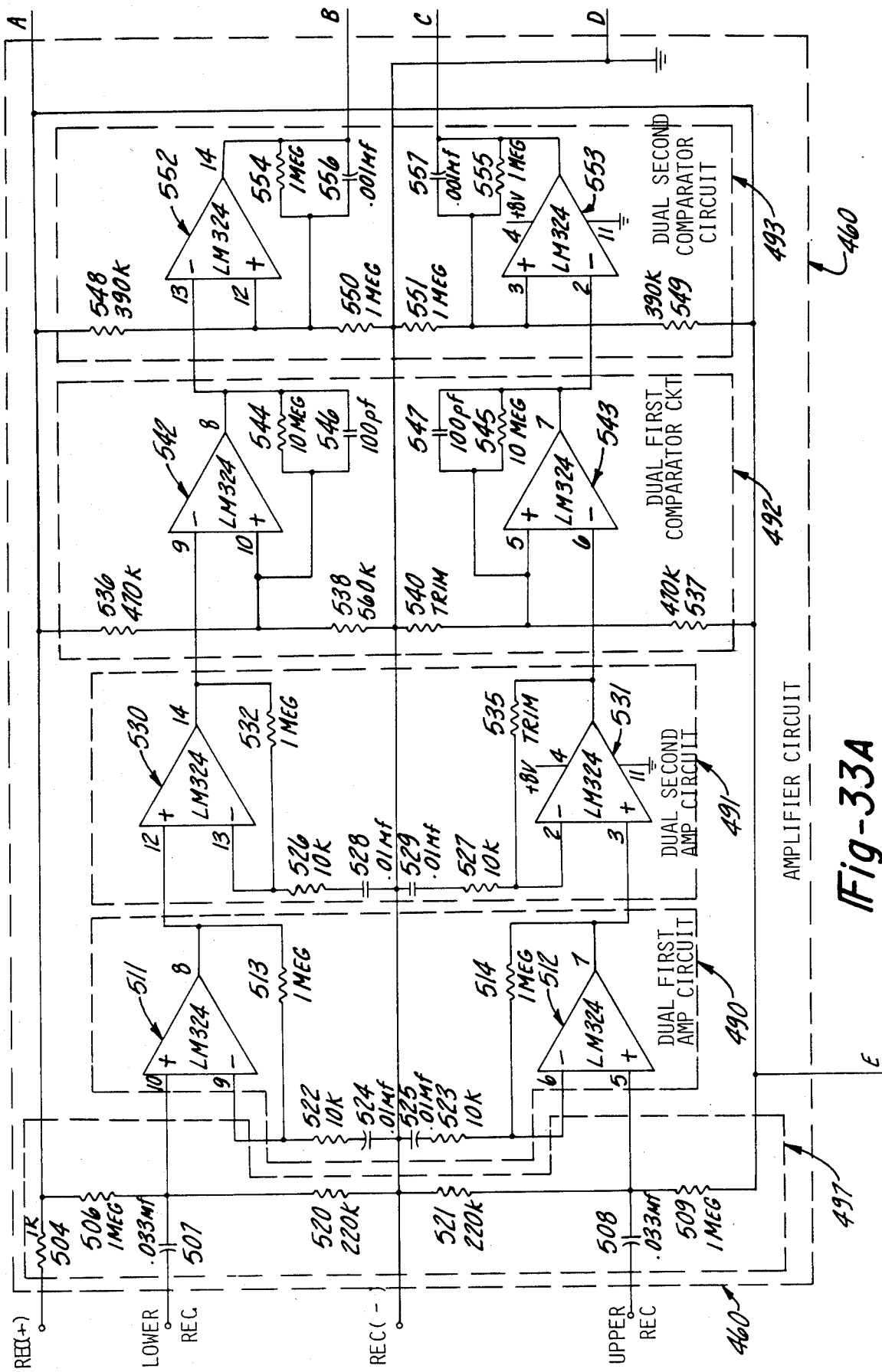
FIG. 33A is a schematic diagram of the amplifier circuit of FIG. 32.
Figure 33B:
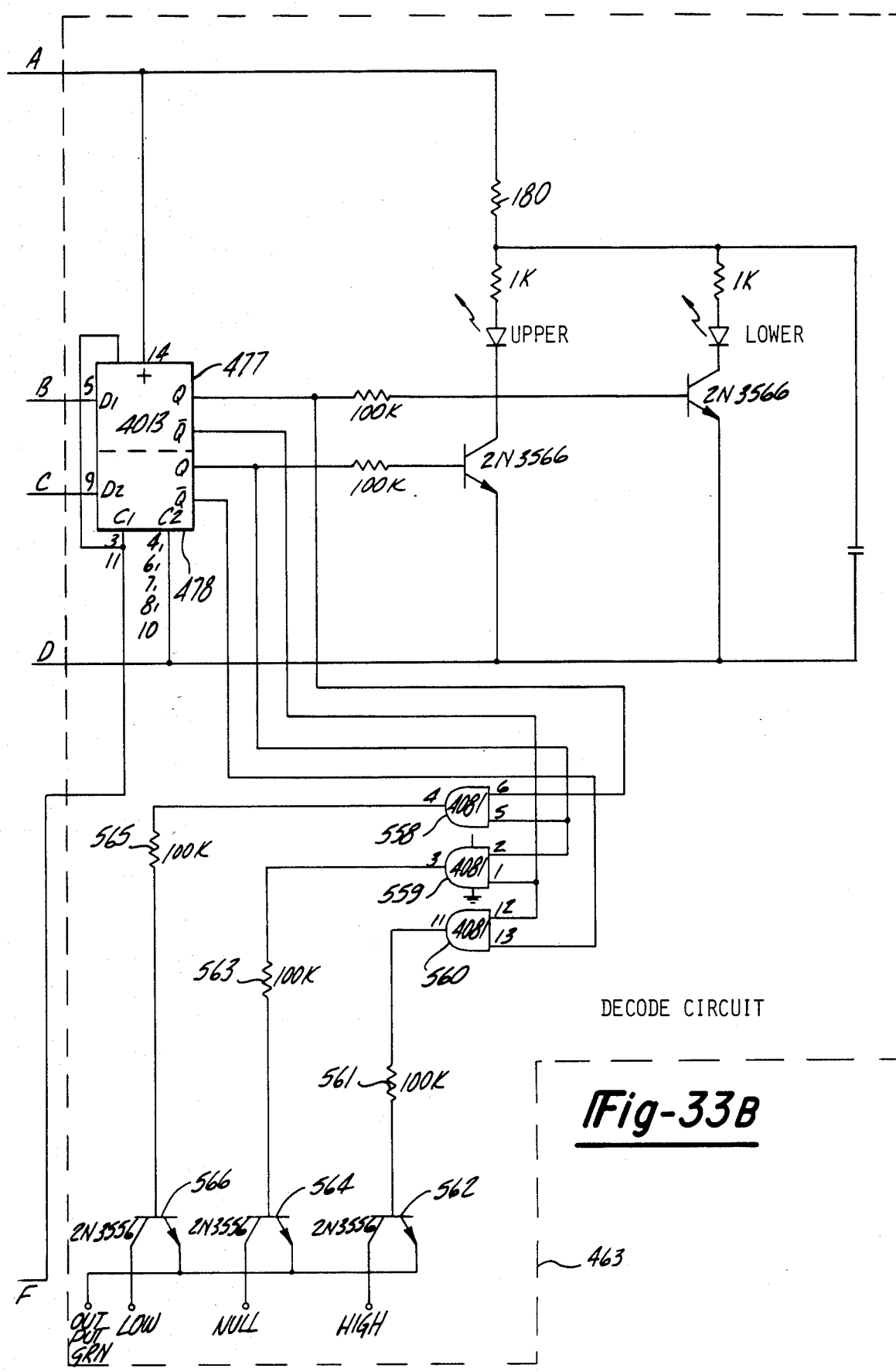
FIG. 33B is a schematic diagram of the decode circuit of FIG. 32.

A detailed illustration of the amplifier circuit 460 is shown in FIG. 33A. Power comes into the power supply (FIG. 33C) between ground and a plus 15-volt source present in the system.

A first input filter capacitor 465 is connected across these terminals for filtering purposes. The power supply voltage regulator 467 is a three terminal regulator having an input, a common and an output, with the input connected to the plus 15-volt source, the common connected to system common and the output being used for providing a 8-volt source across the regulated source across which the first output filter capacitor 468 is connected. This supplies the power for the amplifier circuit 460, the decode circuit 463 and the dual photo receiver 99.

The 8-volt output is then supplied to a power supply limiting resistor 466, through which it is supplied to, to the second output filter capacitor 469. From here it is supplied to the synchronous modulator circuit 462 and the transmitter circuit 100. Therefore, now all of the circuits involved in the optical conditioner circuit 384 are supplied with power.

To get a high readability of the signal from the transmitter 100 by the receivers 99, it is desired to have a very bright infrared light output from the transmitter 100. This cannot be obtained by continuously running the transmitter so, in essence, what one does is flash the light, rather than run it continuously, and gate the receiver so that it will attempt to read the light at the same time it is flashing. It is the purpose of the synchronous modulator circuit to flash the transmitter and gate the receiver. It does this by accepting power from the power supply circuit 461 and feeding it to the oscillator circuit 471 of the synchronous modulator 462. The oscillator circuit 471, in turn, supplies an output to the modulator current limiting resistor 472 which acts as the LED enable signal which will cause the LED to flash in a manner to be described.

As already stated it was necessary to produce a relatively intense beam of light which would pass through the flowmeter tube and would be received by two optical receivers (photo transistors 495A and 495B in this particular design). Obscuration of this beam of light by the float 101 would be detected by these receivers, and would be an indication of the position of the float.

If the float position is to be determined to high accuracy, the beam of light between transmitter 100 and receivers 99A and 99B must be of very small dimension in the direction of float motion (vertical). On the other hand, to achieve a large signal it is desired to have a large optical aperture. These two requirements conflict. As a further conflicting factor there must be two such beams, one for each receiver, and these two beams while being very thin (approximately 0.010 inches in some cases) must be spaced very closely together, for this spacing determines the "in band" or dead zone dimension which may be as small as 0.004 inches.

If conventional optics were used to form two closely spaced, very thin beams the optical system would be so large that it could not be fitted into the highly restricted space on the carriage and between the adjacent flow tubes. The solution was to design a novel optical head which used fiber to transform the aperture shape from two very thin, closely spaced rectangular elements 99F to two cylindrical elements 99E that can serve as inputs to the two photo receivers 495A and 495B.

The optical head 99C (FIGS. 49 and 50) consists of an epoxy block into which are molded two bundles 99D of optical fibers. One side of the head is in close proximity to the flow tube and is perpendicular to the line of sight through the flow tube to the transmitter. The two bundles of fiber terminate on this face to form two closely spaced, parallel apertures 99F, each very small vertically and approximately as wide (horizontally) as the diameter of the float. These two apertures are spaced by a few inches (typically 0.004 to 0.010). The fiber optic bundle serves as a means of efficiently coupling optical energy from the two narrow apertures to the photo receivers.

On the opposite side of the flow tube from the receiver head, just described, is the transmitter 100. The transmitter consists of a single light emitting diode (LED) 453. Its emitting area is relatively large in comparison to the very narrow receiver aperture and consequently it is masked by a narrow aperture (typically 0.010 inch). This single transmitter illuminates both receiving apertures.

Figure 33C:
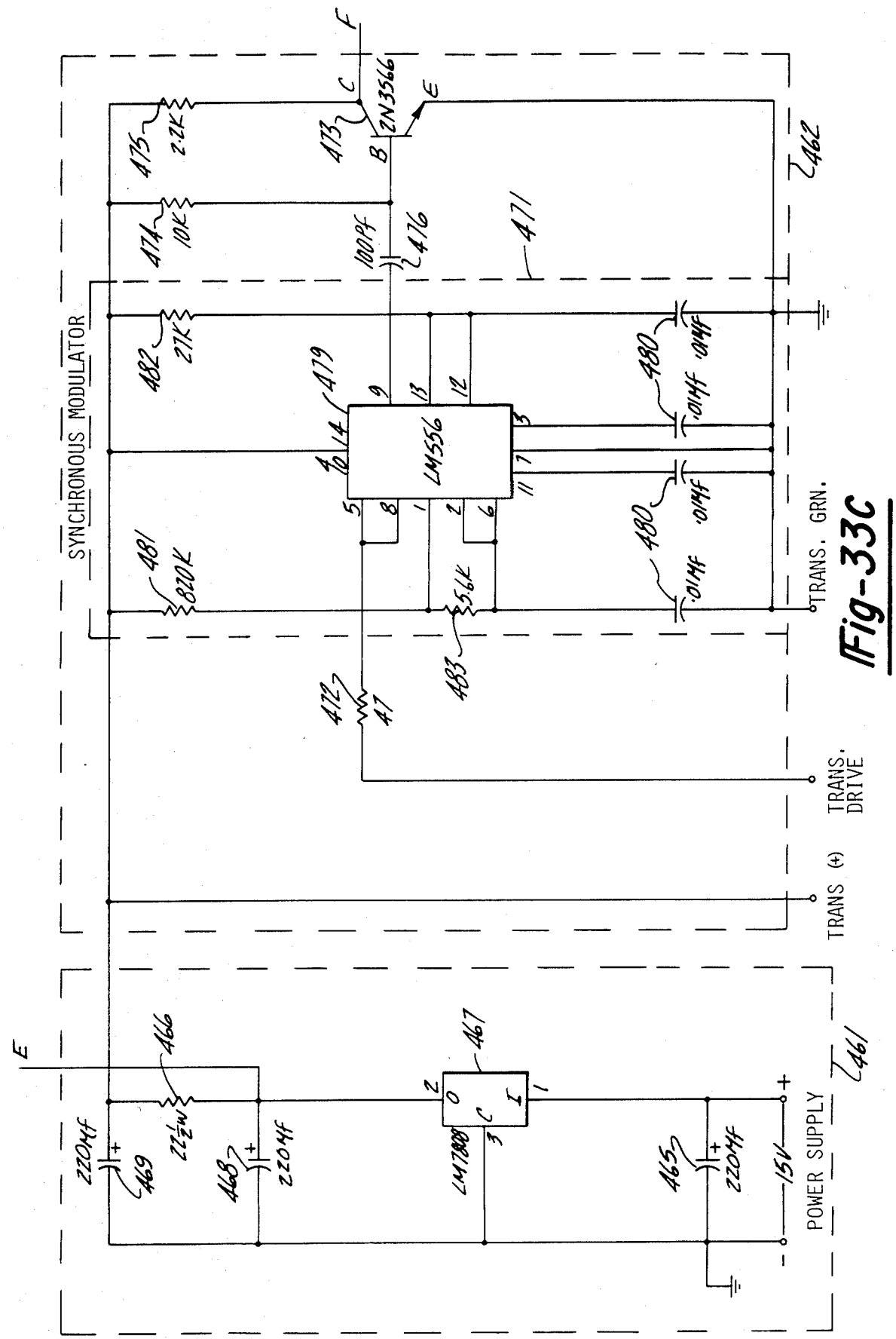
FIG. 33C is a schematic diagram of the power supply circuit and the synchronous modulator circuit of FIG. 33.

The output of the oscillator circuit 471 (FIG. 33C) is supplied through the output driver coupling capacitor 476 to the base of the synchronous modulator driver transistor 473. The output from the collector of the synchronous modulator driver transistor is supplied to one input of the upper receiver latch 478 (FIG. 33B) for purposes to be described. The emitter of the synchronous modulator driver transistor 473 is connected to ground, while interposed between the base of the transistor 473 and the input voltage is a first driver pull-up resistor 474 connected as shown in FIG. 33C, while a second driver pull-up resistor 475 is interposed between the collector of the synchronous modulator driver transistor 473 and the power supply.

It should be understood that the oscillator circuit consists of standard well known components, such as the four identical oscillator capacitors 480, the first oscillator resistor 481, the second oscillator resistor 482 and the third oscillator resistor 483, as well as the oscillator IC chip which may be the same as Model No. LM556 manufactured by National Semiconductor Corporation.

It can be seen that since the actual component values of the various components of the oscillator circuit are supplied and the actual values are given, it is believed that the building of the oscillator circuit 471 for the inclusion in the synchronous modulator circuit 462 is well within the skill of the art.

Figure 29:
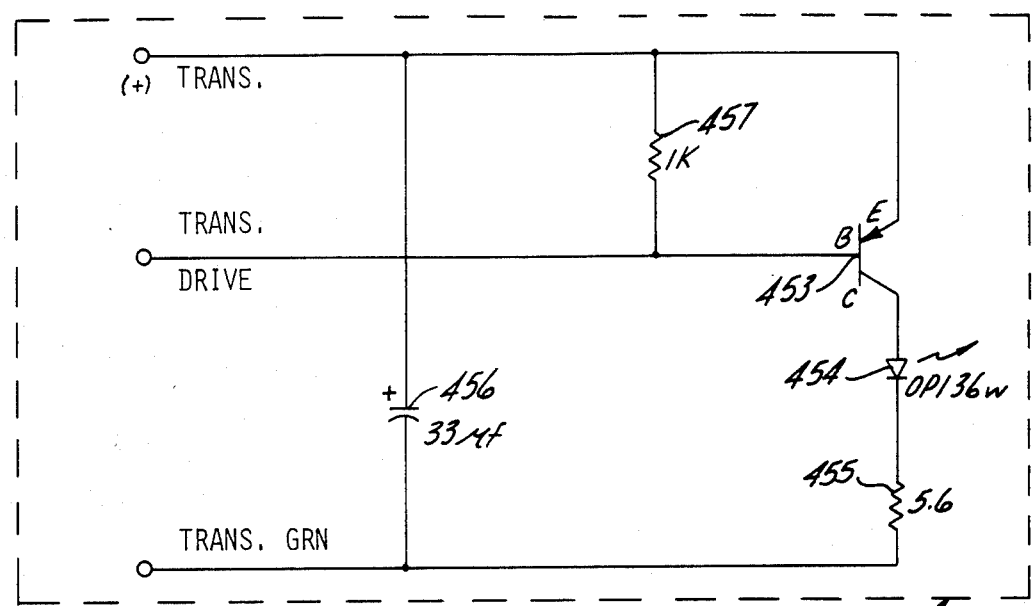
FIG. 29 is an electrical diagram of the LED transmitter shown in FIG. 11.
Figure 30:
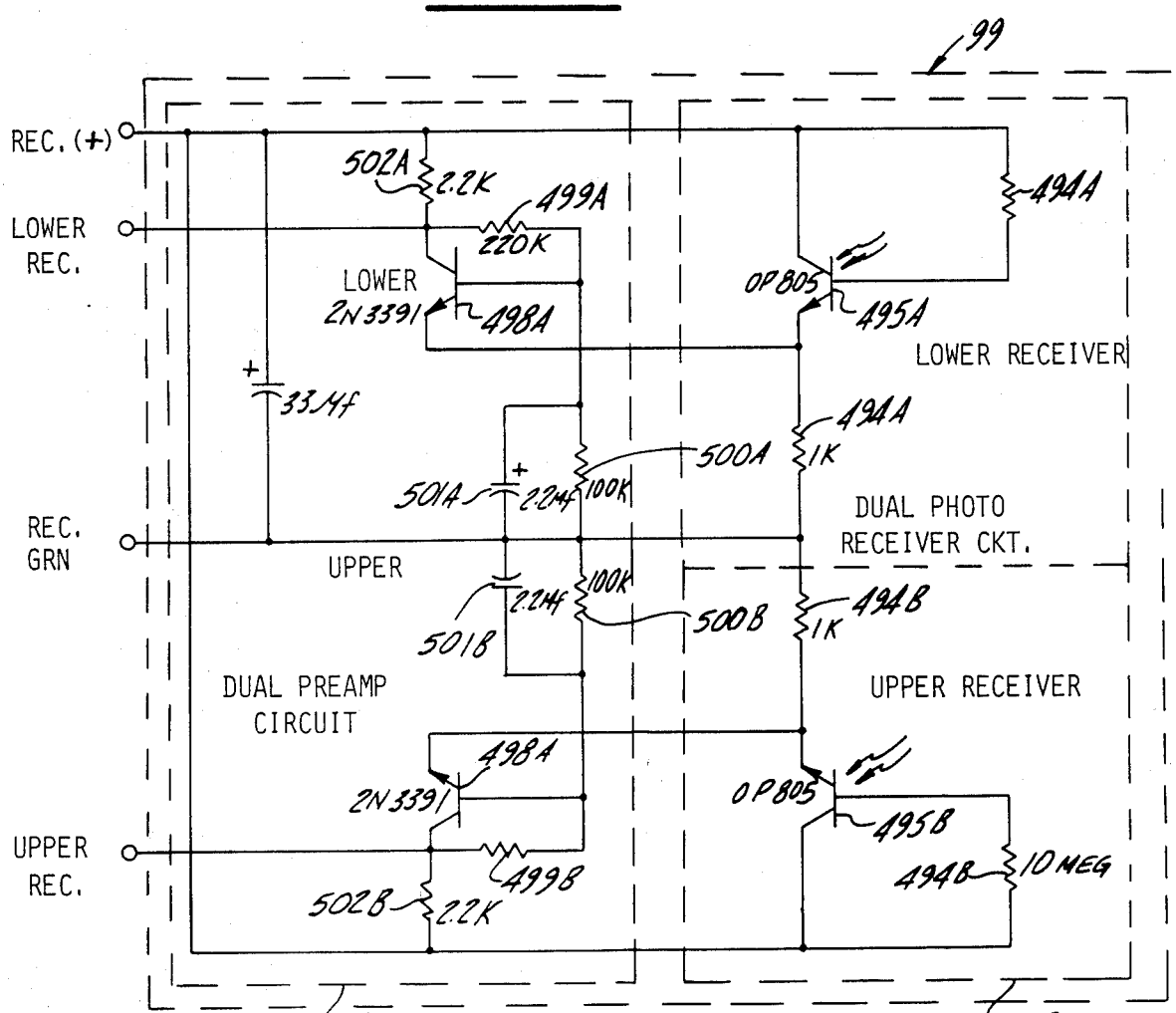
FIG. 30 is an electrical diagram of the receiver shown in FIG. 11.

Referring to FIG. 29, there is shown a schematic diagram of the infrared transmitter 100 which receives the output signal previously mentioned from the synchronous modulator, which was the LED enable signal, and inputs that signal to the base of the transmitter transistor 453.

When the signal is received at the base of the transistor 453, the transistor will turn on the collector circuit and supply a signal to the light emitting diode 454. Since, as we know, the signals are intermittently received at the base, this will cause the aforementioned flashing of the diode 454, which will be the light source for the receiver 99 to be described.

The current continues on through the light emitting diode 454 through the current limiting resistor 455 to complete the circuit to ground. At the same time this is occurring, the emitter, of course, is the source of the current which is passed through the collector to the light emitting diode, and the turn off resistor 457 is supplied to ensure that when there is no signal being supplied to the base of the transistor, there is a complete shut-off of current to the light emitting diode.

The transistor filter capacitor 456 is supplied to filter out any extraneous signals which may be present in the system. The signal from the light emitting diode 454 is transmitted to the receiver circuit 99, which consists of a dual preamp circuit 489 and a dual photo receiver circuit 488.

The photo transistors 495A and 495B are normally bias slightly on by the current coming through the upper and lower base resistors, 494B and 495A respectively, but when light is received by such photo transistors, it is their characteristic to conduct, and the current present at the emitter of such transistors is then passed through the collector thereof, causing a signal to be sent to the corresponding portion of the dual preamp circuit.

The signal coming into the upper and lower preamp transistors 498B and 498A respectively, at the emitter thereof causes the bias thereof to decrease as the strength of the signal increases, and causes an output through the collector thereof. When the bias of the preamp transistors decreases, the current decreases, and the voltage of the collector rises, thus sending a signal out of the dual preamp circuit to the amplifier circuit, amplifying the output of the photo transistors as desired.

As is well known in the art, the lower and upper collector pull-up resistors 502A and 502B, and lower and upper first base bias resistors 499A and 499B, together with the lower and upper second base bias resistors 500A and 500B with the lower and upper base bypass capacitors 501A and 501B form bias networks, placing the initial bias on the preamp transistors 498A and 498B.

Referring to FIG. 33A, we can now describe the amplifier circuit. The receiver circuit power supply resistor sends power to the dual receiver circuit 99 and, in turn, receives back the lower and upper signals from the dual preamp circuit 489.

These signals come into the dual input circuit 497 by way of the lower first input coupling capacitor 507 and the upper first input coupling capacitor 508 where they are acted upon by the lower first input bias resistor 506 and the lower second input bias resistor 520 for the lower channel, and by the upper first input bias resistor 509 and the upper second input bias resistor 521 for the upper channel. After being acted on by these circuit elements, the signals are passed on to the positive input of the first lower operational amplifier and the negative input of the first upper operational amplifiers 511 and 512 respectively.

By virtue of the fact that the first lower operational amplifier is connected to the first lower feedback resistor 513, the lower first derivative resistor 522 and the lower first derivative capacitor 524, it will accentuate the AC wave forms it passes, and will only pass AC wave forms through the output of the first lower operational amplifier 511. The signal from the output of the first lower operational amplifier 511 is then passed onto the positive input of the lower second operational amplifier 530. The lower second operational amplifier 530 is identical to the first lower operational amplifier 511 and, in addition, has identical components attached to the negative input in the form of the lower second derivative resistor 526, the lower second derivative capacitor 528 and a lower second feedback resistor 532, so it also will accept AC wave forms and accentuate these.

At this time, the output from the lower second operational amplifier 530 is passed onto the negative input of the lower first comparator 542 of the dual first comparator circuit 492. Again, the lower portion of the dual first comparator circuit is identical to the upper portion of the dual first comparator circuit, and the dual first comparator circuit 492 in its entirety is identical to the dual second comparator circuit 493. For this reason it is believed necessary to only describe the lower portion of these circuits which will make clear also then the operation of the upper portion of the circuits to one skilled in the art.

At the same time the negative input of the lower first comparator 542 is receiving a signal from the output of the lower second operational amplifier 530, the positive input of the lower first comparator 542 is receiving an input through the lower second set point resistor 538 and the upper second set point resistor 540. This will produce an output from the lower first comparator 542 which will be modified by virtue of the connection in parallel between the output of the lower first comparator and the positive input thereof of the lower third feedback resistor 544 and the lower first feedback capacitor 546. This arrangement is known to those skilled in the art as a "Schmitt triggered comparator" and the practical effect of this is to cause the output of the lower first comparator to suddenly go very high or very low, and very rapidly.

This output from the lower first comparator 542 is supplied to the negative input of the lower second comparator 552. Similarly to that just described, the positive input of the lower second comparator 552 is receiving an input through the lower fourth set point resistor 550 and the lower third set point resistor 548. This again produces an output which, because of an identical Schmitt triggering arrangement, by virtue of the connection in parallel of the lower four feedback resistor 554 and the lower second feedback capacitor 556, will again go very high or very low in a rapid manner. The output from the lower second comparator 552 then is inputted into the input of the lower receive latch 477.

As mentioned previously, the lower receive latch is receiving power from the power supply circuit, and is also receiving a signal from the synchronous modulator driver transistor 473.

As was previously described, if the light emitting diode of the transmitter is run continuously, it cannot be run at a very high level, and a much higher level output is achieved if the light emitting diode is pulsed intermittently. For this to be sensibly used in the system, we also need only have our receiver circuit look to see if light is being transmitted at the same time the diode is being pulsed. It is this signal from the synchronous modulator driver transistor to the decoder circuit which allows us to look at the diode at the same time it is being pulsed to see if the light signal coming from the light emitting diode is blocked by the float. Thus, the lower latch 477 acts to synchronize the input sampling with the LED output.

The Q output of the lower receive latch 477 is supplied to one input of the low AND gate 558. While the Q bar output of the same latch is supplied to one input each of the in-band AND gate 559 and the high AND gate 560.

To supply the other inputs to the low, in-band and high AND gates 558, 559 and 560 respectively, for proper operation thereof, it is necessary to have an input to these AND gates from the upper latch 478. This output is produced in the manner substantially identical to that just described for the lower latch 477 by virtue of the signals coming into the upper portion of the dual first amplifier circuit 490 and being acted on in exactly the same manner described for the lower portion of the dual first amplifier circuit. Thus, it is only believed necessary to state that the upper portion of the dual first amplifier circuit consists of the first upper operational amplifier 512, the first upper feedback resistor 514, the upper first derivative resistor 523 and the upper first derivative capacitor 525. Again, as before, the output from the first upper operational amplifier will be supplied to the positive input of the upper second operational amplifier 531.

Again, the operations which take place in the upper portion of the dual second amplifier circuit are exactly the same as those which have been previously described as taking place in the lower portion of the dual second amplifier circuit. Therefore, it is again believed only necessary to state that the components of the dual second amplifier circuit consist of the upper second derivative resistor 527, the upper second derivative capacitor 529, the upper second operational amplifier 531, and the upper second feedback resistor 535. This produces an output from the upper second operational amplifier exactly the same as that from the lower second operational amplifier 530, and this is passed on in a manner exactly the same as before to the negative input of the upper first comparator 543.

Again, the upper portion of the dual first comparator circuit 492 is exactly identical to the lower portion of the dual first comparator circuit 492, and exactly the same operations take place. Thus, it is deemed only necessary to state that the components of the upper portion of the dual first comparator circuit consist of the upper first set point resistor 537, the upper second set point resistor 540, the upper first comparator 543, the upper third feedback resistor 545 and the upper first feedback capacitor 547.

Again, one comes out of the output of the upper first comparator 543 into the negative input of the upper second comparator 553 in the dual second comparator circuit 493. Again the upper portion of the dual second comparator circuit is exactly the same as the lower portion of the dual second comparator circuit and it is only believed necessary to state that the components of the upper portion of the dual second comparator circuit 493 includes the upper third feedback resistor 549, the upper fourth set point resistor 551, the upper second comparator 553, the upper fourth feedback resistor 555 and the upper second feedback capacitor 557. These components act exactly as they did in the lower portion of the dual second comparator circuit 493 and produce an output to the upper receive latch 478.

Exactly as before, the latch has been powered from the power supply circuit and is receiving a clock signal from the synchronous modulator driver transistor 473 of the synchronous modulator 462. Again, this output acts exactly the same, and the Q output from the upper receive latch is supplied to one input each of the low and in-band AND gates 558 and 559 respectively, while the Q bar output of the upper receive latch 478 is supplied to one of the inputs of the high AND gate 560.

The connections to the high, low and in-band AND gates are designed in accordance with the desired decoding of the signals received from the transmitter and receiver 100 and 99 respectively. When the transmitter is to be in-band, one wants a signal to be received by the upper receiver, but not by the lower receiver so that the float detector 93 can follow the top of the float 101. Similarly, when the float is too high, both the upper and lower receivers are blocked and when the float is too low, neither the upper receiver or the lower receiver are blocked.

As can be seen, the output of the AND gates 558–560 are adapted to operate exactly in this manner and supplies the high, low and in-band signals to the decode circuit 513 when this occurs. The output from the low AND gate will be produced only when Q outputs are received from both the upper and lower latches 478 and 477 respectively. This will only happen when both the lower and upper photo transistors 495A and 495B are receiving light, which means neither are blocked, which was the condition for the float being low.

Similarly, an output will be received from the in-band AND gate 559 only when a Q output is received from the upper receive latch and a Q bar is received from the lower receive latch 477. Again, this will occur only when one of two signals is being received from the dual input circuit which, in turn, can occur only when light is being received by the photo transistor 495 in the upper receiver portion of the float follower 93 which results in the desired Q signal from the upper receive latch 478, which is the condition set forth for the float being in-band.

Since no light is being received by the photo transistor 495A of the lower receiver portion of the float follower 93, there will be no signal being passed through the upper portions of the dual input circuit 497, the dual first amplifier circuit 490, the dual second amplifier circuit 491, the dual first comparator circuit 492 and the dual second comparator circuit 493 so you will get a Q bar output from the lower receive latch 477 and thus, both inputs will be provided to the in-band AND gate 559, which meets the requirements for the float being in-band.

The last case is where the float is high and this would require an output from the high AND gate 560 which can only occur when you get a Q bar output from both the lower receive latch 477 and the upper receive latch 478, which can only occur when no light is being received by lower photo transistor 495 and the upper photo transistor 495B.

The output from the high AND gate 560 would be supplied through the high base resistor 561 and the high output transistor 562 as one of three inputs to the auto select circuit 402 shown in FIG. 7.

In a like manner, the in-band signal, which is the output from the in-band AND gate 559, would be supplied through the in-band base resistor 563 and the in-band output transistor 564 as one of the inputs to the auto select circuit, as would the low signal, which is the output of the low AND gate 558, which would be supplied to the auto select circuit through the low base resistor 565 and the low output transistor 566. These signals would then be used in the manner previously described for automatically tracking the float in our improved flow meter calibration system.

The remainder of the decode circuit 413, which has not been labeled, have been shown with actual component values to allow its duplication by one skilled in the art. It is not believed necessary to describe these components in detail, as their actual connections are shown and the only purpose of this circuit is to provide a convenient way for a technician to monitor the state of the signals from the receiver 99.

To display the position of the float detector through the float detector position display 367, it is first necessary to condition the signal by passing it through the float detect or display circuit 379. A block diagram of the float detect or display circuit is shown in FIG. 31.

It can be seen that the float detection display circuit consists of a 4½ digit display decoder and driver circuit 569 operatively connected to a five decade BCD counter 571.

It can be noted that the the five decade BCD counter is receiving a reset input signal from the manual reset switch 365 (FIG. 11) and is also receiving an up-down input and a counter input from the display latch 572 and display OR gate 573 respectively. The display latch and display OR gate are, in turn, receiving an up count input and a down count input from the position pulse encoder 97.

The reset input from the manual reset switch 65 has the function of resetting the five decade BCD counter and thus, the float detector position display 367 any time the operator desires to have the display set to zero.

To count and display the pulses when the system is in operation, it is necessary to utilize the pulses which form the up count input and the down count input from the position pulse encoder in a manner to provide the proper input to the five decade BCD counter to enable it to operate the 4½ digit display decoder and driver circuit.

Since the position pulse encoder produces up count pulses only when rotating in one direction and down count pulses when rotating in another direction, to supply the signals it is necessary to convert the two oppositive direction pulse trains into a single pulse train and a direction signal. This is done by supplying input from the up count input, or up pulse train, to the reset input of the display latch and an input from the down count input, or down pulse train, to the reset input of the display latch 572. This results in the proper output being supplied from the Q output of the display latch to the up-down input of the five decade BCD counter 571.

At the same time, it can be seen that either pulse train will be able to supply a suitable input to cause the display OR gate 573 to provide a count signal to the five decade BCD counter. Thus, it can be seen, for example, with the position pulse encoder 97 operating in a direction so as to supply an up count input, an input would be supplied to the display latch causing an up polarity signal to be supplied to the five decade BCD counter.

We have already in general described the mechanics of the weigh scale of our present invention, but certain additional features should be described, which are important to our invention.

It should be known that in constructing our scale we started with the standard Tridyne scale which is commercially available as Model No. 410-1052 manufactured by the Tridyne Corporation. This scale came with the standard base 600, the large platform support 594, the small platform support 595, the lower beam 597 and the upper beam 596. To this we added the encoder 260, the counterweight 599, the ball screw 170, the poise weight and ball nut assembly 171 and the poise motor 262, together with the large flow bucket 163 and the low flow bucket 164 previously described.

With regard to the ball screw, it should be understood that a very accurate ball screw with a very fine thread was found to be necessary to provide the desired degree of calibration for accurate weighing. The ball screw which we chose after much experimentation is one manufactured by Beaver Precision Products, their Model No. P0805 20-pitch ball screw. The ball screws we tried previous to this simply were not accurate enough for our purposes.

A drain assembly 588 is provided as shown in case of overflow from either the high flow bucket 163 or the low flow bucket 164. Many features of the injection system and extraction system have already been described, but one feature which is important which is not previously been described is the shape of the smooth flow tube assembly 589.

It can be seen that the rakish angle at the end of the assembly, plus the shape of the discharge deflectors at the end thereof, are intended to minimize kinetic energy effects, as are the wool mesh kinetic energy absorption devices 590 and 591 respectively.

With respect to the extraction systems, it should be noted that the high flow extraction tube assembly 165 and the low flow extraction tube assembly 166 retract during the test cycle to eliminate the buoyancy effect which they otherwise would have.

To prevent any drippage from occurring when they are retracted, which would effect the measuring result, it should be noted that a high flow evacuation valve seat 583 is provided on the end of the flow lift rod providing part of the assembly. The lift rod 582 is sealed by a high flow evacuation seal 584.

Similarly, a low flow evacuation valve seat 586 is provided on the end of the low flow lift rod 587 which is sealed by a low flow evacuation seal 587. This concludes the description of the mechanical features of our scale which are necessary to effectuate the accurate measurements needed in our system.

Another portion of the mechanics of our system which warrants explanation is the means for tracking the float 101 in the glass tube flow meter 78.

One may refer to FIGS. 45, 46, 47 and 48 for a detailed illustration of the mechanical apparatus which moves the float follower 93, and thus the transmitter 100 and the receivers 99A and 99B up and down the flow tube 78. These devices consist of a pair of vertical support rods 604 attached between an upper platform 602 and a lower platform 603.

The upper platform supports a stepper motor 95 which operates the ball screw 96 through the gear train 601. The opposite end of the ball screw 96 drives the encoder 97. Vertical movement of the float follower 93 is provided by the turning of the ball screw 96, driving the assembly up and down the vertical rods 604. Bushings 609 are provided in the float follower support guide 608 for ease of movement. The bushings 609 at the extremity of the support guide are identical to the other bushings to provide a three-point support.

A part of the float follower 93 is allowed to pivot about the pivot assembly 610 so that it may be pivoted into and out of engagement with the flow tube 78. In order that the pivoted portion of the follower 93 may be maintained in an upright position while it is positioned, the magnetic latch 611 is provided.

The float follower 93 may be locked in any desired position along the guide rod 604 by means of the pivot lock 612.

The actual transmitter 100 and receiver 99 are mounted on a pair of float detector jaws 613 by means of the spring loaded assemblies 614. This allows the operator to space the jaws 613 and pivot the assembly out of the way when calibration is finished, and allows for the initial placement of the jaws about the flow meter 78.

Further, it provides for keeping the transmitter 100 and the receiver 99 centered during the travel of the float detector up and down the length of the flow tube 78.

To provide for horizontal movement of the float detector, generally designated by the numeral 93, in order to calibrate one or more flow tubes, the entire float detector may be moved horizontally by virtue of the ball bushings 614 which travel along the horizontal guide rod 607.

After having now described the circuitry and mechanics of our flow meter calibration system we are now able to describe the typical operation of our improved flow meter calibration system.

In a typical operation, the operator will first desire to turn on the hydraulic system before taking other setup procedures, and this would involve turning the system on by means of the off-on switch 178, which would cause the pilot light 179 to illuminate. The on button 181 would be depressed to supply power to the control panel 179, the supply pump would be turned on by depressing a supply pump switch 182 the operator would, turn on the supply pump by means of the supply on-off switch 182, turn on the evacuation pump by means of the evacuation pump on-off switch 184, and turn on the fuel temperature control switch 195, and would also turn on the injectors 159 and 160 in a manner previously described by depressing the injector on-off switch 196 which also activates the fuel injector pressure transducer 151 and the fluid inlet pressure display 156. By this sequence of operation, the temperature display 152 will have been activated.

This sequence of operation will start the proper subsystems operating to bring the calibration fluid to the proper temperature. This operation is started first since it takes some time, and now allows the system operator to mount the flow meter to be calibrated and place the float follower 93 about the flow meter tube 78, which is desired to be calibrated.

As before, this involves moving the float follower either horizontally on the horizontal guide rods 607 and/or vertically on the vertical guide rod 604, and then pivoting down the pivoted portion, and then pivoting the pivoted portion of the float follower 93 into the position about the pivot 610 by holding the float follower jaws 613 apart. When the transmitter 100 and the receiver 99 have been properly lined up on the flow tube 99, the jaws are released gently so that the jaws will engage the flow tube.

Having now engaged the flow meter to be calibrated, if the temperature of the fluid has reached the desired operating temperature, we are now ready to activate the float detection subsystem of the present invention by depressing the float detection on-off switch 364, and operating the mode select switch 363, to place the system in a manual mode of operation by means of the previously described circuitry.

As described hereinbefore, to put the system in automatic mode to calibrate the glass flow tube 78 in several positions, it is first necessary to set the float detector 93 to lock on the reference line 158.

By means of the circuitry previously described, and the logic built into the system, it is necessary for the float to be placed either below the reference line, or preferably, above the reference line before this. In addition to the float being above the reference line, the operator should make certain that the float follower 93 is above the reference line, but below the float. To do this, the operator may use any of the jog up, jog down, slow up, slow down, fast up or fast down buttons 372-377 respectively.

Once the operator has the float follower 93 above the reference line, but below the float, he will depress the auto setting on the mode select switch 363 and the auto start switch 371, placing the system in an automatic mode of operation by virtue of the circuitry previously described. Because of the logic built into the system, the float follower 93 will proceed in a downward direction until it reaches the reference line and then will lock onto said reference line 158.

The operator will then push the reset switch 65 to reset the float detector position display 367 to zero so that the movement of the float detector will give a position in inches from the reference line.

The operator, before proceeding further, must turn on the weigh scale subsystem of the present invention by depressing the scale power on-off switch 248 to supply power to the weigh scale subsystem previously described. Again, to ensure accurate operation, and to take into account the temperature errors due to warm-up, etc., the operator should wait a sufficient length of time for the temperature in the weigh scale system to stabilize.

Assuming now that the weigh scale subsystem has had sufficient warm-up time, the float will most probably be at an unknown position, and the operator must again depress the auto position on the mode select switch 363 to enable him to manually move the float detector 93, and he may most advantageously do this by pressing the fast up switch 376, and visually observe the movement of the float detector in an upward direction until it has surpassed the position of the float.

At this time the operator will immediately press the auto start button and will then immediately push the auto position of the mode select switch 363 to place the system in automatic operation which also requires depressing the auto start switch. It will be remembered that because of the logic built into the circuit, the float detector 93 will now travel again in a downward direction, until it finds the float, and at this point it will stop and track the float with no further effort on the part of the operator.

It is at this point that the great advantage of our flow meter calibration system becomes obvious, as the operator can now, if he has not already utilized the duty cycle switches 81 and the period switches 84, use the switches as previously described to set a wide of range on the flow meter and produce a reading of the float position with regard to the fixed reference line for each such flow which will enable him, upon completion of the test, to prepare a scale indicating thereon flow as a function of distance from the reference line in an extremely accurate manner.

Before the test can actually start, the operator, if he has not already done so will select the pretest time for the purposes previously described on the pretest switch 245, set the test time on the test time select switch 246 and select minutes or seconds on the test time unit select switch 247.

The pretest and the test time depend on user requirements and need to be learned by experience. We have found that a pretest time of from ten to fifteen seconds is usually sufficient.

The time of test depends on several factors. Since there is only limited flow bucket capacity and flow travel, one must make certain that the test time is not set too long to overflow the system, but, on the other hand, for low flow rates, one will need a longer test than one will need for the shorter test.

It becomes obvious because of the wide range of settings available of both the weigh scale system and injector system that a practically infinite number of points can be calibrated on any given flow meter.

Thus, by abandoning the old fixed weight-variable time flow meter calibration system, and inventing the novel variable weight-fixed time system, we have provided a novel and extremely accurate method and apparatus for calibrating flow meters at a wide range of flows, including very low flows.

We claim:

1. A method for calibrating glass tube flow meters, having means to indicate the flow therethrough, said method including the steps of:
   (a) causing the desired media to flow through said flow meter;
   (b) measuring the media flowing through said flow meter for a fixed period of time;
   (c) providing a control subsystem including fuel injectors;

(d) providing a monitoring subsystem;
(e) providing a weigh scale subsystem;
(f) providing a supply subsystem;
(g) providing a signal related to the flow through said flow meter by providing a flow detection subsystem, wherein the step of providing a flow detection subsystem to provide a signal related to the output of said flow meter includes the steps of:
  (aa) providing a float follower, including a receiver and a transmitter, adapted to fit about said glass tube flow meter and track the float therein;
  (bb) providing a ball screw mounted parallel to said glass tube flow meter and adapted to move said float follower axially therewith;
  (cc) providing an optical encoder mounted to one end of said ball screw; and
  (dd) providing a stepper motor operatively connected to the other end of said ball screw and adapted to rotate the same.

2. The method defined in claim 1, and including the additional steps of:
  (a) providing a supply subsystem to supply conditioned air and fluid to the flow meter calibration system;
  (b) providing a control subsystem to control the flow of fluids supplied by said supply subsystem;
  (c) providing a monitoring subsystem to detect the current condition of said flow meter calibration system; and
  (d) providing a weigh scale subsystem for weighing the media flowing through the flow meter under calibration.

3. The method defined in claim 1, wherein the step of providing a flow detection system includes the steps of:
  (a) providing a float follower having a receiver and a transmitter and adapted to fit about said glass tube and detect the presence of the float therein;
  (b) providing a ball screw operatively mounted adjacent and parallel to said glass tube flow meter to move said float follower along said glass tube flow meter;
  (c) providing an optical pulse encoder operatively mounted to one end of said ball screw to provide a pulse output related to the movement of said float follower;
  (d) providing a stepper motor attached to the other end of said ball screw and adapted to rotate said ball screw, and thus move said float follower upon receiving a proper signal;
  (e) providing a stepper motor driver circuit to provide said pulses to said stepper motor;
  (f) providing a float detector display circuit to detect the position of the float in said flow tube;
  (g) providing a float detector position display connected to said float detector display circuit to display the position of said float in said flow meter;
  (h) providing an optical conditioner circuit connected to said float follower to provide power to said transmitter and said receiver; and
  (i) providing a float detector control circuit connected to said stepper motor driver circuit and said optical conditioner circuit to provide automatic tracking of said float in said glass tube flow meter.

4. The method defined in claim 3, wherein the step of providing a float detector control circuit includes the steps of:
  (a) providing a manual select and switch input circuit;
  (b) providing a clock speed select circuit operatively connected to said manual select and switch input circuit;
  (c) providing a clock circuit having slow and fast outputs connected to said clock speed select circuits;
  (d) providing a direction polarity latch circuit connected to said manual select and switch input circuit and said clock speed select circuit;
  (e) providing an auto select circuit connected to said clock speed select circuit, said direction polarity latch circuit and said optical conditioner circuit;
  (f) providing an auto abort circuit connected to said auto select circuit, said direction polarity latch circuit and said clock speed select circuit and said clock circuit; and
  (g) providing a stepper motor translator circuit connected to said direction polarity latch circuit.

5. The method defined in claim 4, and including the further step of:
  (a) providing a travel limits circuit connected to said clock speed select circuit to receive an input therefrom, and also being connected to said stepper motor translator circuit and adapted to provide output thereto.

6. The method defined in claim 5, and including the steps of:
  (a) providing a float detection system abort switch connected to said auto abort circuit to allow the calibration operation to be automatically aborted when a predetermined condition occurs; and
  (b) providing a manual abort switch connected to said float detection system abort switch to enable the calibration operation to be manually stopped if desired.

7. The method defined in claim 6, wherein the step of providing a float follower having a receiver includes the steps of:
  (a) providing a dual photo receiver circuit; and
  (b) providing a dual preamp circuit.

8. The method defined in claim 7, wherein the step of providing a float detector display circuit includes the steps of:
  (a) providing a 4½ digit display decoder and driver circuit adapted to be connected to said float detector position display;
  (b) providing a 5 decade BCD counter having reset, up-down, and count inputs, and having and output, with said output connected to the input of said 4½ digit display decoder and driver circuit;
  (c) providing a display latch having set and reset inputs and an up-down output, with said up-down output connected to the up-down input of said 5 decade BCD counter; and
  (d) providing a display OR gate having two inputs and an output, with the output thereof connected to the count input of said 5 decade BCD counter, and the inputs thereof being connected to the set and reset inputs of said display latch to receive signals from said pulse encoder.

9. The method defined in claim 8, wherein the step of providing an optical conditioner circuit includes the steps of:
  (a) providing an amplifier circuit having inputs and outputs;
  (b) providing a power supply circuit connected to said amplifier circuit;

(c) providing a synchronous modulator connected to said power supply; and (d) providing a decode circuit connected to said amplifier circuit and to said synchronous modulator.

10. The method defined in claim 9, wherein the step of providing a weigh scale subsystem includes:

(a) providing a weigh scale adapted to receive a flow of fluid from said flow meter;

(b) providing means to control the flow of fluid into said scale and to receive signals from said weigh scale;

(c) providing a time weight display circuit connected to said weigh scale and adapted to display the weight of fluid which flows into the weigh scale in a fixed period of time;

(d) providing means connected to said means to control the flow of fluid into said scale to set the pretest and test times; and (e) providing means to start and stop flow into the weigh scale.

11. The method defined in claim 10, wherein the step of providing a weigh scale adapted to receive a flow of fluid from said flow meter includes the steps of:

(a) providing on said weigh scale a movable poise weight moved by a ball screw;

(b) providing an encoder on one end of said ball screw adapted to produce pulses when said ball screw is rotated;

(c) providing a pulse encoder circuit operatively connected to said encoder to provide an output related to the revolutions of the ball screw;

(d) providing on the other end of said ball screw a poise motor to turn said ball screw;

(e) providing a linear variable differential transformer operatively mounted to said weigh scale to sense vertical displacements thereof;

(f) providing a poise control circuit adapted to receive inputs from said linear variable differential transformer and provide outputs to said poise motor to turn the ball screw and maintain the scale in a balanced position as weight is added thereto; and (g) providing a power supply circuit connected to said pulse encoder circuit, said encoder, said poise control circuit, said linear variable differential transformer, said poise motor, and to a time weight scale control and timing circuit to provide power thereto.

12. The method defined in claim 11, wherein the step of providing means to control the flow of fluid into said scale includes the step of providing a time weight scale control and timing circuit.

13. The method defined in claim 12, wherein the step of providing a time weight scale control and timing circuit includes the steps of:

(a) providing a scale cycle control adapted to receive inputs from the means to set the pretest and test time, as well as from the means to start and abort the flow meter calibration and the means to set the test time units and adapted to supply signals to the means to start and stop flow into the weigh scale;

(b) providing a pretest circuit operatively connected to said scale cycle control;

(c) providing a test circuit operatively connected to said scale cycle control;

(d) providing a clock select circuit having minutes and seconds inputs and an output, with said output connected to said test circuit, and (e) providing a clock circuit having minutes and seconds outputs and a clock input, with said minutes output being connected to said minutes input of said clock select circuit, said seconds output connected to said pretest circuit and said seconds input of said clock select circuit and said clock input being connected to a 60-hertz AC clock.

14. The method defined in claim 13, wherein the step of providing a weigh scale subsystem includes the step of providing a time weight display circuit.

15. The method defined in claim 14, wherein the step of providing a time weight display circuit, includes the steps of:

(a) providing a decimal select circuit adapted to receive inputs related to the units in which the flow meter calibration is to take place, and adapted to provide outputs related to these units;

(b) providing a 6½ digit display decoder and driver circuit adapted to receive inputs from said decimal select circuit and to provide output to the time weight display;

(c) providing a seven decade BCD counter circuit adapted to receive reset signals and an input from a scaling circuit, and provide an output to said 6½ digit display decoder and driver circuit;

(d) providing a scaling circuit adapted to receive appropriate select signals and inputs from an input circuit, and provide an output to said seven decade BCD counter circuit; and (e) providing an input circuit adapted to receive a count clock signal and be operatively connected to said scaling circuit to supply an input thereto.

16. The method defined in claim 9, wherein the step of supplying a monitoring subsystem includes the steps of:

(a) providing an upstream temperature sensor to measure the temperature of the fluid entering said flow meter;

(b) providing a downstream temperature sensor to measure the temperature of the fluid leaving said flow meter;

(c) providing a flow room temperature sensor to sense the temperature of the air in the flow room;

(d) providing a control room temperature sensor to sense the temperature of the air in said control room;

(e) providing a temperature display to display the readouts from said upstream temperature sensor, said flow room temperature sensor, said control room temperature sensor and said downstream temperature sensor;

(f) providing an injector inlet pressure sensor to sense the pressure of the fluid entering said fuel injectors;

(g) providing an injector pressure display circuit adapted to receive a signal from said injector inlet pressure sensor transducer and convert said signal into a signal useable by an injector pressure display; and (h) providing an injector pressure display to display a signal derived from the injector pressure display circuit representing the pressure of the fluid entering said fuel injectors.

17. The method defined in claim 9, wherein the step of providing a control subsystem includes the steps of:

(a) providing a source of air;

(b) providing a conduit for the travel of said air;

(c) providing an air shut-off valve;

(d) providing an air pressure regulator downstream of said shut-off valve;

(e) providing a temperature sensor downstream of said heat exchanger;

(f) providing a temperature transmitter downstream of said air pressure regulator and adapted to receive a signal from said temperature sensor representative of the temperature of the fluid in the calibration system;

(g) providing a temperature controller immediately downstream of said temperature transmitter and being adapted to receive a signal from said temperature transmitter, as well as upstream of said temperature transmitter and to supply a signal to a mixing valve;

(h) providing a temperature control knob on said temperature controller;

(i) providing a mixing valve adapted to receive a control signal from said temperature controller;

(j) connecting to said mixing valve a source of cold water and a source of hot water;

(k) passing said hot water and said cold water after mixing by said mixing valve into said heat exchanger through which the fluid which enters the flow meter passes, thereby controlling the temperature of said media;

(l) providing a heat exchanger solenoid to shut off the flow of water through said heat exchanger when desired;

(m) providing an air operated pressure regulator upstream of the heat exchanger to receive the fluid before it has been temperature conditioned by said heat exchanger;

(n) providing for operation of said air operated pressure regulator a ratio relay operatively connected thereto;

(o) providing a source of air to said ratio relay;

(p) interposing in said source of air an air pressure regulator;

(q) providing a current to pressure transmitter to provide a needed signal to said ratio relay;

(r) supplying air to said current to pressure transmitter through an air pressure regulator;

(s) providing a back pressure regulator immediately upstream of said air operated pressure regulator to control the back pressure of the fluid coming out of the regulator, the back pressure regulator adapted to receive fluid from said supply subsystem, said fluid after passing through said back pressure regulator, said air operated pressure regulator and said heat exchanger thereby being conditioned to enter said flow meter;

(t) providing a fuel temperature on-off switch operatively connected to said solenoid relay and said fuel temperature transmitter;

(u) providing a fuel pressure set or adjust potentiometer to adjust the pressure of the fluid flowing into said flow meter;

(v) providing a pressure regulator conditioning circuit operatively connected to said fuel pressure set or adjust potentiometer to condition the signal therefrom and to supply it to said current to pressure regulator;

(w) providing a plurality of injector solenoid driver circuits connected one each to said fuel injectors, providing a fuel injection control circuit operatively connected to each of said injector solenoid driver circuits to operate the same;

(x) providing a high flow-low flow select switch operatively connected to said fuel injection circuit to select the rate of fuel flow through said flow meter;

(y) providing an injector on-off switch operatively connected to said high flow-low flow select switch to turn said solenoids on and off;

(z) providing a plurality of low flow duty cycle injector switches to set the duty cycle of said small injectors, said switches being operatively connected to said fuel injection control circuit;

(aa) providing a plurality of high flow duty cycle in injector switches to set the flow through said large injectors, said switches being operatively connected to said fuel injection control circuit; and (bb) providing a period switch operatively connected to said fuel injection control circuit to set the period of said injectors.

18. The method defined in claim 9, wherein the step of supplying said supply subsystem includes the steps of:

(a) providing a tank adapted to hold the fluid entering the flow meter under calibration;

(b) providing a tank return inlet into said tank to accept return of the fluid from various places in the flow meter calibration system;

(c) interposing in said tank return inlet a first shut-off valve;

(d) providing a fluid outlet in said tank to supply fuel to said flow meter calibration system;

(e) providing a second shut-off valve downstream of said tank outlet;

(f) providing a strainer downstream of said second shut-off valve to strain impurities from the fluid;

(g) supplying a pump to pump fuel from the tank through the flow meter calibration system;

(h) providing a motor operatively connected to said supply pump;

(i) providing a supply pump relay operatively connected to said supply pump motor;

(j) providing a supply pump on-off switch to operate said supply pump relay;

(k) providing a fluid filter downstream of said pump;

(l) providing an evacuation pump connected downstream of said flow buckets on said weigh scale and adapted to evacuate the liquid from said weigh buckets when said evacuation tubes are lowered;

(m) providing an evacuation pump relay operatively connected to said evacuation pump;

(n) providing an evacuation pump on-off switch operatively connected to said evacuation pump relay;

(o) providing a fuel boost solenoid connected between the inlet of said large injectors and the outlet of said large injectors to allow liquid to bypass said injectors if necessary;

(p) providing a fuel boost relay to operate said fuel boost solenoid; and (q) providing a fuel boost on-off switch to operate said fuel boost relay.

19. A device for calibrating flow meters to indicate the flow therethrough, said device including:

(a) a supply subsystem to supply a fluid to be passed through the flow meter to be calibrated, wherein said supply subsystem includes:

(aa) a tank adapted to hold the fluid to be supplied to the flow meter undergoing calibration;

(bb) a tank return inlet operatively connected to said tank to accept return of the fluid from various places in the flow meter calibration system;

(cc) a first shut-off valve interposed between said tank and said tank return inlet;

(dd) a fluid outlet operatively connected to said tank to provide for said fluid leaving said tank;

(ee) a second shut-off valve provided downstream of said tank outlet and operatively connected thereto;

(ff) a strainer positioned downstream of said second shut-off valve to strain impurities from the fluid, said strainer being operatively connected to said shut-off valve;

(gg) a supply pump operatively connected to, and downstream from, said strainer;

(hh) a pump motor operatively connected to said supply pump to operate the same;

(ii) a supply pump relay operatively connected to said supply pump motor to switch said motor on and off upon the receipt of suitable signals;

(jj) a supply pump on-off switch operatively connected to said supply pump relay to supply said suitable signals;

(kk) a fluid filter positioned downstream of said supply pump and operatively connected thereto to allow fluid to pass through said filter;

(ll) an evacuation pump connected downstream of flow buckets provided in said weigh scale subsystem and adapted to evacuate fluid which has passed from said tank and passed through said fuel outlet, said second shut-off valve, said strainer, said supply pump and said filter and has entered said flow meter and flowed into said flow buckets;

(mm) an evacuation pump relay operatively connected to said evacuation pump;

(nn) an evacuation pump on-off switch operatively connected to said evacuation pump relay to operate the same;

(oo) a fuel boost solenoid connected between the inlet of said injectors forming a part of the supply subsystem, and the outlet of said large injectors to allow fuel to bypass said injectors if necessary;

(pp) a fuel boost relay operatively connected to said fuel boost solenoid;

(qq) a fuel boost on-off switch operatively connected to said fuel boost relay;

(b) means to control the fluid so supplied utilizing fuel injectors;

(c) means to monitor the condition of the fluid being supplied to said flow meter, and the conditions ambient around said flow meter;

(d) means to weigh the fluid passing through said flow meter;

(e) means to detect the flow of fluid through said flow meter; and (f) means to utilize the weight of fluid passing through said flow meter and the flow of fluid through said flow meter to calibrate said flow meter.

20. A device for calibrating flow meters to indicate the flow therethrough, said device including:

(a) a supply subsystem to supply a fluid to be passed through the flow meter to be calibrated;

(b) a control subsystem to control the fluid so supplied utilizing fuel injectors;

(c) means to monitor the condition of the fluid being supplied to said flow meter, and the conditions ambient around said flow meter;

(d) means to weigh the fluid passing through said flow meter;

(e) means to detect the flow of fluid through said flow meter;

(f) means to utilize the weight of fluid passing through said flow meter and the flow of fluid through said flow meter to calibrate said flow meter;

(g) means to control the temperature of the fluid entering the flow meter undergoing calibration, wherein said means to control the temperature of the fluid entering the flow meter undergoing calibration includes:

(aa) a heat exchanger placed downstream of said fluid filter to control the temperature of the fuel entering the flow meter under calibration;

(bb) a source of hot and cold water operatively connected to said heat exchanger;

(cc) a mixing valve interposed between said source of said hot and cold water and said heat exchanger;

(dd) a temperature transmitter operatively connected to said temperature controller;

(ee) a temperature controller operatively connected to said mixing valve and adapted to receive a signal upstream of said temperature transmitter;

(ff) a first temperature sensor immediately downstream of said heat exchanger and adapted to supply a signal related to the temperature of the fluid passing through the flow meter to said temperature transmitter, said temperature transmitter adapted to then feed a signal to the temperature controller which then acts on the mixing valve to control the temperature of the water entering the heat exchanger;

(gg) an air pressure regulator operatively connected to said temperature transmitter to supply a source of air thereto;

(hh) a source of air supply to said air pressure regulator;

(ii) a shut-off valve between said air pressure regulator and said temperature transmitter;

(h) means to control the pressure of the fluid entering said flow meter undergoing calibration.

21. The device defined in claim 20, wherein said means to control the pressure of the fluid entering said flow meter includes:

(a) an air operated pressure regulator interposed in the fluid flow between said heat exchanger and said fluid filter;

(b) a ratio relay operatively connected to said air operated pressure regulator;

(c) a current to pressure transmitter operatively connected to said ratio relay;

(d) a source of suitable air connected to said ratio relay and said current to pressure transmitter;

(e) an air pressure regulator interposed between said source of air and said ratio relay;

(f) an air pressure regulator interposed between said source of air and said current to pressure regulator;

(g) a back pressure regulator interposed in the flow of said fluid immediately upstream of said air operated pressure and downstream of said filter to control the back pressure of the fluid coming from said regulator, said back pressure regulator adapted to receive fluid from said supply subsystem, said fluid, after passing through said back pressure regulator, said air operated pressure regulator and said heat exchanger, being conditioned to enter said flow meter;
(h) providing a pressure regulator conditioning circuit operatively connected to said fuel pressure set or adjust potentiometer to condition the signal therefrom and to supply it to said current to pressure regulator; and
(i) providing a fuel pressure set or adjust potentiometer connected to said pressure regulator conditioning circuit to set the desired pressure of the fluid flowing into said flow meter.

22. The device defined in claim 20, wherein the means to control the pressure of the fluid entering said flow meter additionally includes:
(a) a plurality of fuel injectors adapted to receive fluid after it has passed through said air operated pressure regulator and dispense said fluid into flow buckets provided in said weigh scale subsystem;
(b) a plurality of injector solenoid driver circuits connected one each to said fuel injectors;
(c) a fuel injection control circuit operatively connected to each of said injector solenoid driver circuits to operate the same;
(d) a high flow-low flow select switch operatively connected to said fuel injection control circuit to select the rate of fuel flow through said flow meter;
(e) an injector on-off switch operatively connected to said high flow-low flow select switch to turn said injectors on and off;
(f) a plurality of low flow duty cycle injector switches to set the duty cycle of said injectors, said switches operatively connected to said fuel injection control circuit;
(g) a plurality of high flow duty cycle injector switches to set the flow through said large injectors, said switches operatively connected to said fuel injection control circuit; and
(h) providing a period switch operatively connected to said fuel injection control circuit to set the period of said injectors.

23. The device defined in claim 20, wherein said monitoring subsystem includes:
(a) an upstream temperature sensor placed in the fluid flow path to measure the temperature of the fluid before said fluid enters said flow meter;
(b) a downstream temperature sensor placed in the fluid flow path to measure the temperature of the fluid downstream of said flow meter undergoing calibration;
(c) a flow room temperature sensor to sense the temperature of the air in said flow room;
(d) a control room temperature sensor to sense the temperature of the air in said control room;
(e) a temperature display to display the readouts from said upstream temperature sensor, said flow room temperature sensor, said control room temperature sensor, and said downstream temperature sensor;
(f) an injector inlet pressure sensor to sense the pressure of the fuel entering said fuel injectors;
(g) an injector pressure display circuit adapted to receive a signal from said injector inlet pressure sensor transducer and convert the same into a signal useable by said injector pressure display; and
(h) an injector pressure display to display a signal derived from the injector pressure display circuit which represents the pressure of the fuel entering said fuel injectors.

24. The device defined in claim 19, wherein said means to weigh the fluid passing through said flow meter include a weigh scale subsystem.

25. The device defined in claim 24, wherein said weigh scale subsystem includes:
(a) a weigh scale of the dual-beam type having a large weigh bucket and a small weigh bucket mounted thereon;
(b) a ball screw rotatably mounted on said weigh scale and having a movable poise weight;
(c) an encoder operatively connected to one end of said ball screw and adapted to produce pulses when said ball screw is rotated;
(d) a pulse encoder circuit operatively connected to said encoder to provide an output related to the revolutions of the ball screw;
(e) a pulse encoder circuit to count said pulses produced by said encoder;
(f) a poise motor operatively connected to the other end of said ball screw to rotate said ball screw;
(g) a linear variable differential transformer operatively mounted to said weigh scale to sense vertical displacements of the beams thereof;
(h) a poise control circuit adapted to receive inputs from said linear variable differential transformer and provide outputs to said poise motor to turn said ball screw and maintain the scale in a balanced condition; and
(i) a power supply circuit connected to said pulse encoder circuit, said encoder, said poise control circuit, said linear variable differential transformer and said poise motor to provide power thereto.

26. The device defined in claim 25, wherein said weigh scale subsystem further includes:
(a) a time weight scale control and timing circuit connected to said power supply circuit, said pulse encoder circuit, said poise control circuit, said encoder and said linear variable differential transformer to receive signals therefrom and send signals therethrough to maintain said weigh scale in a balanced condition as fluid is flowing into either said large or said small weigh bucket;
(b) an extractor bar operatively connected to an extractor cylinder for reciprocal movement;
(c) a low flow evacuation tube fixedly mounted to said extractor bar;
(d) a high flow evacuation tube fixedly mounted to said extractor bar;
(e) an extractor solenoid operatively connected to said high flow and said low flow evacuation tubes, said tubes communicating with said evacuation pump to remove fluid from said high flow or low flow weigh bucket when said extractor cylinder is in its lowered position;
(f) a drain valve operatively connected to said high flow and said low flow evacuation tubes to provide for the drainage of said buckets after a test;
(g) a drain valve relay operatively connected to said valve to operate said drain valve;
(h) a drain lift solenoid operatively connected to said extractor cylinder; and
(i) a drain lift relay operatively connected to said drain lift solenoid.

27. The device defined in claim 26, and further including:
(a) a scale power on-off switch operatively connected to said power supply circuit;

(b) a time weight display circuit operatively connected to said pulse encoder circuit;

(c) a pounds/grams select switch operatively connected to said time weight display circuit;

(d) a time weight display operatively connected to said time weight display circuit to receive signals therefrom; and (e) a time weight display reset operatively connected to said time weight display to reset the same.

28. The device defined in claim 27, and including:

(a) a pretest time select switch;

(b) a test time select switch;

(c) a test time unit select switch connected to said time weight scale control and timing circuit;

(d) a test start switch connected to said time weight scale control and timing circuit; and (e) a test abort switch connected to said time weight scale control and timing circuit.

29. The device defined in claim 28, wherein said time weight scale control and timing circuit includes:

(a) a scale cycle control circuit adapted to receive inputs from said pretest time select switch, said test time select switch, said test start switch, said abort switch, said test time unit select switch;

(b) a pretest circuit operatively connected to said scale cycle control;

(c) a test circuit operatively connected to said scale cycle control;

(d) a clock select circuit having minutes and seconds inputs and an output, with said output connected to said test circuit; and (e) a clock circuit having minutes and seconds outputs and a clock input, with said minutes output being connected to said minutes input of said clock select circuit, said seconds output connected to said pretest circuit and said seconds input of said clock select circuit and said clock input being connected to a 60-hertz AC clock.

30. The device defined in claim 29, wherein said time weight display circuit includes:

(a) a decimal select circuit adapted to receive inputs related to the units in which the flow meter calibration is to take place and adapted to provide outputs related to said units;

(b) a 6½ digit display decoder and driver circuit adapted to receive inputs from said decimal select circuit and to provide outputs to said time weight weight display;

(c) an input circuit adapted to receive a count clock signal and operatively connected to a scaling circuit to supply an input thereto;

(d) a scaling circuit operatively connected to said input circuit and adapted to receive appropriate select signals and inputs from said input circuits and provide an output to a seven decade BCD counter circuit; and (e) a seven decade BCD counter circuit adapted to receive reset signals and an input from said scaling circuit operatively connected to said 6½ digit display decoder and driver circuit to provide a signals thereto.

31. The device defined in claim 28, wherein said pretest circuit includes:

(a) a pair of counters having inputs to receive a start pretest signal from said scale cycle control circuit and to output end pretest and pretest clock signals; and (b) a pair of pretest thumbwheel switches connected one each to said pretest counter.

32. The device defined in claim 31, wherein said test circuit includes:

(a) a pair of test circuit counters each receiving a start pretest signal from said scale cycle control and outputting end pretest and pretest clock signals thereto; and (b) a pair of thumbwheel switches connected one each to said pair of test circuit counters.

33. The device defined in claim 22, wherein said scale cycle control circuit includes:

(a) a preset pulser adapted to receive a signal from said start test switch;

(b) a start cycle pulser connected to the output of said preset pulser and having a Q output;

(c) a cycle latch having a set and reset input and a Q output, with said set input being connected to said Q output of said start cycle pulser;

(d) a test latch having set and reset inputs and a Q output, with said reset input being connected to the reset input of said cycle latch;

(e) an end pretest pulser having a clock and a reset input and a Q output, with said Q output connected to said set input of said test latch, and said clock input being connected to said pretest counter to receive an output therefrom;

(f) a first NAND gate having two inputs and an output, the output of which is connected to said pretest counter, one input of which is connected to said Q output of said cycle lach, and the other input of which is connected to said clock circuit;

(g) a second NAND gate having two inputs and an output, the output thereof being connected to said test counters, one input being connected to said clock select circuit, and the other input thereof being connected to said Q output of said test latch;

(h) a display hold latch having set and reset inputs and a Q output, with said reset input being connected to said A output of said preset pulser, said start cycle pulser and said clock circuit, as well as said test and said preset counters, the set input being connected to the reset input of said cycle latch, and the Q output of said end test pulser, and the output thereof being connected to said display circuit;

(i) an abort latch having a set input, a reset input and a Q output, said Q output connected to an abort light, said set input connected to an inverter and said reset input connected to said clock input of said end test pulser and to said test counter;

(j) a first inverter having an input and a negated output, with said negated output connected to said set input of said abort latch, said reset input connected to said clock input of said end test pulser and said test counter; and (k) a second inverter having an input and a negated output, with said negated output connected to the reset input of said end pretest pulser, and said input connected to said Q output of said test latch.

34. The device defined in claim 33, wherein said clock select circuit includes:

(a) a first clock select NOR gate having two inputs and a negated output, one of said inputs adapted to receive a minute signal from said test time unit select switch, and the other input being connected to said clock circuit;

(b) a second clock select NOR gate having two inputs and a negated output, one of said inputs being connected to said clock select circuit and an input of said first NAND gate, the other of said inputs being connected to receive the seconds signal from said test time unit select switch; and (c) a first clock select OR gate having two inputs connected one each to the outputs of said first clock select NOR gate and said second clock select NOR gate, with said output being connected to one of the inputs of said second NAND gate.

35. The device defined in claim 34, wherein said clock circuit includes:

(a) a first clock counter having a clock input, a reset input and a carryout output;

(b) a second clock counter having a clock input, a reset input and a Q6 output, with said clock input of said second clock counter connected to said carryout output of said first clock counter, and said reset input connected to said reset input of said first clock counter, said Q6 output connected to an input of said first NAND gate;

(c) a first clock OR gate having an output and two inputs, said output connected to said reset inputs of said first clock counter, and said second clock counter, and one of said inputs connected to said Q6 output of said second clock counter;

(d) a third clock counter having a clock input, a reset input and a carryout output, with said clock input being connected to said Q6 output of said second clock counter;

(e) a fourth clock counter having a clock input, a Q6 output and a reset input, with said clock input of said fourth clock counter being connected to said carryout output of said third clock counter; and (f) a second clock OR gate having an output and two inputs, said output being connected to said reset inputs of said third clock counter and said fourth clock counter, one of said inputs being connected to said Q6 output of said fourth clock counter, and the other input of said second clock OR gate being connected to said Q output of said end pretest pulser and said time weight display circuit.

36. The device defined in claim 35, wherein said poise control circuit includes:

(a) a first signal conditioning input resistor connected to said linear variable differential transformer;

(b) a signal conditioning operational amplifier having a negative input, a positive input and an output, with said positive input connected to system common and said negative input connected to said first signal conditioning input resistor;

(c) an integrating capacitor interposed between the output and the negative input of said signal conditioning operational amplifier;

(d) a signal conditioner feedback resistor interposed between the output of said signal conditioning operational amplifier and the negative input thereof;

(e) a driver operational amplifier having a negative input, a positive input and an output, said positive input of said driver operational amplifier connected to system common;

(f) a driver input resistor interposed between said output of said signal conditioning operational amplifier and the negative input of said driver operational amplifier;

(g) a run-calibrate switch connected to the output of said signal conditioning operational amplifier;

(h) a first calibrate input resistor connected to said run-calibrate switch;

(i) a second calibrate input resistor connected between said first calibrating input resistor and said negative input of said driver operational amplifier;

(j) a rate determinant capacitor interposed between said first calibrating input resistor and the negative input of said driver operational amplifier;

(k) a positive follower Darlington transistor having an emitter, base and collector, with said base of said transistor being connected to the output of said driver operational amplifier, said collector connected to positive system voltage, and said emitter connected to said poise motor;

(l) a negative follower Darlington transistor having an emitter, base and collector, with the base of said negative follower Darlington transistor being connected to the output of said driver operational amplifier, the emitters of said positive follower Darlington transistor and said negative follower Darlington transistor being connected together;

(m) a crossover capacitor interposed between the output of said driver operational amplifier and the connection of the emitters of said positive and negative follower Darlington transistors, the collector of said positive follower Darlington transistor being connected to a +15 volt voltage supply, the collector of said negative follower Darlington transistor being connected to a −15 volt power supply;

(n) a driver feedback resistor interposed between the negative input of said driver operational amplifier and the connection between the emitters of said positive and said negative follower Darlington transistors; and (o) a driver integrating capacitor connected in parallel with said driver feedback resistor between the negative input of said driver operational amplifier and the emitter connection between the emitters of said positive and said negative follower driver transistors, said emitter connection connected to said poise motor.

37. The device defined in claim 36, wherein said pulse encoder circuit includes:

(a) an up pulse follower transistor having an emitter, a base and a collector, with said base connected to said encoder;

(b) a down pulse follower transistor having an emitter, a base and a collector, with said base connected to said encoder;

(c) a primary coil forming a part of said second air gap transformer and being connected to said emitter of said up pulse follower transistor; and (d) a primary coil forming a part of said third air gap transformer and being connected to said emitter of said down pulse follower transistor.

38. The device defined in claim 37, wherein said pulse encoder circuit further includes:

(a) a secondary coil forming a part of said second air gap transformer;

(b) a secondary coil forming a part of said third air gap transformer;

(c) an up base resistor connected to said secondary coil of said second air gap transformer;

(d) a down base resistor connected to said secondary coil of said third air gap transformer;

(e) an up inverter transistor having an emitter, a base and a collector, with said base connected to said up base resistor and said emitter connected to system common;

(f) a down inverter transistor having an emitter, a base and a collector, with said base connected to said down base resistor and said emitter connected to said system common;

(g) an up count pulser having a clock input and a Q output, with said clock input being connected to said collector of said up inverter transistor; and (h) a down count pulser having a clock input and a Q output, with said clock input being connected to said collector of said down inverter transistor.

39. The device defined in claim 38, wherein said pulse encoder circuit further includes:

(a) an up output follower transistor having an emitter, a base and a collector, with said base connected to the Q output of said up count pulser, and said collector connected to said power supply circuit;

(b) a down output follower transistor having an emitter, a base and a collector, with said base connected to said Q output of sid down count pulser, and said collector connected to said power supply circuit;

(c) an up emitter resistor interposed between the emitter of said up output follower transistor and system common;

(d) a down emitter resistor interposed between the emitter of said down output follower transistor and system common;

(e) an up pull-up resistor interposed between said power supply circuit and the collector of said up inverter transistor; and (f) a down inverter transistor interposed between said power supply circuit and said collector of said down inverter transistor.

40. The device defined in claim 39, wherein said fuel injection control circuit includes:

(a) a plurality of programmable duty cycle counter circuits equal to the number of low flow duty cycle injector switches and connected one each thereto;

(b) a plurality of programmable duty cycle counter circuits equal to the number of high flow duty cycle injector switches and connected one each thereto;

(c) a preset counter circuit connected to each of said programmable duty counter circuits; and (d) a period counter circuit connected to said preset counter circuit and each of said programmable duty counter circuits, thereby controlling the period and the duty cycle of said injectors.

41. The device defined in claim 40, wherein each of said injector driver circuits includes:

(a) a Darlington transistor having a base, emitter and collector, with the base of said Darlington transistor connected to said fuel injection circuit, and the emitter of said Darlington transistor being connected to ground; and (b) a current limiting resistor connected at one end to the collector of said Darlington transistor and at its other end to said injector.

42. The device defined in claim 41, wherein said injector pressure display circuit includes:

(a) a three-terminal voltage regulator having an input terminal, an output terminal and a common terminal, with said input terminal connected to said injector pressure regulator and a +15 volt power source;

(b) four filter power capacitors connected in parallel across said input terminal and said common terminal of said three-terminal voltage regulator;

(c) two power filter capacitors connected in parallel across said common terminal and said output terminal of said three-terminal voltage regulator, the output terminal of said voltage regulator also being connected to said injector pressure display;

(d) a current sensing resistor connected at its one end to said injector pressure transducer and its other end to system common;

(e) an operational amplifier follower having a positive input, a negative input and an output, with said negative input connected to the output thereof, the output connected to said injector pressure transducer;

(f) an RC filter interposed between the positive input of said operational follower amplifier and the end of said current sensing resistor connected to said injector pressure transducer;

(g) a limit resistor connected at one of its ends to an injector pressure transducer;

(h) a zero adjustment potentiometer connected to said limit resistor;

(i) a second operational amplifier follower having a positive input, a negative input and an output, with said negative input connected to said output thereof, and said positive input connected to said zero adjust potentiometer; and (j) a pair of power capacitors interposed between ground and the output of said zero adjustment potentiometer, the output of said second operational amplifier output connected to said injector pressure display.

43. The device defined in claim 42, wherein said pressure regulator control circuit includes:

(a) a zener diode having an anode and a diode;

(b) a series dropping resistor connected between positive system voltage and the cathode of said zener diode, with the anode of said zener diode connected to ground;

(c) a limiting resistor connected to the cathode of said zero zener diode;

(d) an operational amplifier having a positive and negative input and an output; and (e) a follower transistor having an emitter, a base and a collector, with said base connected to the output of said operational amplifier, the negative input of said operational amplifier connected to said follower transmitter, and the emitter of said follower transistor being connected to said pressure regulator.

44. The device defined in claim 43, wherein said pressure adjustment potentiometer includes:

(a) a coarse adjustment potentiometer connected between said positive input of said second operational amplifier and said limiting resistor; and (b) a fine adjustment potentiometer connected to said coarse adjustment potentiometer.

45. The device defined in claim 19, being adapted for use on glass tube flow meters and including:

(a) a flow detection system.

46. The device defined in claim 45, wherein said flow detection subsystem includes:

(a) a float follower having a receiver and adapted to fit about said glass tube and detect the presence of the float therein;

(b) a ball screw operatively mounted adjacent and parallel to said glass tube flow meter to move said float follower along said glass tube flow meter;

(c) an optical pulse encoder operatively mounted to one end of said ball screw to provide a pulse output related to the movement of said float follower;

(d) a stepper motor attached to the other end of said ball screw and adapted to rotate said ball screw and thus move said float follower upon receiving a proper signal;

(e) a stepper motor driver circuit to provide said pulses to said stepper motor;

(f) a float detector display circuit to detect the position of the float in said flow tube;

(g) a float detector position display to display the position of said float in said flow meter;

(h) an optical conditioner circuit connected to said float detector to provide power to said transmitter and said receiver; and (i) a float detector control circuit connected to said stepper motor driver circuit and said optical conditioner circuit to provide automatic tracking of said float in said glass tube flow meter.

47. The device defined in claim 46, wherein said float detector control circuit includes:

(a) manual select and input circuit;

(b) a clock speed select circuit operatively connected to said manual select and input circuit;

(c) a clock circuit having slow and fast outputs connected to said manual select and input circuit;

(d) a direction polarity latch circuit connected to said manual select and input circuit and said clock speed select circuit;

(e) an auto select circuit connected to said manual select and input circuit and said clock speed select circuit and said direction polarity latch circuit;

(f) an auto select circuit connected to said clock speed select circuit and said direction polarity latch circuit;

(g) an auto abort circuit connected to said auto select circuit, said direction polarity latch circuit, said clock speed select circuit, and said clock circuit, and connected to said optical conditioner circuit; and (h) a stepper motor translator circuit connected to said direction polarity latch circuit and said stepper driver circuit.

48. The device defined in claim 47, wherein said float detector display circuit includes:

(a) a four and one-half digit display decoder and driver circuit connected to a float detector position display;

(b) a five decade BCD counter having a reset input, an up-down input and count inputs and having an output, with said output adapted to be connected to the input of said four and one-half digit display decoder and driver circuit;

(c) a display latch having set and reset inputs and an up-down output, with said up-down output connected to the up-down input of said five decade BCD counter; and (d) a display OR gate having two inputs and an output, with the output thereof connected to the count input of said five decade BCD counter, with the inputs thereof being connected to the set and reset inputs of said display latch and adapted to receive signals from said pulse encoder.

49. The device defined in claim 48, wherein said optical conditioner circuit includes:

(a) an amplifier circuit having inputs and outputs;

(b) a power supply circuit connected to said amplifier circuit;

(c) a synchronous modulator connected to said power supply; and (d) a decode circuit connected to said amplifier circuit and to said synchronous modulator.

* * * * *